US009551226B2

(12) United States Patent
Smith et al.

(10) Patent No.: US 9,551,226 B2
(45) Date of Patent: Jan. 24, 2017

(54) TURBINE BUCKET WITH ENDWALL CONTOUR AND AIRFOIL PROFILE

(71) Applicant: General Electric Company, Schenectady, NY (US)

(72) Inventors: Paul Kendall Smith, Simpsonville, SC (US); Harish Bommanakatte, Bangalore (IN); Anthony Louis Giglio, Baton Rouge, LA (US); Jason Douglas Herzlinger, Glenville, NY (US); Jacob Charles Perry, II, Taylors, SC (US); Alexander Stein, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 508 days.

(21) Appl. No.: 14/061,107

(22) Filed: Oct. 23, 2013

(65) Prior Publication Data

US 2015/0107265 A1    Apr. 23, 2015

(51) Int. Cl.
*F01D 5/14*    (2006.01)

(52) U.S. Cl.
CPC ......... *F01D 5/143* (2013.01); *F05D 2250/711* (2013.01); *F05D 2250/74* (2013.01); *Y02E 20/16* (2013.01); *Y02T 50/671* (2013.01); *Y02T 50/673* (2013.01)

(58) Field of Classification Search
CPC   F01D 5/143; F05D 2250/711; F05D 2250/74; Y02E 20/16; Y02T 50/671; Y02T 50/673
See application file for complete search history.

(56) References Cited

U.S. PATENT DOCUMENTS

| 1,828,409 | A | 10/1931 | Densmore |
| 1,955,929 | A | 4/1934 | Mueller |
| 2,714,499 | A | 8/1955 | Warner |
| 3,844,679 | A | 10/1974 | Grondahl et al. |
| 4,208,167 | A | 6/1980 | Yasugahira et al. |
| 4,604,031 | A | 8/1986 | Moss et al. |
| 4,627,480 | A | 12/1986 | Lee et al. |
| 4,682,935 | A | 7/1987 | Martin |
| 5,073,086 | A | 12/1991 | Cooper |
| 5,088,892 | A | 2/1992 | Weingold et al. |
| 5,282,721 | A | 2/1994 | Kildea |

(Continued)

FOREIGN PATENT DOCUMENTS

EP       2479381 A1    7/2012

OTHER PUBLICATIONS

Booth et al., "Rotor-Tip Leakage: Part 1—Basic Methodology", Journal of Engineering for Power, Transactions of the ASME, vol. 104, Jan. 1982, pp. 154-161.

(Continued)

*Primary Examiner* — Igor Kershteyn
(74) *Attorney, Agent, or Firm* — Ernest G. Cusick; Hoffman Warnick LLC

(57) ABSTRACT

Turbine frequency tuning, fluid dynamic efficiency, and performance can be improved using an airfoil profile and/or an endwall contour including at least one of a pressure side bump, a pressure side leading edge bump, or a suction side trough. In particular, by including two endwall bumps on the pressure side and a trough on the suction side combined with a particular airfoil profile, performance can be further improved.

23 Claims, 6 Drawing Sheets

(56) References Cited

U.S. PATENT DOCUMENTS

| | | |
|---|---|---|
| 5,286,168 A | 2/1994 | Smith |
| 5,397,217 A | 3/1995 | DeMarche et al. |
| 5,480,285 A | 1/1996 | Patel et al. |
| 5,503,527 A | 4/1996 | Lee et al. |
| 5,525,038 A | 6/1996 | Sharma et al. |
| 5,536,143 A | 7/1996 | Jacala et al. |
| 5,738,489 A | 4/1998 | Lee |
| 5,848,876 A | 12/1998 | Tomita |
| 5,873,695 A | 2/1999 | Takeishi et al. |
| 5,924,843 A | 7/1999 | Staub et al. |
| 5,980,209 A | 11/1999 | Barry et al. |
| 6,017,189 A | 1/2000 | Judet et al. |
| 6,019,579 A | 2/2000 | Fukuno et al. |
| 6,072,829 A | 6/2000 | Dirr |
| 6,077,034 A | 6/2000 | Tomita et al. |
| 6,079,948 A | 6/2000 | Sasaki et al. |
| 6,086,328 A | 7/2000 | Lee |
| 6,142,739 A | 11/2000 | Harvey |
| 6,190,130 B1 | 2/2001 | Fukue et al. |
| 6,241,467 B1 | 6/2001 | Zelesky et al. |
| 6,257,830 B1 | 7/2001 | Matsuura et al. |
| 6,419,446 B1 | 7/2002 | Kvasnak et al. |
| 6,422,817 B1 | 7/2002 | Jacala |
| 6,464,462 B2 | 10/2002 | Stathopoulos et al. |
| 6,474,947 B1 | 11/2002 | Yuri |
| 6,491,493 B1 | 12/2002 | Watanabe et al. |
| 6,491,496 B2 | 12/2002 | Starkweather |
| 6,554,564 B1 | 4/2003 | Lord |
| 6,579,066 B1 | 6/2003 | Saito et al. |
| 6,595,750 B2 | 7/2003 | Parneix et al. |
| 6,672,829 B1 | 1/2004 | Cherry et al. |
| 6,722,851 B1 | 4/2004 | Brittingham et al. |
| 6,761,535 B1 | 7/2004 | McGrath et al. |
| 6,790,005 B2 | 9/2004 | Lee et al. |
| 6,799,948 B2 | 10/2004 | Ito et al. |
| 6,887,042 B2 | 5/2005 | Ito et al. |
| 6,957,949 B2 | 10/2005 | Hyde et al. |
| 6,966,756 B2 | 11/2005 | McGrath et al. |
| 6,969,232 B2 | 11/2005 | Zess et al. |
| 7,029,235 B2 | 4/2006 | Liang |
| 7,048,509 B2 | 5/2006 | Tominaga et al. |
| 7,118,329 B2 | 10/2006 | Goodman |
| 7,134,842 B2 * | 11/2006 | Tam ........................ F01D 5/143 416/193 A |
| 7,220,100 B2 | 5/2007 | Lee et al. |
| 7,255,536 B2 | 8/2007 | Cunha et al. |
| 7,281,894 B2 | 10/2007 | Lee et al. |
| 7,300,247 B2 | 11/2007 | Nomura et al. |
| 7,377,746 B2 | 5/2008 | Brassfield et al. |
| 7,416,391 B2 | 8/2008 | Veltre et al. |
| 7,476,086 B2 | 1/2009 | Wadia et al. |
| 7,544,043 B2 | 6/2009 | Eastman et al. |
| 7,597,539 B1 | 10/2009 | Liang |
| 7,632,062 B2 | 12/2009 | Harvey et al. |
| 7,641,446 B2 | 1/2010 | Harvey |
| 7,674,093 B2 | 3/2010 | Lee et al. |
| 7,726,937 B2 | 6/2010 | Baumann et al. |
| 7,731,483 B2 | 6/2010 | DeLong et al. |
| 7,766,606 B2 | 8/2010 | Liang |
| 7,931,444 B2 | 4/2011 | Godsk et al. |
| 7,972,115 B2 | 7/2011 | Potier |
| 7,985,053 B2 | 7/2011 | Schott et al. |
| 7,997,875 B2 | 8/2011 | Nanukuttan et al. |
| 8,047,802 B2 | 11/2011 | Clemen |
| 8,052,395 B2 | 11/2011 | Tragesser |
| 8,092,178 B2 | 1/2012 | Marini et al. |
| 8,105,031 B2 | 1/2012 | Trindade et al. |
| 8,105,037 B2 * | 1/2012 | Grover .................... F01D 5/143 416/179 |
| 8,133,030 B2 | 3/2012 | Grafitti et al. |
| 8,133,032 B2 | 3/2012 | Tibbott et al. |
| 8,147,188 B2 | 4/2012 | Reeves et al. |
| 8,172,533 B2 | 5/2012 | Pinero et al. |
| 8,347,947 B2 | 1/2013 | Dube et al. |
| 8,371,815 B2 | 2/2013 | Farrell |
| 8,414,265 B2 | 4/2013 | Willett, Jr. |
| 8,449,249 B2 | 5/2013 | Suchezky |
| 8,568,097 B1 | 10/2013 | Liang |
| 8,591,189 B2 | 11/2013 | Correia et al. |
| 8,602,740 B2 | 12/2013 | O'Hearn et al. |
| 8,647,066 B2 * | 2/2014 | Guimbard ............... F01D 5/143 416/193 A |
| 8,647,067 B2 * | 2/2014 | Pandey ................... F01D 5/143 416/193 A |
| 8,662,825 B2 | 3/2014 | Ireland et al. |
| 8,684,684 B2 * | 4/2014 | Clements ................ F01D 5/143 415/193 |
| 8,720,207 B2 * | 5/2014 | Gersbach ................ F01D 5/143 415/191 |
| 8,721,291 B2 * | 5/2014 | Lee .......................... F01D 5/081 416/193 A |
| 8,777,572 B2 | 7/2014 | Cheong et al. |
| 8,821,111 B2 | 9/2014 | Gear et al. |
| 8,870,524 B1 | 10/2014 | Liang |
| 8,870,585 B2 | 10/2014 | Lee et al. |
| 8,967,959 B2 | 3/2015 | Stein et al. |
| 9,103,213 B2 | 8/2015 | Barr et al. |
| 9,188,017 B2 | 11/2015 | Xu |
| 2002/0141863 A1 | 10/2002 | Liu et al. |
| 2004/0062636 A1 | 4/2004 | Mazzola et al. |
| 2004/0081548 A1 * | 4/2004 | Zess ........................ F01D 5/145 415/1 |
| 2007/0059173 A1 | 3/2007 | Lee et al. |
| 2007/0059182 A1 | 3/2007 | Stegemiller et al. |
| 2007/0128033 A1 | 6/2007 | Lee et al. |
| 2007/0258810 A1 | 11/2007 | Aotsuka et al. |
| 2007/0258819 A1 | 11/2007 | Allen-Bradley et al. |
| 2008/0213098 A1 | 9/2008 | Neef et al. |
| 2008/0232968 A1 | 9/2008 | Nguyen |
| 2009/0003987 A1 | 1/2009 | Zausner et al. |
| 2010/0047065 A1 | 2/2010 | Sakamoto et al. |
| 2010/0143139 A1 | 6/2010 | Pandey et al. |
| 2010/0158696 A1 * | 6/2010 | Pandey ................... F01D 5/143 416/243 |
| 2010/0189023 A1 | 7/2010 | Lindgren et al. |
| 2010/0196154 A1 | 8/2010 | Sakamoto et al. |
| 2010/0221122 A1 | 9/2010 | Klasing et al. |
| 2010/0278644 A1 | 11/2010 | Gersbach et al. |
| 2011/0044818 A1 * | 2/2011 | Kuhne ..................... F01D 5/143 416/212 A |
| 2011/0058958 A1 | 3/2011 | Ireland et al. |
| 2011/0255990 A1 | 10/2011 | Diamond et al. |
| 2012/0163993 A1 | 6/2012 | Levine et al. |
| 2012/0201688 A1 | 8/2012 | Mahle et al. |
| 2012/0328451 A1 | 12/2012 | Lomas et al. |
| 2013/0017095 A1 | 1/2013 | Lee et al. |
| 2013/0108424 A1 | 5/2013 | Stein et al. |
| 2013/0224040 A1 | 8/2013 | Straccia |
| 2014/0119942 A1 | 5/2014 | Lehmann et al. |
| 2014/0271225 A1 | 9/2014 | Herzlinger et al. |
| 2015/0110639 A1 | 4/2015 | Herzlinger et al. |
| 2015/0110640 A1 | 4/2015 | Herzlinger et al. |
| 2015/0110641 A1 | 4/2015 | Herzlinger et al. |

OTHER PUBLICATIONS

U.S. Appl. No. 14/061,146, Notice of Allowance dated Apr. 11, 2016, (GEEN-0494), 24 pages.

U.S. Appl. No. 14/060,996, Notice of Allowance dated May 25, 2016, (GEEN-0492), 17 pages.

U.S. Appl. No. 14/060,996, Final Office Action 1 dated Mar. 4, 2016, (GEEN-0492), 15 pages.

U.S. Appl. No. 14/061,221, Office Action 1 dated Mar. 14, 2016, (GEEN-0493), 15 pages.

U.S. Appl. No. 14/061,193, Office Action 1 dated Mar. 16, 2016, (GEEN-0497), 17 pages.

U.S. Appl. No. 14/061,363, Office Action 1 dated Mar. 28, 2016, (GEEN-0495), 23 pages.

U.S. Appl. No. 14/061,221, Final Office Action 1 dated Jul. 11, 2016, 18 pages.

U.S. Appl. No. 14/061,169, Office Action 1 dated Jul. 13, 2016, 40 pages.

(56) References Cited

OTHER PUBLICATIONS

U.S. Appl. No. 14/061,158, Office Action 1 dated Aug. 10, 2016, 60 pages.
U.S. Appl. No. 14/061,363, Final Office Action 1 dated Aug. 12, 2016, 37 pages.

* cited by examiner

TURBINE BUCKET WITH ENDWALL CONTOUR AND AIRFOIL PROFILE

BACKGROUND OF THE INVENTION

The subject matter disclosed herein relates to turbine components for aircraft and power generation applications, and, more specifically, to turbine buckets including a base with an endwall contour, and an airfoil portion having a profile that can enhance performance.

Some aircraft and/or power plant systems, for example certain jet aircraft, nuclear, simple cycle and combined cycle power plant systems, employ turbines in their design and operation. Some of these turbines include one or more stages of buckets which during operation are exposed to fluid flows. Each bucket can include a base supporting a respective airfoil (e.g., turbine blade, blade, etc.) configured to aerodynamically interact with and extract work from fluid flow (e.g., creating thrust, driving machinery, converting thermal energy to mechanical energy, etc.) as part of, for example, power generation. As a result of this interaction and conversion, the aerodynamic characteristics and losses of these airfoils have an impact on system and turbine operation, performance, thrust, efficiency, and power at each stage.

BRIEF DESCRIPTION OF THE INVENTION

A first embodiment of the invention disclosed herein can include a turbomachine bucket having a base and an airfoil supported by the base. The airfoil can include opposed first and second ends with the first end at the base, as well as opposed pressure and suction sidewalls that extend in chord between opposed leading and trailing edges and that extend in span between the first and second ends of the airfoil. An endwall of the base can be connected to the first end of the airfoil and can include opposed endwall leading and trailing edges that extend substantially circumferentially between opposed pressure and suction splitlines, a distance between the pressure and suction splitlines being substantially equal to a pitch. Opposed leading edge and trailing edge regions of the endwall can each extend from the respective endwall leading and trailing edges to about half way therebetween, and pressure side and suction side regions of the endwall can extend from the respective pressure and suction sidewalls of the airfoil. At least one pressure side feature can be included in the endwall in the pressure side region, each respective pressure side feature including at least one of a trough or a bump relative to a nominal surface of the endwall. In addition, at least one suction side feature can be included in the endwall in the suction side region, each respective suction side feature including at least one of a trough or a bump relative to the nominal surface of the endwall. At least one leading edge feature can also be included in the endwall including at least one of a trough or a bump relative to the nominal surface in the leading edge region.

In addition, a second embodiment of the invention disclosed herein can be implemented as an endwall of a flow passage formed by adjacent first and second substantially identical, substantially circumferentially spaced apart airfoils of adjacent buckets of a stage of a turbomachine, a spacing between adjacent airfoils being a pitch. Each airfoil can include respective opposed pressure and suction sidewalls extending chordwise between opposed leading and trailing edges and extending spanwise between opposed first and second ends. The endwall can include a nominal surface between opposed endwall leading and trailing edges, and can also include a region between the pressure sidewall of the first airfoil and the suction sidewall of the second airfoil. The endwall can further have at least one pressure side feature including at least one bump relative to the nominal surface proximate the pressure sidewall of the first blade, as well as at least one suction side feature including at least one trough relative to the nominal surface.

Further, a third embodiment of the invention disclosed herein can take the form of a turbine system including a compressor section, a combustion section, and a turbine section. The turbine section can include at least one stage of airfoils substantially circumferentially distributed at a pitch about an axis of rotation of the turbine section. Each airfoil can be supported by a respective platform of a respective bucket such that adjacent airfoils form a flow passage including a pressure sidewall of a first airfoil, a suction sidewall of a second, adjacent airfoil, and an endwall formed by at least a portion of each of the respective platforms of the first and second airfoils. At least one of the suction sidewall or the pressure sidewall can include a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
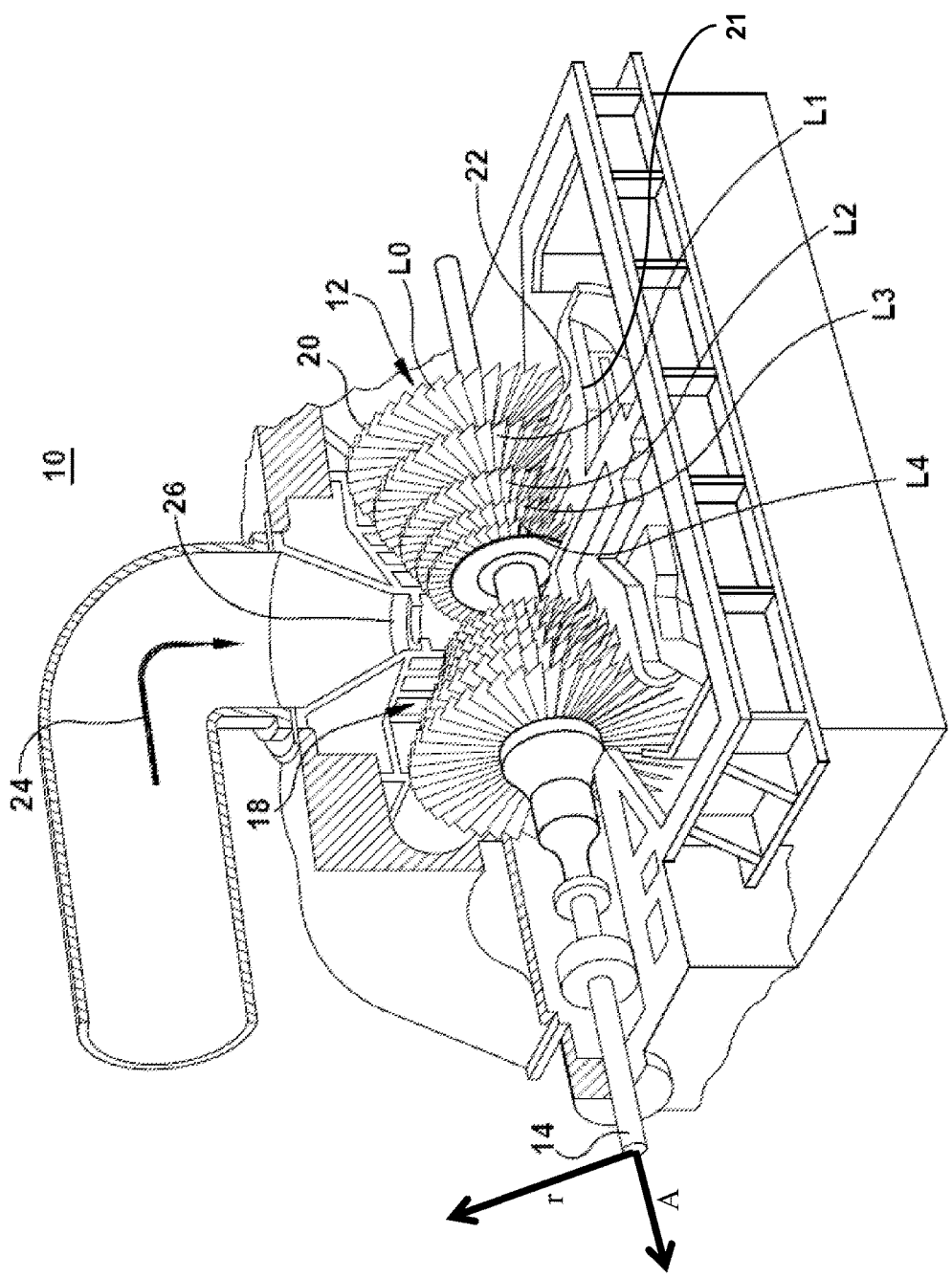
FIG. 1 shows a three-dimensional partial cut-away perspective view of a portion of a turbine according to an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

Aspects of the invention provide for a turbine bucket including improved features, such as a base with an endwall contour, an airfoil including a particular profile and/or a fillet on an end of the airfoil, and/or a cooling passage including a tipturn at a tip of the airfoil. To better meet system requirements and/or design goals, overall efficiency and airfoil loading capability can be improved by, for example, using an improved endwall contour, airfoil profile, and/or cooling passage design according to embodiments of the invention disclosed herein. In addition, thermal and mechanical operating requirements for a given stage can be met, component lifetime can be improved, cost can be lowered, and/or any other suitable system requirement and/or design goal can be improved.

Further, aspects of the invention can include a turbine bucket with a base supporting an airfoil at a first end of the airfoil. A top portion of the base at the first end of the airfoil can be construed as a platform or as an endwall. In contrast to conventional approaches, the endwall can include a non-axisymmetric contour that can enhance fluid flow over the endwall and/or over the airfoil. For example, the endwall can have a trough proximate a pressure sidewall of the airfoil and/or a bump proximate a leading edge of the airfoil on one or more of a pressure side or a suction side of the leading edge. In addition, the airfoil can have a profile that can enhance fluid flow over the airfoil and/or over the endwall. The profiles of the endwall and/or the airfoil can be defined using multiple sets of two-dimensional coordinates, each set being provided for a respective section of the respective profile along the axial direction of the endwall and/or the span of the airfoil. The profile can be used to determine and/or design a throat of a stage including the bucket and/or profile to enhance fluid flow from the stage to a next stage or other portion of a turbine in which the bucket is employed. The contour and/or the profile can take into account coolant or cooling passages in the base and/or airfoil, which passages can include an improved tipturn that can reduce stresses in the airfoil and bucket as a whole.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along any radius r extending substantially perpendicular to a rotational or longitudinal axis A, also called an axis of rotation. Additionally, the terms "circumferential" and/or "circumferentially" refer to the relative position/direction of objects along a circumference which surrounds axis A but does not intersect axis A at any location. A Cartesian coordinate system used to define the shape of the airfoil and/or endwall contour is defined further herein, and may operate independently from the axial, radial, etc., directional indicators.

Referring to the drawings, FIG. 1 shows a perspective partial cut-away illustration of a turbine 10, such as a gas or steam turbine. Turbine 10 can include a rotor 12 that with a rotating shaft 14 and a plurality of axially spaced rotor wheels 18. A plurality of dynamic blades or buckets 20 can be mechanically coupled to each rotor wheel 18, and can be arranged in a row that can extend circumferentially around a respective rotor wheel 18. So arranged, when a rotor wheel 18 rotates, its respective dynamic blades or buckets 20 can revolve about an axis of rotation of the respective rotor wheel. A nozzle 21 can support a plurality of stationary blades or nozzles 22 circumferentially around shaft 14 between adjacent rotor wheels 18 and/or rows of dynamic buckets 20. Blades or nozzles 22 can cooperate with dynamic blades or buckets 20 to form a stage of turbine 10 and to define a portion of a flow path through turbine 10. As shown, nozzle 21 can at least partially surround rotor 12 (shown in this cut-away view) and in embodiments can completely surround rotor 12.

While turbine 10 is shown in FIG. 1 as a dual-flow turbine 10 with an axially centered inlet mouth feeding two sets of turbine stages, various teachings disclosed herein can be applied to any suitable turbine, such as an axial turbine with a single primary direction of flow. For example, various teachings herein can be applied to an axial inlet gas turbine in which a combustion gas passes through an inlet at a first axial end, any stages of the turbine, and an outlet at a second axial end of the turbine, which enables the gas to performed mechanic work on the turbine.

In operation of the example turbine 10 shown in FIG. 1, gas 24 can enter an inlet 26 of turbine 10 and can flow and/or be directed through stationary blades or nozzles 22. Stationary blades or nozzles 22 can direct gas 24 against dynamic blades or buckets 20 so that gas 24 can pass around and/or over dynamic blades or buckets 20. As a result of aerodynamic interaction between dynamic blades or buckets 20 and gas 24, dynamic blades or buckets 20 can impart rotation to rotor wheel 18. In embodiments of the invention disclosed herein, turbine 10 can include multiple stages, which can each include a respective row of stationary blades or nozzles 22 in nozzle 21 and a respective row of dynamic blades or buckets 20 on a respective rotor wheel 18. It should be understood that, while there may be a plurality of rotor wheels 18, they can all be affixed to shaft 14 so as to rotate in unison, all dynamic blades or buckets 20 thus imparting rotation on shaft 14 in concert.

In the example shown in FIG. 1, turbine 10 can include five stages identified as a first stage L4, a second stage L3, a third stage L2, a fourth stage L1, and a fifth stage L0, which is also the last stage. Each stage has a respective radius, with first stage L4 having the smallest radius of the five stages and each subsequent stage having a larger radius, with fifth stage L0 having a largest radius of the five stages. While five stages are shown in FIG. 1, this simply a non-limiting example, and the teachings herein can be applied to turbines having more or fewer stages, including a turbine with a single stage. In addition, while the example shown in FIG. 1 is stationary, the teachings herein can be applied to any suitable turbine, including turbines used in aircraft engines, and may also be applied to compressors.

Figure 2:
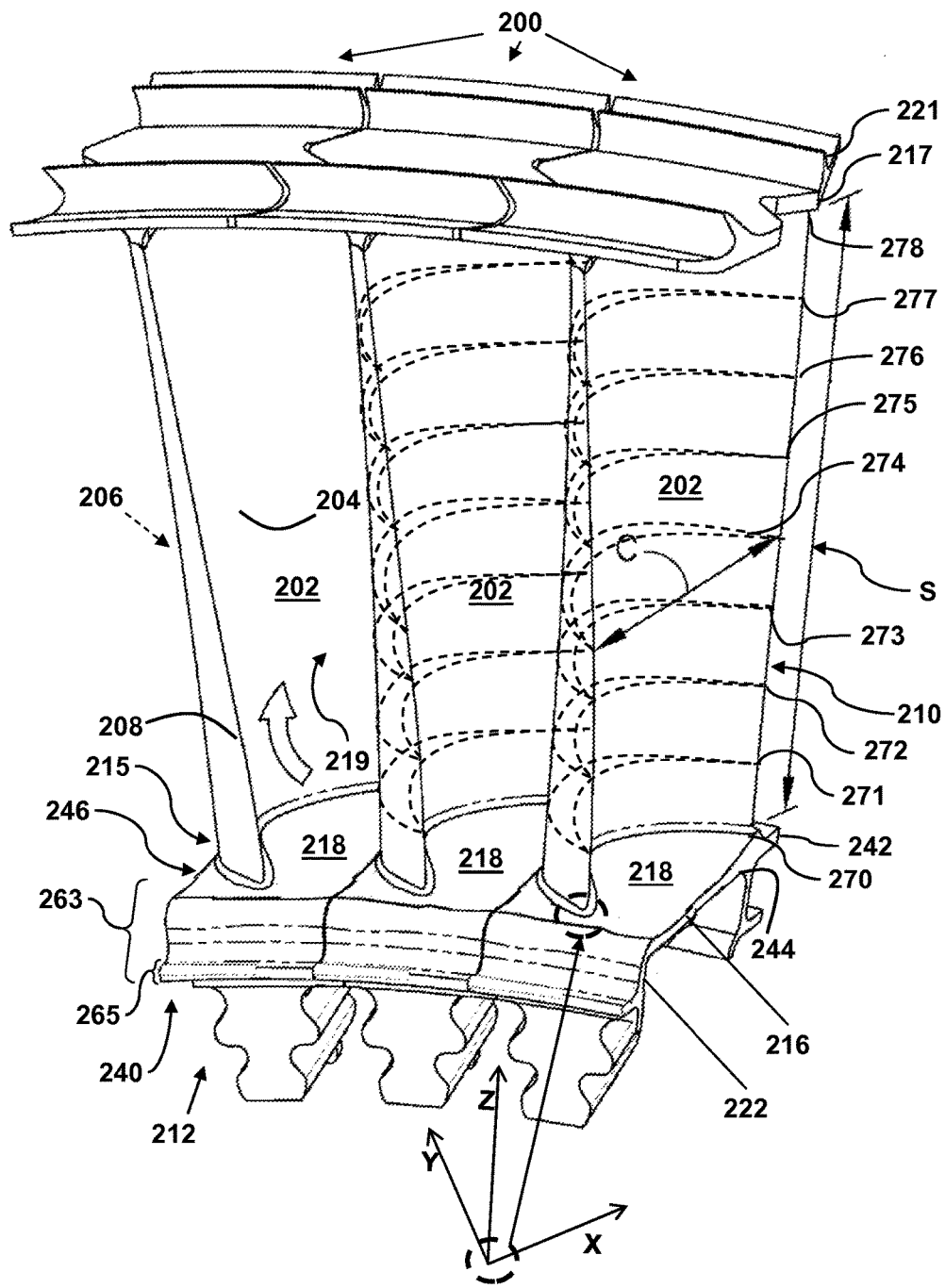
FIG. 2 shows a portion of a set of buckets according to embodiments of the invention disclosed herein.
Figure 3:
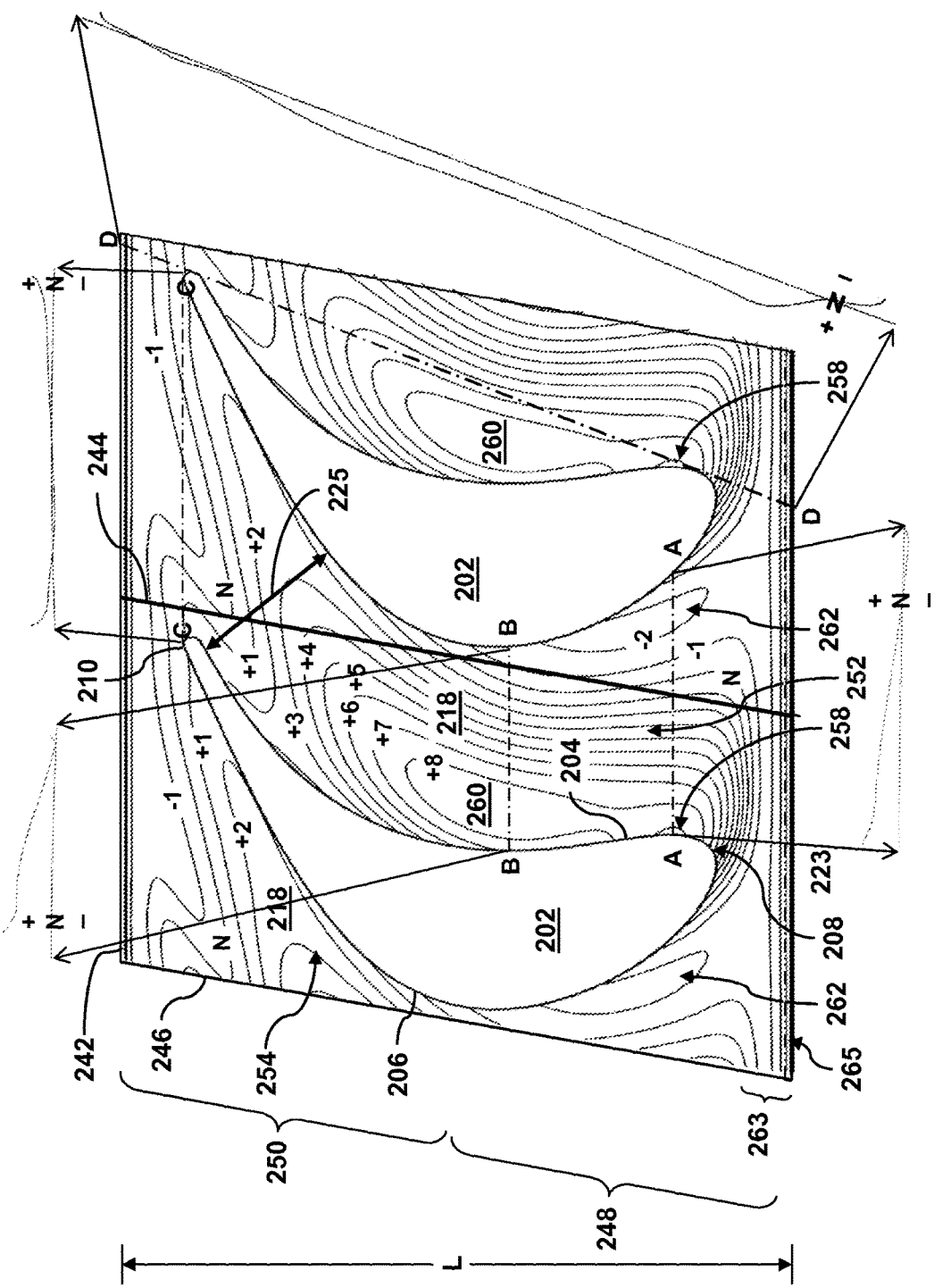
FIG. 3 shows a cross sectional view of a pair of the buckets according to embodiments of the invention disclosed herein and shown in FIG. 2 taken along corresponding sections 271.

Each set of blades 20, 22 has a number of factors that can affect performance of turbine 10. For example, FIGS. 2 and 3 illustrate part of a set of circumferentially spaced-apart blades 200, which will be described as dynamic blades or buckets 20 of a rotor wheel 18, though aspects of the description can apply to sets of stationary blades or nozzles 22 depending on a particular implementation. Additional reference can be made to FIG. 4, which shows a single bucket 200 of embodiments in perspective. It is understood that bucket 200 can be configured to couple (mechanically couple via fasteners, welds, slot/grooves, contact, etc.) with a plurality of similar and/or distinct buckets (e.g., buckets 200 or other buckets) to form a set of buckets in a stage of the turbine. In addition, bucket 200 can be attached to a rotor wheel to form a set of buckets, which rotor wheel can be mounted on a shaft with fasteners, slots and grooves, welds, and/or other devices and/or techniques, and/or a hub of the rotor wheel can be integral with the shaft, and/or the hub can include a portion of the shaft that can be attached to other portions of the shaft via any suitable coupling.

Each bucket 200 can include an airfoil 202 with a pressure sidewall 204 and an opposed suction sidewall 206, as well as a leading edge 208 and a trailing edge 210. Each airfoil 202 can include a chord C between leading edge 208 and trailing edge 210 such that pressure and suction sidewalls 204, 206 can be said to extend in chord or chordwise between leading edge 208 and trailing edge 210. Airfoil 202 can be supported by a base 212, and a fillet 214 can connect a first end 215, such as a root, of airfoil 202 to a first endwall 216, such as a radially inner endwall. Fillet 214 can include a weld or braze fillet, which can be formed via conventional MIG welding, TIG welding, brazing, etc., and can include a profile that can reduce fluid dynamic losses as a result of the presence of fillet 214. In embodiments, base 212, airfoil 202, and fillet 214 can be formed as a single component, such as by casting and/or machining and/or 3D printing and/or any other suitable technique now known or later developed and/or discovered.

As is known in the art, base 212 can be designed to fit into a mating slot in a hub of a rotor wheel and/or a turbine rotor shaft, such as shaft 14 of FIG. 1, and can engage and/or mate with adjacent base components of other buckets 200 if desired and/or suitable. In the case of a stationary blade or nozzle, base 212 can be designed to fit into a slot or other mounting feature in a nozzle of a turbine, such as nozzle 21 of FIG. 1. In embodiments, because base 212 of dynamic blade or bucket 200 can have a relatively large mass, base 212 can be designed to be located radially inboard of airfoil 202 to reduce forces and stresses arising from revolution of bucket 200 about an axis of rotation during rotation of a respective rotor wheel and/or turbine shaft. Should appropriate materials and/or techniques be developed, base 212 and/or endwall 216 could instead be designed to be radially outward of airfoil 202. In addition, in embodiments in the case of a stationary blade or nozzle, the corresponding base can be radially outward of the corresponding airfoil.

Airfoil 202 of dynamic blade or bucket 200 can extend radially from endwall 216 and can further have a span S between first end 215 and a second end 217, such as a tip, of airfoil 202. Pressure and suction sidewalls 204, 206 can be said to extend in span or spanwise between first and second ends 215, 217 of airfoil 202. That is, each bucket 200 can include an airfoil 202 having opposed pressure and suction sidewalls 204, 206 extending in chord or chordwise between opposed leading and trailing edges 208, 210 and extending in span or spanwise between opposed first and second ends 215, 217 of airfoil 202.

First endwall 216 can include a first contour 218 in embodiments, as will be described below, to alter flow patterns in a passage 219 formed between each pair of airfoils 202 and endwall 216. First contour 218 can include features, such as bumps and troughs, that can be described relative to a nominal surface N of endwall 216. Nominal surface N need not be an actual, physical surface, and instead can simply be a frame of reference. While any surface can be employed, in embodiments, referential or nominal surface N can be substantially cylindrical and located at any suitable known location. For example, nominal surface N can be located at a known radius of curvature, such as a radial distance from an axis of rotation of turbine 10 and/or where a surface of an uncontoured endwall ordinarily would be.

With particular reference to FIG. 3, each passage 219 between each pair of airfoils 202 can be regarded as bounded by pressure sidewall 204 of a first airfoil 202, suction sidewall 206 of a second airfoil 202, and portions of first endwall 216 of each of the first and second buckets 200. In FIG. 3, contour lines or isoclines are used to represent a shape of first contour 218 and relative heights and/or elevations of features thereof, each line representing a particular height and/or elevation of a surface of endwall 216. To illustrate, a nominal contour in FIG. 3 has been labeled "N," and each other contour has been labeled according to how far it deviates from nominal, positive and negative. In embodiments, second end 217 of each airfoil 202 can end proximate to a second endwall 221, such as a radially outer endwall or shroud, and portions of adjacent second endwalls 221 can act as an additional boundary of passage 219. Where airfoil 202 is part of a stationary blade or nozzle, second end 217 can be connected to second endwall 221. In either case, connected or not, second endwall 221 can include a second contour, which can be the same as first contour 218 of first endwall 216, though in embodiments can differ from first contour 218, particularly since flow at second endwall 221 can differ significantly from flow at first endwall 216.

A set of coordinates can be used to describe and/or define a three-dimensional profile of each airfoil. For example, a unique set or loci of points in space can be provided, such as those listed in TABLE I, below, and can meet stage requirements for manufacture and performance. The loci of points can be arrived at by iteration between aerodynamic, thermal, and mechanical loadings enabling operation in an efficient, safe, and smooth manner. The loci, as embodied by the invention, can define the bucket airfoil profile for airfoil 202 and can comprise a set of points relative to any suitable frame of reference and/or origin, such as the axis of rotation of turbine 10, a coordinate system of turbine 10, and/or an origin located at a desired and/or suitable point of the airfoil and/or base and/or any other suitable component.

For example, a Cartesian coordinate system of X, Y, and Z values can be used to define a profile of airfoil 202, such as the values listed in TABLE I, below. With the origin at leading edge 208 at first end or root 215, such as at and/or in nominal surface N, the X and Y axes can be rotated such that the X axis extends along a chord of airfoil 202 at the nominal surface N, and such that the Y axis lies orthogonal to the X axis in the nominal surface N. The Z axis can then extend radially away from nominal surface N. Any other suitable orientation of the axes relative to airfoil 202 can be used so long as such orientation is taken into account in the resulting coordinate values. In embodiments, the coordinate system that defines the profile can be based on its own geometry and thus can be used to produce an airfoil with the described profile regardless of its location.

With reference to FIG. 2, a plurality of locations 270-278 along span S, including at root 215 and tip 217, can correspond to Z coordinate values of chord lines, and a cross section of airfoil 202 at each location can be described by a respective set of X and Y coordinates. For example, 100 points can be listed for each of pressure side 204 and suction side 206 for each cross section 270-278, though it should be apparent that more or fewer points can be used for each cross section, and more or fewer cross sections can be used, as may be desired and/or appropriate. In the particular set of values shown in TABLE I, eleven sections are represented including at first end or root 215, such as in nominal surface N, and second end or tip 217, intervening sections being substantially evenly distributed therebetween, as should be apparent from a review of the Z coordinate values. An origin, therefore, can be located at a leading edge root of airfoil 202, as illustrated by the axes in FIG. 4. Further, as suggested above, 200 points are listed for each cross section, 100 for pressure side 204 and 100 for suction side 206, for a total of 2,200 points or sets of coordinate values. The X, Y, and Z coordinate values in TABLE I have been expressed in non-dimensionalized form representing normalized distances in values that can range from −1 to 1, but it should be apparent that any or all of the coordinate values could instead be expressed in distance units so long as the proportions are maintained. TABLE I includes the heading, "Non-Dimensionalized (X Y Z/Span)," and in embodiments a desired span can be used to convert a coordinate value of TABLE I to a respective coordinate value in units of distance, such as inches or meters. In other words, the non-dimensional values given in TABLE I can be multiplied by a desired span of airfoil 202, such as, for example, a desired span of between about 7 inches and about 15 inches, such as between about 10 inches and about 12 inches, to obtain coordinate values in units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the airfoil profile.

The 2,200 points for the coordinate values shown in TABLE I are generated and shown to five decimal places for determining the profile of a nominal airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20 percent of a thickness of the trailing edge in a direction normal to any surface location along the airfoil profile can define an airfoil profile envelope for a bucket airfoil design at cold or room temperature. In other words, a distance of about ±10% to about ±20% (±0.010 to ±0.020 non-dimensionally) of the thickness of the trailing edge in a direction normal to any surface location along the airfoil profile can define a range of variation between measured points on an actual airfoil surface and ideal positions of those points, particularly at a cold or room temperature, as embodied by the invention. The bucket airfoil design, as embodied by the invention, is robust to this range of variation without impairment of mechanical and aerodynamic functions. Likewise, the profile and/or design can be scaled up or down, such as geometrically, without impairment of operation, such as by using a larger or smaller desired span.

As mentioned above, endwall contours can affect flow through passage 219. A set of coordinate values can be provided, either separately or, particularly where airfoil 202 and base 212 are formed as one piece, along with coordinate values describing a profile of airfoil 202 to describe and/or define endwall contour 218, should such be desired and/or appropriate. The same can be done for a contour of second endwall 217, if present. Conventional buckets typically employ substantially axisymmetric and/or substantially cylindrical endwall contours. However, base 212 of turbine bucket 200 can have an endwall 216 with a non-axisymmetric contour 218 in embodiments. Using a non-axisymmetric contour 218 can improve flow around airfoil 202 and through each passage 219 of a turbine stage, which can allow for increased firing temperatures, increased efficiency, and reduced emission of combustion products that might be considered undesirable, such as oxides of nitrogen.

Figure 4:
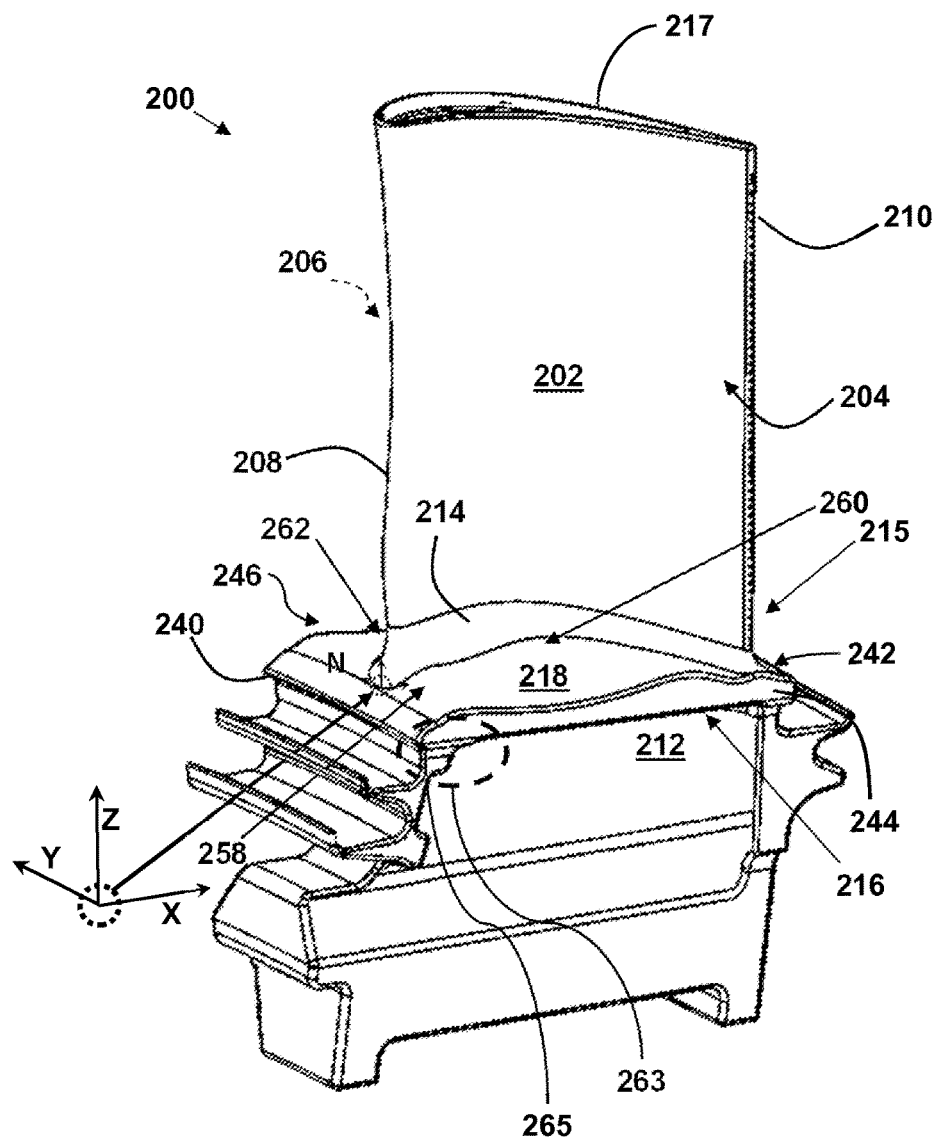
FIG. 4 shows a perspective view of a turbine bucket according to embodiments of the invention disclosed herein.

As can be seen in FIGS. 3 and 4, recalling that FIG. 3 employs contour lines to represent relative height and/or elevation of a surface of endwall 216, contour 218 of endwall 216 can extend along base 212 in a circumferential direction and/or a longitudinal direction, a radial distance to a surface of endwall 216 varying within contour 218. Base 212 can include opposed endwall leading and trailing edges 240, 242 that can be at and/or upstream of airfoil leading edge 208 and at and/or downstream of airfoil trailing edge 210, respectively. Endwall leading and trailing edges 240, 242 can be opposed, for example, in an axial or longitudinal direction. In addition, base 212 can include circumferentially opposed endwall pressure and suction splitlines 244, 246. It can also be useful to refer to endwall leading and trailing edge regions 248, 250 extending from endwall leading and trailing edges 240, 242, respectively, toward each other in a longitudinal direction and to about halfway therebetween. Further, airfoil 202 can be construed as dividing endwall 216 into pressure and suction side regions 252, 254 extending from pressure and suction sidewalls 204, 206 toward edges 240, 242, 244, 246 of endwall 216. A pitch between centerlines of two airfoils 202 mounted adjacent one another can be substantially equal to about a distance between pressure and suction splitlines 244, 246.

To describe and/or define contour 218, nominal surface N can be used, and a relative distance perpendicular to nominal surface N can be described, or can be provided as coordinates, if so desired, for a series of points along referential surface N. For example, points of larger radius than nominal surface N can be described as positive, and points of smaller radius than nominal surface N can be described as negative. A specific region of change in position and/or radius of the surface of endwall 216 relative to nominal surface N can be called a feature. A feature including primarily positive points can be called an elevation or a bump, and a feature including primarily negative points can be called a recess or a trough. Normalized coordinate values could be used to describe contour 218 in embodiments, such as by using a normalized change in elevation and/or radius relative to nominal surface N as a Z coordinate in a Cartesian coordinate system similar to that used to describe the profile of airfoil 202. For example, a difference from nominal surface N could be normalized with a radius of nominal surface N. X and Y coordinates could then be used to identify the location of the difference in nominal surface N. Alternatively, as in the instant disclosure, specific features of endwall contour 218 can be described relative to dimensions of airfoil 202, endwall 216, and/or bucket 200 as a whole.

In embodiments, contour 218 can include at least one feature in pressure side region 252, suction side region 254, leading edge region 248, and/or trailing edge region 250. Any such feature can include a bump or a trough as may be suitable and/or desired, particularly as may enhance efficiency, reduce fluid dynamic losses, and/or enhance strength and/or useful life of bucket 200 and/or turbine 10 (FIG. 1). It should be recognized that fillet 214 can be modified to accommodate endwall contour 218 and to reduce fluid dynamic and other losses.

For example, with reference to FIGS. 3 and 4, contour 218 can include a first bump 258 in pressure side region 252, such as on a pressure side of airfoil leading edge 208, as well as a second bump 260 in pressure side region 252, such as at about midchord in pressure side region 252, though embodiments can include only one of first or second bumps 258, 260, as may be desired and/or suitable. In embodiments, first bump 258 can extend along and from pressure sidewall 204 from about leading edge 208 to about an eighth of the way between leading and trailing edges 208, 210. For example, first bump 258 can have a peak at from about 5% chord to about 10% chord in pressure side region 252 and from about 0% to about 5% of pitch away from pressure sidewall 204. In embodiments, first and/or second bump 258, 260 can have a highest relative elevation of from about $3 \cdot 10^{-2}$ to about $9 \cdot 10^{-2}$ times a height of bucket 200 above nominal. Thus, for a bucket 14 inches high, a highest point of first trough 262 can be from about 0.42 inches to about 1.26 inches above nominal. As another example, second bump 260 can have a peak at from about 35% chord to about 55% chord in pressure side region 252 and from about 10% to about 30% of pitch away from pressure sidewall 204. Thus, contour 218 can include at least one pressure side feature, which can include first bump 258 and/or second bump 260. As seen from pressure splitline 244, therefore, and progressing from endwall leading edge 240 to endwall trailing edge 242, endwall 216 in pressure side region 252 can rise into first bump 258, descend to a lower level, rise into second bump 260, and then descend into substantially nominal surface N, particularly along pressure sidewall 204. This is illustrated with the assistance of contour lines and profiles of sections taken along lines A-A, B-B, C-C, and D-D in FIG. 3.

Contour 218 can also include a first trough 262 in suction side region 254, that can extend, for example, from a suction side of airfoil leading edge 208 along suction sidewall 206 to about midchord and/or into suction side region 254. In embodiments, first trough 262 can have a lowest elevation relative to nominal surface N at from about one eighth to about half of the distance between leading edge 240 and trailing edge 242 of base 212, such as proximate and/or at suction sidewall 206 and/or extending into suction side region 254. For example, first trough 262 can have a lowest point at from about 15% chord to about 20% chord from leading edge 208 and at from about 0% to about 10% pitch from suction sidewall 206. In embodiments, a lowest point of first trough 262 can be from about $2 \cdot 10^{-3}$ to about $7 \cdot 10^{-3}$ times a height of bucket 200 below nominal. Thus, for a bucket 14 inches high, a lowest point of first trough 262 can be from about 0.028 inches to about 0.098 inches below nominal. Endwall 216 in suction side region 254, therefore, as viewed from suction splitline 246 and progressing from endwall leading edge 240 to endwall trailing edge 242, can descend from substantially nominal surface N at endwall leading edge 240 into first trough 262, then rise into substantially nominal surface N in trailing edge region 250, particularly proximate suction sidewall 206. This is illustrated with the assistance of contour lines and profiles of sections taken along lines A-A, B-B, C-C, and D-D in FIG. 3.

In embodiments, endwall contour 218 can include a bullnose profile 263 of endwall leading edge 240. For example, endwall contour 218 can descend from at least one of second bump 260, first trough 262, or nominal surface N to a lip 265. Lip 265 in embodiments can have a curved profile, such as a semi-cylindrical profile, as viewed along the circumferential direction. Since endwall contour 218 varies along endwall leading edge 240, bullnose profile 263 can also vary, though lip 265 can be substantially consistent. Using such a bullnose profile 263 in embodiments can further enhance flow over endwall 216 and/or airfoil 202 and/or through flow passage 219. This is illustrated with the assistance of contour lines and profiles of sections taken along lines A-A, B-B, C-C, and D-D in FIG. 3.

Figure 5:
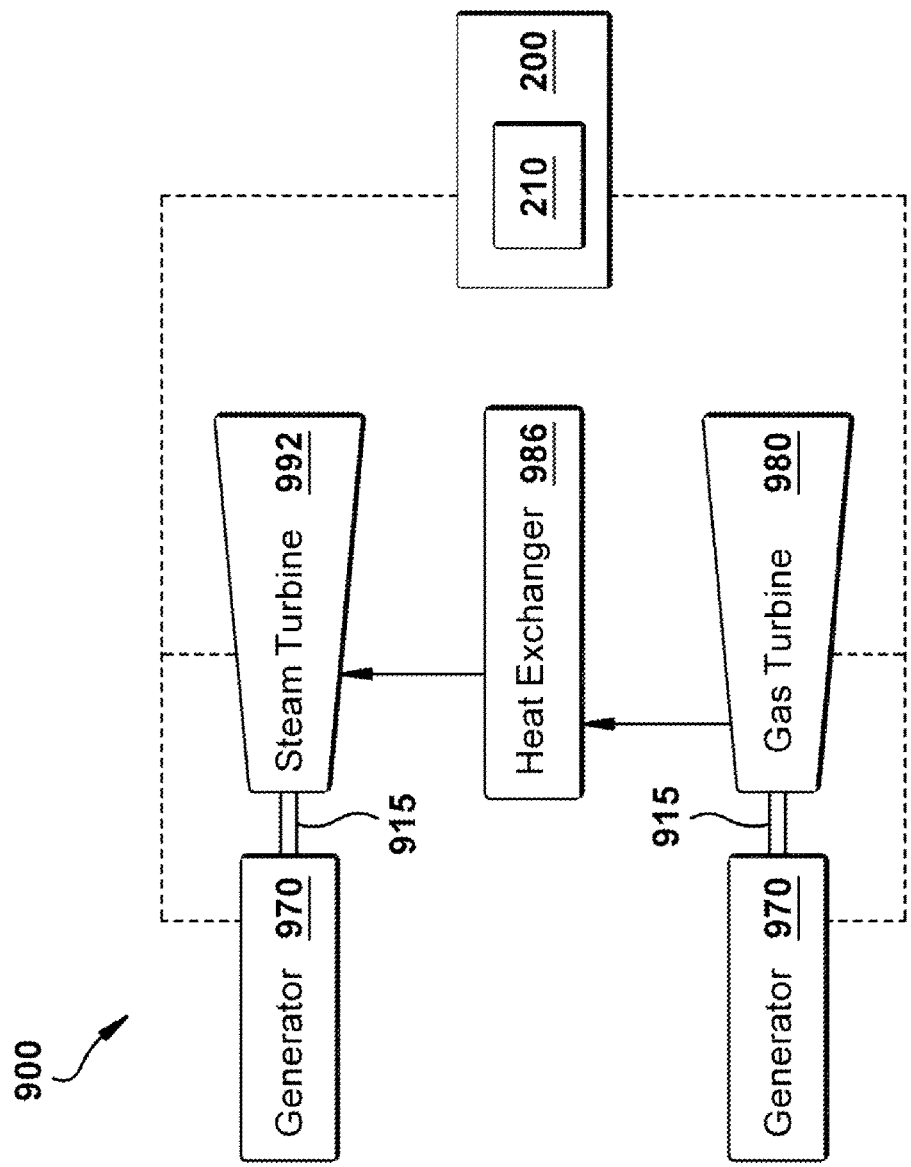
FIG. 5 shows a schematic block diagram illustrating portions of a combined cycle power plant system in which embodiments of the invention disclosed herein can be used.
Figure 6:
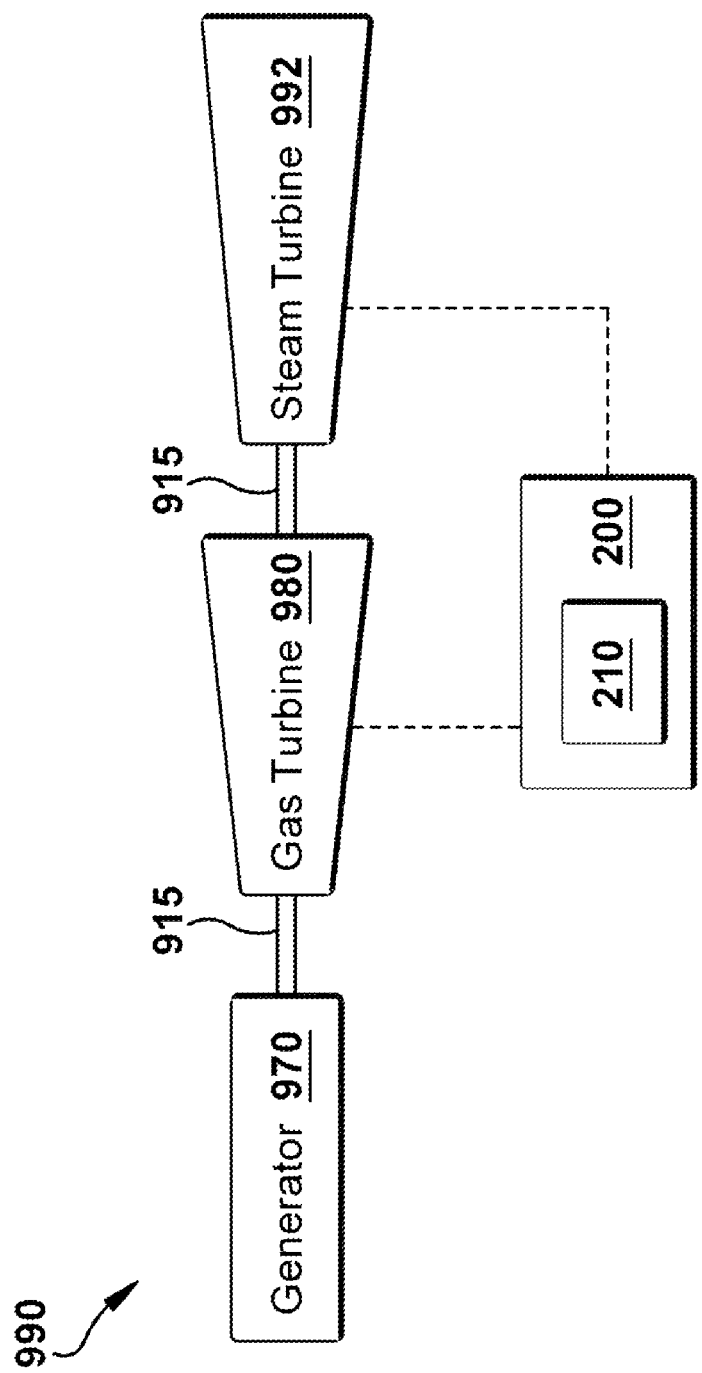
FIG. 6 shows a schematic block diagram illustrating portions of a single-shaft combined cycle power plant system in which embodiments of the invention disclosed herein can be used.

Turning to FIG. 5, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 5 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more buckets 200 as shown and described with reference to FIGS. 2-4 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 6, a single shaft combined cycle power plant 990 may include a single generator 970 coupled to both gas turbine 980 and steam turbine 992 via a single shaft 915. Steam turbine 992 and/or gas turbine 980 may include one or more buckets 200 shown and described with reference to FIGS. 2-4 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

TABLE I

| | Non-Dimensionalized (X Y Z/Span) | | | |
|---|---|---|---|---|
| N | Location | X | Y | Z |
| 1 | suction-side | −0.01216 | 0.02917 | 0.00000 |
| 2 | suction-side | −0.01146 | 0.04003 | 0.00000 |
| 3 | suction-side | −0.01108 | 0.01829 | 0.00000 |
| 4 | suction-side | −0.00946 | 0.05073 | 0.00000 |
| 5 | suction-side | −0.00727 | 0.00810 | 0.00000 |
| 6 | suction-side | −0.00652 | 0.06124 | 0.00000 |
| 7 | suction-side | −0.00289 | 0.07150 | 0.00000 |
| 8 | suction-side | 0.00000 | 0.00000 | 0.00000 |
| 9 | suction-side | 0.00132 | 0.08149 | 0.00000 |
| 10 | suction-side | 0.00602 | 0.09124 | 0.00000 |
| 11 | suction-side | 0.01110 | 0.10076 | 0.00000 |
| 12 | suction-side | 0.01655 | 0.11009 | 0.00000 |
| 13 | suction-side | 0.02234 | 0.11924 | 0.00000 |
| 14 | suction-side | 0.02844 | 0.12820 | 0.00000 |
| 15 | suction-side | 0.03480 | 0.13694 | 0.00000 |
| 16 | suction-side | 0.04142 | 0.14550 | 0.00000 |

TABLE I-continued

Non-Dimensionalized (X Y Z/Span)

| N | Location | X | Y | Z |
|---|---|---|---|---|
| 17 | suction-side | 0.04828 | 0.15383 | 0.00000 |
| 18 | suction-side | 0.05535 | 0.16195 | 0.00000 |
| 19 | suction-side | 0.06261 | 0.16987 | 0.00000 |
| 20 | suction-side | 0.07008 | 0.17756 | 0.00000 |
| 21 | suction-side | 0.07776 | 0.18506 | 0.00000 |
| 22 | suction-side | 0.08563 | 0.19235 | 0.00000 |
| 23 | suction-side | 0.09373 | 0.19943 | 0.00000 |
| 24 | suction-side | 0.10203 | 0.20629 | 0.00000 |
| 25 | suction-side | 0.11055 | 0.21294 | 0.00000 |
| 26 | suction-side | 0.11928 | 0.21934 | 0.00000 |
| 27 | suction-side | 0.12821 | 0.22547 | 0.00000 |
| 28 | suction-side | 0.13732 | 0.23133 | 0.00000 |
| 29 | suction-side | 0.14661 | 0.23686 | 0.00000 |
| 30 | suction-side | 0.15607 | 0.24207 | 0.00000 |
| 31 | suction-side | 0.16570 | 0.24691 | 0.00000 |
| 32 | suction-side | 0.17554 | 0.25140 | 0.00000 |
| 33 | suction-side | 0.18557 | 0.25551 | 0.00000 |
| 34 | suction-side | 0.19578 | 0.25919 | 0.00000 |
| 35 | suction-side | 0.20615 | 0.26239 | 0.00000 |
| 36 | suction-side | 0.21663 | 0.26509 | 0.00000 |
| 37 | suction-side | 0.22721 | 0.26724 | 0.00000 |
| 38 | suction-side | 0.23788 | 0.26882 | 0.00000 |
| 39 | suction-side | 0.24866 | 0.26981 | 0.00000 |
| 40 | suction-side | 0.25953 | 0.27014 | 0.00000 |
| 41 | suction-side | 0.27038 | 0.26981 | 0.00000 |
| 42 | suction-side | 0.28115 | 0.26881 | 0.00000 |
| 43 | suction-side | 0.29178 | 0.26710 | 0.00000 |
| 44 | suction-side | 0.30226 | 0.26473 | 0.00000 |
| 45 | suction-side | 0.31260 | 0.26167 | 0.00000 |
| 46 | suction-side | 0.32280 | 0.25794 | 0.00000 |
| 47 | suction-side | 0.33277 | 0.25357 | 0.00000 |
| 48 | suction-side | 0.34243 | 0.24862 | 0.00000 |
| 49 | suction-side | 0.35178 | 0.24315 | 0.00000 |
| 50 | suction-side | 0.36084 | 0.23717 | 0.00000 |
| 51 | suction-side | 0.36958 | 0.23076 | 0.00000 |
| 52 | suction-side | 0.37804 | 0.22392 | 0.00000 |
| 53 | suction-side | 0.38618 | 0.21674 | 0.00000 |
| 54 | suction-side | 0.39400 | 0.20928 | 0.00000 |
| 55 | suction-side | 0.40153 | 0.20157 | 0.00000 |
| 56 | suction-side | 0.40879 | 0.19361 | 0.00000 |
| 57 | suction-side | 0.41580 | 0.18543 | 0.00000 |
| 58 | suction-side | 0.42259 | 0.17706 | 0.00000 |
| 59 | suction-side | 0.42915 | 0.16849 | 0.00000 |
| 60 | suction-side | 0.43554 | 0.15974 | 0.00000 |
| 61 | suction-side | 0.44176 | 0.15086 | 0.00000 |
| 62 | suction-side | 0.44779 | 0.14185 | 0.00000 |
| 63 | suction-side | 0.45365 | 0.13275 | 0.00000 |
| 64 | suction-side | 0.45936 | 0.12356 | 0.00000 |
| 65 | suction-side | 0.46493 | 0.11427 | 0.00000 |
| 66 | suction-side | 0.47036 | 0.10491 | 0.00000 |
| 67 | suction-side | 0.47566 | 0.09546 | 0.00000 |
| 68 | suction-side | 0.48084 | 0.08596 | 0.00000 |
| 69 | suction-side | 0.48591 | 0.07638 | 0.00000 |
| 70 | suction-side | 0.49089 | 0.06676 | 0.00000 |
| 71 | suction-side | 0.49577 | 0.05709 | 0.00000 |
| 72 | suction-side | 0.50058 | 0.04738 | 0.00000 |
| 73 | suction-side | 0.50532 | 0.03763 | 0.00000 |
| 74 | suction-side | 0.50999 | 0.02785 | 0.00000 |
| 75 | suction-side | 0.51458 | 0.01803 | 0.00000 |
| 76 | suction-side | 0.51910 | 0.00820 | 0.00000 |
| 77 | suction-side | 0.52357 | −0.00167 | 0.00000 |
| 78 | suction-side | 0.52799 | −0.01156 | 0.00000 |
| 79 | suction-side | 0.53236 | −0.02148 | 0.00000 |
| 80 | suction-side | 0.53668 | −0.03141 | 0.00000 |
| 81 | suction-side | 0.54096 | −0.04136 | 0.00000 |
| 82 | suction-side | 0.54519 | −0.05133 | 0.00000 |
| 83 | suction-side | 0.54941 | −0.06132 | 0.00000 |
| 84 | suction-side | 0.55360 | −0.07131 | 0.00000 |
| 85 | suction-side | 0.55778 | −0.08131 | 0.00000 |
| 86 | suction-side | 0.56195 | −0.09132 | 0.00000 |
| 87 | suction-side | 0.56610 | −0.10132 | 0.00000 |
| 88 | suction-side | 0.57023 | −0.11134 | 0.00000 |
| 89 | suction-side | 0.57435 | −0.12137 | 0.00000 |
| 90 | suction-side | 0.57846 | −0.13139 | 0.00000 |
| 91 | suction-side | 0.58254 | −0.14142 | 0.00000 |
| 92 | suction-side | 0.58660 | −0.15147 | 0.00000 |
| 93 | suction-side | 0.59065 | −0.16152 | 0.00000 |
| 94 | suction-side | 0.59467 | −0.17159 | 0.00000 |
| 95 | suction-side | 0.59714 | −0.20526 | 0.00000 |
| 96 | suction-side | 0.59866 | −0.18167 | 0.00000 |
| 97 | suction-side | 0.60047 | −0.20296 | 0.00000 |
| 98 | suction-side | 0.60262 | −0.19175 | 0.00000 |
| 99 | suction-side | 0.60272 | −0.19963 | 0.00000 |
| 100 | suction-side | 0.60343 | −0.19570 | 0.00000 |
| 101 | pressure-side | 0.00000 | 0.00000 | 0.00000 |
| 102 | pressure-side | 0.00636 | −0.00385 | 0.00000 |
| 103 | pressure-side | 0.01318 | −0.00668 | 0.00000 |
| 104 | pressure-side | 0.02037 | −0.00849 | 0.00000 |
| 105 | pressure-side | 0.02774 | −0.00942 | 0.00000 |
| 106 | pressure-side | 0.03518 | −0.00959 | 0.00000 |
| 107 | pressure-side | 0.04258 | −0.00920 | 0.00000 |
| 108 | pressure-side | 0.04994 | −0.00840 | 0.00000 |
| 109 | pressure-side | 0.05722 | −0.00727 | 0.00000 |
| 110 | pressure-side | 0.06445 | −0.00587 | 0.00000 |
| 111 | pressure-side | 0.07163 | −0.00425 | 0.00000 |
| 112 | pressure-side | 0.07878 | −0.00248 | 0.00000 |
| 113 | pressure-side | 0.08590 | −0.00062 | 0.00000 |
| 114 | pressure-side | 0.09302 | 0.00132 | 0.00000 |
| 115 | pressure-side | 0.10012 | 0.00330 | 0.00000 |
| 116 | pressure-side | 0.10721 | 0.00534 | 0.00000 |
| 117 | pressure-side | 0.11430 | 0.00739 | 0.00000 |
| 118 | pressure-side | 0.12139 | 0.00945 | 0.00000 |
| 119 | pressure-side | 0.12849 | 0.01149 | 0.00000 |
| 120 | pressure-side | 0.13558 | 0.01351 | 0.00000 |
| 121 | pressure-side | 0.14269 | 0.01551 | 0.00000 |
| 122 | pressure-side | 0.14979 | 0.01747 | 0.00000 |
| 123 | pressure-side | 0.15692 | 0.01938 | 0.00000 |
| 124 | pressure-side | 0.16407 | 0.02125 | 0.00000 |
| 125 | pressure-side | 0.17122 | 0.02304 | 0.00000 |
| 126 | pressure-side | 0.17839 | 0.02478 | 0.00000 |
| 127 | pressure-side | 0.18559 | 0.02643 | 0.00000 |
| 128 | pressure-side | 0.19281 | 0.02801 | 0.00000 |
| 129 | pressure-side | 0.20005 | 0.02951 | 0.00000 |
| 130 | pressure-side | 0.20730 | 0.03091 | 0.00000 |
| 131 | pressure-side | 0.21456 | 0.03222 | 0.00000 |
| 132 | pressure-side | 0.22186 | 0.03341 | 0.00000 |
| 133 | pressure-side | 0.22915 | 0.03452 | 0.00000 |
| 134 | pressure-side | 0.23644 | 0.03549 | 0.00000 |
| 135 | pressure-side | 0.24375 | 0.03634 | 0.00000 |
| 136 | pressure-side | 0.25107 | 0.03707 | 0.00000 |
| 137 | pressure-side | 0.25840 | 0.03767 | 0.00000 |
| 138 | pressure-side | 0.26572 | 0.03813 | 0.00000 |
| 139 | pressure-side | 0.27304 | 0.03845 | 0.00000 |
| 140 | pressure-side | 0.28035 | 0.03862 | 0.00000 |
| 141 | pressure-side | 0.28767 | 0.03865 | 0.00000 |
| 142 | pressure-side | 0.29496 | 0.03851 | 0.00000 |
| 143 | pressure-side | 0.30227 | 0.03821 | 0.00000 |
| 144 | pressure-side | 0.30957 | 0.03773 | 0.00000 |
| 145 | pressure-side | 0.31686 | 0.03707 | 0.00000 |
| 146 | pressure-side | 0.32415 | 0.03624 | 0.00000 |
| 147 | pressure-side | 0.33143 | 0.03522 | 0.00000 |
| 148 | pressure-side | 0.33871 | 0.03400 | 0.00000 |
| 149 | pressure-side | 0.34598 | 0.03258 | 0.00000 |
| 150 | pressure-side | 0.35319 | 0.03096 | 0.00000 |
| 151 | pressure-side | 0.36031 | 0.02915 | 0.00000 |
| 152 | pressure-side | 0.36736 | 0.02712 | 0.00000 |
| 153 | pressure-side | 0.37432 | 0.02491 | 0.00000 |
| 154 | pressure-side | 0.38121 | 0.02250 | 0.00000 |
| 155 | pressure-side | 0.38803 | 0.01990 | 0.00000 |
| 156 | pressure-side | 0.39475 | 0.01709 | 0.00000 |
| 157 | pressure-side | 0.40141 | 0.01407 | 0.00000 |
| 158 | pressure-side | 0.40797 | 0.01085 | 0.00000 |
| 159 | pressure-side | 0.41445 | 0.00742 | 0.00000 |
| 160 | pressure-side | 0.42085 | 0.00380 | 0.00000 |
| 161 | pressure-side | 0.42716 | −0.00003 | 0.00000 |
| 162 | pressure-side | 0.43336 | −0.00403 | 0.00000 |
| 163 | pressure-side | 0.43945 | −0.00823 | 0.00000 |
| 164 | pressure-side | 0.44540 | −0.01258 | 0.00000 |
| 165 | pressure-side | 0.45123 | −0.01709 | 0.00000 |
| 166 | pressure-side | 0.45692 | −0.02172 | 0.00000 |
| 167 | pressure-side | 0.46249 | −0.02650 | 0.00000 |
| 168 | pressure-side | 0.46792 | −0.03141 | 0.00000 |

TABLE I-continued

Non-Dimensionalized (X Y Z/Span)

| N | Location | X | Y | Z |
|---|---|---|---|---|
| 169 | pressure-side | 0.47323 | −0.03645 | 0.00000 |
| 170 | pressure-side | 0.47843 | −0.04162 | 0.00000 |
| 171 | pressure-side | 0.48351 | −0.04692 | 0.00000 |
| 172 | pressure-side | 0.48849 | −0.05233 | 0.00000 |
| 173 | pressure-side | 0.49336 | −0.05786 | 0.00000 |
| 174 | pressure-side | 0.49813 | −0.06349 | 0.00000 |
| 175 | pressure-side | 0.50279 | −0.06922 | 0.00000 |
| 176 | pressure-side | 0.50734 | −0.07502 | 0.00000 |
| 177 | pressure-side | 0.51181 | −0.08089 | 0.00000 |
| 178 | pressure-side | 0.51616 | −0.08684 | 0.00000 |
| 179 | pressure-side | 0.52042 | −0.09282 | 0.00000 |
| 180 | pressure-side | 0.52460 | −0.09885 | 0.00000 |
| 181 | pressure-side | 0.52869 | −0.10494 | 0.00000 |
| 182 | pressure-side | 0.53273 | −0.11107 | 0.00000 |
| 183 | pressure-side | 0.53668 | −0.11726 | 0.00000 |
| 184 | pressure-side | 0.54055 | −0.12348 | 0.00000 |
| 185 | pressure-side | 0.54439 | −0.12974 | 0.00000 |
| 186 | pressure-side | 0.54815 | −0.13602 | 0.00000 |
| 187 | pressure-side | 0.55185 | −0.14236 | 0.00000 |
| 188 | pressure-side | 0.55551 | −0.14872 | 0.00000 |
| 189 | pressure-side | 0.55913 | −0.15511 | 0.00000 |
| 190 | pressure-side | 0.56271 | −0.16152 | 0.00000 |
| 191 | pressure-side | 0.56624 | −0.16796 | 0.00000 |
| 192 | pressure-side | 0.56973 | −0.17442 | 0.00000 |
| 193 | pressure-side | 0.57319 | −0.18091 | 0.00000 |
| 194 | pressure-side | 0.57661 | −0.18741 | 0.00000 |
| 195 | pressure-side | 0.58001 | −0.19393 | 0.00000 |
| 196 | pressure-side | 0.58338 | −0.20046 | 0.00000 |
| 197 | pressure-side | 0.58582 | −0.20369 | 0.00000 |
| 198 | pressure-side | 0.58927 | −0.20576 | 0.00000 |
| 199 | pressure-side | 0.59325 | −0.20625 | 0.00000 |
| 200 | pressure-side | 0.59714 | −0.20526 | 0.00000 |
| 1 | suction-side | −0.01080 | 0.04918 | 0.10000 |
| 2 | suction-side | −0.01073 | 0.03789 | 0.10000 |
| 3 | suction-side | −0.00962 | 0.06033 | 0.10000 |
| 4 | suction-side | −0.00892 | 0.02675 | 0.10000 |
| 5 | suction-side | −0.00751 | 0.07134 | 0.10000 |
| 6 | suction-side | −0.00465 | 0.08221 | 0.10000 |
| 7 | suction-side | −0.00451 | 0.01638 | 0.10000 |
| 8 | suction-side | −0.00119 | 0.09289 | 0.10000 |
| 9 | suction-side | 0.00279 | 0.10335 | 0.10000 |
| 10 | suction-side | 0.00332 | 0.00830 | 0.10000 |
| 11 | suction-side | 0.00721 | 0.11358 | 0.10000 |
| 12 | suction-side | 0.01202 | 0.12362 | 0.10000 |
| 13 | suction-side | 0.01723 | 0.13348 | 0.10000 |
| 14 | suction-side | 0.02280 | 0.14320 | 0.10000 |
| 15 | suction-side | 0.02870 | 0.15274 | 0.10000 |
| 16 | suction-side | 0.03492 | 0.16206 | 0.10000 |
| 17 | suction-side | 0.04139 | 0.17113 | 0.10000 |
| 18 | suction-side | 0.04814 | 0.17996 | 0.10000 |
| 19 | suction-side | 0.05515 | 0.18857 | 0.10000 |
| 20 | suction-side | 0.06241 | 0.19694 | 0.10000 |
| 21 | suction-side | 0.06992 | 0.20509 | 0.10000 |
| 22 | suction-side | 0.07772 | 0.21298 | 0.10000 |
| 23 | suction-side | 0.08577 | 0.22063 | 0.10000 |
| 24 | suction-side | 0.09410 | 0.22804 | 0.10000 |
| 25 | suction-side | 0.10273 | 0.23518 | 0.10000 |
| 26 | suction-side | 0.11160 | 0.24200 | 0.10000 |
| 27 | suction-side | 0.12071 | 0.24849 | 0.10000 |
| 28 | suction-side | 0.13004 | 0.25462 | 0.10000 |
| 29 | suction-side | 0.13961 | 0.26035 | 0.10000 |
| 30 | suction-side | 0.14941 | 0.26568 | 0.10000 |
| 31 | suction-side | 0.15943 | 0.27057 | 0.10000 |
| 32 | suction-side | 0.16971 | 0.27502 | 0.10000 |
| 33 | suction-side | 0.18022 | 0.27900 | 0.10000 |
| 34 | suction-side | 0.19090 | 0.28242 | 0.10000 |
| 35 | suction-side | 0.20170 | 0.28526 | 0.10000 |
| 36 | suction-side | 0.21262 | 0.28751 | 0.10000 |
| 37 | suction-side | 0.22365 | 0.28914 | 0.10000 |
| 38 | suction-side | 0.23483 | 0.29011 | 0.10000 |
| 39 | suction-side | 0.24606 | 0.29041 | 0.10000 |
| 40 | suction-side | 0.25728 | 0.29004 | 0.10000 |
| 41 | suction-side | 0.26836 | 0.28896 | 0.10000 |
| 42 | suction-side | 0.27933 | 0.28718 | 0.10000 |
| 43 | suction-side | 0.29018 | 0.28473 | 0.10000 |
| 44 | suction-side | 0.30095 | 0.28158 | 0.10000 |
| 45 | suction-side | 0.31153 | 0.27779 | 0.10000 |
| 46 | suction-side | 0.32186 | 0.27339 | 0.10000 |
| 47 | suction-side | 0.33186 | 0.26840 | 0.10000 |
| 48 | suction-side | 0.34160 | 0.26290 | 0.10000 |
| 49 | suction-side | 0.35105 | 0.25690 | 0.10000 |
| 50 | suction-side | 0.36023 | 0.25043 | 0.10000 |
| 51 | suction-side | 0.36911 | 0.24354 | 0.10000 |
| 52 | suction-side | 0.37765 | 0.23631 | 0.10000 |
| 53 | suction-side | 0.38586 | 0.22878 | 0.10000 |
| 54 | suction-side | 0.39377 | 0.22097 | 0.10000 |
| 55 | suction-side | 0.40141 | 0.21290 | 0.10000 |
| 56 | suction-side | 0.40881 | 0.20457 | 0.10000 |
| 57 | suction-side | 0.41597 | 0.19603 | 0.10000 |
| 58 | suction-side | 0.42291 | 0.18725 | 0.10000 |
| 59 | suction-side | 0.42961 | 0.17831 | 0.10000 |
| 60 | suction-side | 0.43612 | 0.16921 | 0.10000 |
| 61 | suction-side | 0.44242 | 0.15997 | 0.10000 |
| 62 | suction-side | 0.44852 | 0.15061 | 0.10000 |
| 63 | suction-side | 0.45445 | 0.14116 | 0.10000 |
| 64 | suction-side | 0.46021 | 0.13162 | 0.10000 |
| 65 | suction-side | 0.46579 | 0.12197 | 0.10000 |
| 66 | suction-side | 0.47123 | 0.11225 | 0.10000 |
| 67 | suction-side | 0.47653 | 0.10246 | 0.10000 |
| 68 | suction-side | 0.48170 | 0.09258 | 0.10000 |
| 69 | suction-side | 0.48676 | 0.08263 | 0.10000 |
| 70 | suction-side | 0.49168 | 0.07262 | 0.10000 |
| 71 | suction-side | 0.49652 | 0.06256 | 0.10000 |
| 72 | suction-side | 0.50126 | 0.05245 | 0.10000 |
| 73 | suction-side | 0.50592 | 0.04230 | 0.10000 |
| 74 | suction-side | 0.51050 | 0.03210 | 0.10000 |
| 75 | suction-side | 0.51498 | 0.02187 | 0.10000 |
| 76 | suction-side | 0.51940 | 0.01160 | 0.10000 |
| 77 | suction-side | 0.52375 | 0.00131 | 0.10000 |
| 78 | suction-side | 0.52805 | −0.00900 | 0.10000 |
| 79 | suction-side | 0.53228 | −0.01935 | 0.10000 |
| 80 | suction-side | 0.53646 | −0.02972 | 0.10000 |
| 81 | suction-side | 0.54061 | −0.04010 | 0.10000 |
| 82 | suction-side | 0.54470 | −0.05050 | 0.10000 |
| 83 | suction-side | 0.54878 | −0.06091 | 0.10000 |
| 84 | suction-side | 0.55283 | −0.07133 | 0.10000 |
| 85 | suction-side | 0.55685 | −0.08175 | 0.10000 |
| 86 | suction-side | 0.56087 | −0.09218 | 0.10000 |
| 87 | suction-side | 0.56488 | −0.10261 | 0.10000 |
| 88 | suction-side | 0.56887 | −0.11305 | 0.10000 |
| 89 | suction-side | 0.57286 | −0.12349 | 0.10000 |
| 90 | suction-side | 0.57682 | −0.13394 | 0.10000 |
| 91 | suction-side | 0.58077 | −0.14440 | 0.10000 |
| 92 | suction-side | 0.58470 | −0.15486 | 0.10000 |
| 93 | suction-side | 0.58862 | −0.16533 | 0.10000 |
| 94 | suction-side | 0.59251 | −0.17581 | 0.10000 |
| 95 | suction-side | 0.59438 | −0.21023 | 0.10000 |
| 96 | suction-side | 0.59639 | −0.18629 | 0.10000 |
| 97 | suction-side | 0.59780 | −0.20800 | 0.10000 |
| 98 | suction-side | 0.60015 | −0.20471 | 0.10000 |
| 99 | suction-side | 0.60024 | −0.19679 | 0.10000 |
| 100 | suction-side | 0.60096 | −0.20078 | 0.10000 |
| 101 | pressure-side | 0.00332 | 0.00830 | 0.10000 |
| 102 | pressure-side | 0.00991 | 0.00471 | 0.10000 |
| 103 | pressure-side | 0.01693 | 0.00220 | 0.10000 |
| 104 | pressure-side | 0.02429 | 0.00083 | 0.10000 |
| 105 | pressure-side | 0.03176 | 0.00050 | 0.10000 |
| 106 | pressure-side | 0.03923 | 0.00101 | 0.10000 |
| 107 | pressure-side | 0.04662 | 0.00211 | 0.10000 |
| 108 | pressure-side | 0.05391 | 0.00362 | 0.10000 |
| 109 | pressure-side | 0.06114 | 0.00543 | 0.10000 |
| 110 | pressure-side | 0.06830 | 0.00747 | 0.10000 |
| 111 | pressure-side | 0.07539 | 0.00968 | 0.10000 |
| 112 | pressure-side | 0.08247 | 0.01200 | 0.10000 |
| 113 | pressure-side | 0.08953 | 0.01436 | 0.10000 |
| 114 | pressure-side | 0.09660 | 0.01674 | 0.10000 |
| 115 | pressure-side | 0.10365 | 0.01912 | 0.10000 |
| 116 | pressure-side | 0.11071 | 0.02149 | 0.10000 |
| 117 | pressure-side | 0.11778 | 0.02385 | 0.10000 |
| 118 | pressure-side | 0.12485 | 0.02616 | 0.10000 |
| 119 | pressure-side | 0.13195 | 0.02841 | 0.10000 |
| 120 | pressure-side | 0.13907 | 0.03061 | 0.10000 |

TABLE I-continued

Non-Dimensionalized (X Y Z/Span)

| N | Location | X | Y | Z |
|---|---|---|---|---|
| 121 | pressure-side | 0.14620 | 0.03272 | 0.10000 |
| 122 | pressure-side | 0.15337 | 0.03476 | 0.10000 |
| 123 | pressure-side | 0.16055 | 0.03671 | 0.10000 |
| 124 | pressure-side | 0.16777 | 0.03858 | 0.10000 |
| 125 | pressure-side | 0.17501 | 0.04035 | 0.10000 |
| 126 | pressure-side | 0.18227 | 0.04200 | 0.10000 |
| 127 | pressure-side | 0.18955 | 0.04355 | 0.10000 |
| 128 | pressure-side | 0.19684 | 0.04497 | 0.10000 |
| 129 | pressure-side | 0.20417 | 0.04629 | 0.10000 |
| 130 | pressure-side | 0.21150 | 0.04747 | 0.10000 |
| 131 | pressure-side | 0.21885 | 0.04853 | 0.10000 |
| 132 | pressure-side | 0.22623 | 0.04946 | 0.10000 |
| 133 | pressure-side | 0.23364 | 0.05025 | 0.10000 |
| 134 | pressure-side | 0.24107 | 0.05090 | 0.10000 |
| 135 | pressure-side | 0.24849 | 0.05140 | 0.10000 |
| 136 | pressure-side | 0.25593 | 0.05175 | 0.10000 |
| 137 | pressure-side | 0.26336 | 0.05195 | 0.10000 |
| 138 | pressure-side | 0.27079 | 0.05197 | 0.10000 |
| 139 | pressure-side | 0.27819 | 0.05186 | 0.10000 |
| 140 | pressure-side | 0.28559 | 0.05156 | 0.10000 |
| 141 | pressure-side | 0.29297 | 0.05110 | 0.10000 |
| 142 | pressure-side | 0.30033 | 0.05047 | 0.10000 |
| 143 | pressure-side | 0.30769 | 0.04965 | 0.10000 |
| 144 | pressure-side | 0.31504 | 0.04866 | 0.10000 |
| 145 | pressure-side | 0.32239 | 0.04747 | 0.10000 |
| 146 | pressure-side | 0.32970 | 0.04609 | 0.10000 |
| 147 | pressure-side | 0.33698 | 0.04452 | 0.10000 |
| 148 | pressure-side | 0.34421 | 0.04277 | 0.10000 |
| 149 | pressure-side | 0.35138 | 0.04082 | 0.10000 |
| 150 | pressure-side | 0.35845 | 0.03868 | 0.10000 |
| 151 | pressure-side | 0.36546 | 0.03635 | 0.10000 |
| 152 | pressure-side | 0.37238 | 0.03384 | 0.10000 |
| 153 | pressure-side | 0.37922 | 0.03114 | 0.10000 |
| 154 | pressure-side | 0.38598 | 0.02824 | 0.10000 |
| 155 | pressure-side | 0.39264 | 0.02517 | 0.10000 |
| 156 | pressure-side | 0.39923 | 0.02191 | 0.10000 |
| 157 | pressure-side | 0.40573 | 0.01845 | 0.10000 |
| 158 | pressure-side | 0.41215 | 0.01480 | 0.10000 |
| 159 | pressure-side | 0.41848 | 0.01097 | 0.10000 |
| 160 | pressure-side | 0.42474 | 0.00695 | 0.10000 |
| 161 | pressure-side | 0.43090 | 0.00274 | 0.10000 |
| 162 | pressure-side | 0.43693 | −0.00161 | 0.10000 |
| 163 | pressure-side | 0.44283 | −0.00610 | 0.10000 |
| 164 | pressure-side | 0.44861 | −0.01074 | 0.10000 |
| 165 | pressure-side | 0.45425 | −0.01552 | 0.10000 |
| 166 | pressure-side | 0.45978 | −0.02043 | 0.10000 |
| 167 | pressure-side | 0.46518 | −0.02547 | 0.10000 |
| 168 | pressure-side | 0.47044 | −0.03064 | 0.10000 |
| 169 | pressure-side | 0.47561 | −0.03592 | 0.10000 |
| 170 | pressure-side | 0.48065 | −0.04132 | 0.10000 |
| 171 | pressure-side | 0.48559 | −0.04685 | 0.10000 |
| 172 | pressure-side | 0.49042 | −0.05248 | 0.10000 |
| 173 | pressure-side | 0.49513 | −0.05821 | 0.10000 |
| 174 | pressure-side | 0.49973 | −0.06405 | 0.10000 |
| 175 | pressure-side | 0.50423 | −0.06997 | 0.10000 |
| 176 | pressure-side | 0.50864 | −0.07597 | 0.10000 |
| 177 | pressure-side | 0.51293 | −0.08204 | 0.10000 |
| 178 | pressure-side | 0.51711 | −0.08817 | 0.10000 |
| 179 | pressure-side | 0.52120 | −0.09434 | 0.10000 |
| 180 | pressure-side | 0.52519 | −0.10058 | 0.10000 |
| 181 | pressure-side | 0.52910 | −0.10685 | 0.10000 |
| 182 | pressure-side | 0.53293 | −0.11317 | 0.10000 |
| 183 | pressure-side | 0.53669 | −0.11953 | 0.10000 |
| 184 | pressure-side | 0.54037 | −0.12595 | 0.10000 |
| 185 | pressure-side | 0.54398 | −0.13239 | 0.10000 |
| 186 | pressure-side | 0.54755 | −0.13887 | 0.10000 |
| 187 | pressure-side | 0.55103 | −0.14539 | 0.10000 |
| 188 | pressure-side | 0.55448 | −0.15192 | 0.10000 |
| 189 | pressure-side | 0.55787 | −0.15849 | 0.10000 |
| 190 | pressure-side | 0.56123 | −0.16508 | 0.10000 |
| 191 | pressure-side | 0.56455 | −0.17170 | 0.10000 |
| 192 | pressure-side | 0.56782 | −0.17835 | 0.10000 |
| 193 | pressure-side | 0.57108 | −0.18500 | 0.10000 |
| 194 | pressure-side | 0.57429 | −0.19166 | 0.10000 |
| 195 | pressure-side | 0.57751 | −0.19835 | 0.10000 |
| 196 | pressure-side | 0.58070 | −0.20503 | 0.10000 |
| 197 | pressure-side | 0.58305 | −0.20834 | 0.10000 |
| 198 | pressure-side | 0.58645 | −0.21053 | 0.10000 |
| 199 | pressure-side | 0.59043 | −0.21113 | 0.10000 |
| 200 | pressure-side | 0.59438 | −0.21023 | 0.10000 |
| 1 | suction-side | −0.00782 | 0.05775 | 0.20000 |
| 2 | suction-side | −0.00735 | 0.04625 | 0.20000 |
| 3 | suction-side | −0.00711 | 0.06916 | 0.20000 |
| 4 | suction-side | −0.00547 | 0.08047 | 0.20000 |
| 5 | suction-side | −0.00523 | 0.03493 | 0.20000 |
| 6 | suction-side | −0.00312 | 0.09167 | 0.20000 |
| 7 | suction-side | −0.00057 | 0.02442 | 0.20000 |
| 8 | suction-side | −0.00011 | 0.10274 | 0.20000 |
| 9 | suction-side | 0.00339 | 0.11361 | 0.20000 |
| 10 | suction-side | 0.00737 | 0.12425 | 0.20000 |
| 11 | suction-side | 0.00754 | 0.01634 | 0.20000 |
| 12 | suction-side | 0.01176 | 0.13472 | 0.20000 |
| 13 | suction-side | 0.01654 | 0.14501 | 0.20000 |
| 14 | suction-side | 0.02172 | 0.15516 | 0.20000 |
| 15 | suction-side | 0.02727 | 0.16513 | 0.20000 |
| 16 | suction-side | 0.03315 | 0.17492 | 0.20000 |
| 17 | suction-side | 0.03937 | 0.18450 | 0.20000 |
| 18 | suction-side | 0.04592 | 0.19384 | 0.20000 |
| 19 | suction-side | 0.05274 | 0.20293 | 0.20000 |
| 20 | suction-side | 0.05986 | 0.21178 | 0.20000 |
| 21 | suction-side | 0.06727 | 0.22036 | 0.20000 |
| 22 | suction-side | 0.07500 | 0.22870 | 0.20000 |
| 23 | suction-side | 0.08306 | 0.23677 | 0.20000 |
| 24 | suction-side | 0.09144 | 0.24457 | 0.20000 |
| 25 | suction-side | 0.10010 | 0.25204 | 0.20000 |
| 26 | suction-side | 0.10902 | 0.25911 | 0.20000 |
| 27 | suction-side | 0.11821 | 0.26580 | 0.20000 |
| 28 | suction-side | 0.12765 | 0.27209 | 0.20000 |
| 29 | suction-side | 0.13739 | 0.27794 | 0.20000 |
| 30 | suction-side | 0.14741 | 0.28334 | 0.20000 |
| 31 | suction-side | 0.15775 | 0.28826 | 0.20000 |
| 32 | suction-side | 0.16832 | 0.29265 | 0.20000 |
| 33 | suction-side | 0.17908 | 0.29646 | 0.20000 |
| 34 | suction-side | 0.19001 | 0.29963 | 0.20000 |
| 35 | suction-side | 0.20108 | 0.30217 | 0.20000 |
| 36 | suction-side | 0.21234 | 0.30405 | 0.20000 |
| 37 | suction-side | 0.22374 | 0.30524 | 0.20000 |
| 38 | suction-side | 0.23515 | 0.30572 | 0.20000 |
| 39 | suction-side | 0.24651 | 0.30545 | 0.20000 |
| 40 | suction-side | 0.25782 | 0.30447 | 0.20000 |
| 41 | suction-side | 0.26905 | 0.30276 | 0.20000 |
| 42 | suction-side | 0.28021 | 0.30033 | 0.20000 |
| 43 | suction-side | 0.29127 | 0.29719 | 0.20000 |
| 44 | suction-side | 0.30207 | 0.29341 | 0.20000 |
| 45 | suction-side | 0.31260 | 0.28904 | 0.20000 |
| 46 | suction-side | 0.32285 | 0.28407 | 0.20000 |
| 47 | suction-side | 0.33287 | 0.27854 | 0.20000 |
| 48 | suction-side | 0.34262 | 0.27251 | 0.20000 |
| 49 | suction-side | 0.35204 | 0.26602 | 0.20000 |
| 50 | suction-side | 0.36113 | 0.25916 | 0.20000 |
| 51 | suction-side | 0.36990 | 0.25195 | 0.20000 |
| 52 | suction-side | 0.37835 | 0.24440 | 0.20000 |
| 53 | suction-side | 0.38652 | 0.23654 | 0.20000 |
| 54 | suction-side | 0.39443 | 0.22839 | 0.20000 |
| 55 | suction-side | 0.40209 | 0.21997 | 0.20000 |
| 56 | suction-side | 0.40951 | 0.21132 | 0.20000 |
| 57 | suction-side | 0.41669 | 0.20244 | 0.20000 |
| 58 | suction-side | 0.42362 | 0.19337 | 0.20000 |
| 59 | suction-side | 0.43034 | 0.18414 | 0.20000 |
| 60 | suction-side | 0.43683 | 0.17476 | 0.20000 |
| 61 | suction-side | 0.44311 | 0.16526 | 0.20000 |
| 62 | suction-side | 0.44918 | 0.15564 | 0.20000 |
| 63 | suction-side | 0.45510 | 0.14589 | 0.20000 |
| 64 | suction-side | 0.46082 | 0.13605 | 0.20000 |
| 65 | suction-side | 0.46640 | 0.12610 | 0.20000 |
| 66 | suction-side | 0.47181 | 0.11607 | 0.20000 |
| 67 | suction-side | 0.47706 | 0.10595 | 0.20000 |
| 68 | suction-side | 0.48220 | 0.09575 | 0.20000 |
| 69 | suction-side | 0.48720 | 0.08550 | 0.20000 |
| 70 | suction-side | 0.49207 | 0.07518 | 0.20000 |
| 71 | suction-side | 0.49683 | 0.06481 | 0.20000 |
| 72 | suction-side | 0.50149 | 0.05440 | 0.20000 |

TABLE I-continued

Non-Dimensionalized (X Y Z/Span)

| N | Location | X | Y | Z |
|---|---|---|---|---|
| 73 | suction-side | 0.50605 | 0.04396 | 0.20000 |
| 74 | suction-side | 0.51052 | 0.03348 | 0.20000 |
| 75 | suction-side | 0.51491 | 0.02297 | 0.20000 |
| 76 | suction-side | 0.51922 | 0.01242 | 0.20000 |
| 77 | suction-side | 0.52344 | 0.00182 | 0.20000 |
| 78 | suction-side | 0.52762 | −0.00879 | 0.20000 |
| 79 | suction-side | 0.53172 | −0.01941 | 0.20000 |
| 80 | suction-side | 0.53577 | −0.03008 | 0.20000 |
| 81 | suction-side | 0.53979 | −0.04075 | 0.20000 |
| 82 | suction-side | 0.54376 | −0.05144 | 0.20000 |
| 83 | suction-side | 0.54770 | −0.06215 | 0.20000 |
| 84 | suction-side | 0.55161 | −0.07287 | 0.20000 |
| 85 | suction-side | 0.55551 | −0.08359 | 0.20000 |
| 86 | suction-side | 0.55941 | −0.09432 | 0.20000 |
| 87 | suction-side | 0.56328 | −0.10504 | 0.20000 |
| 88 | suction-side | 0.56714 | −0.11578 | 0.20000 |
| 89 | suction-side | 0.57101 | −0.12652 | 0.20000 |
| 90 | suction-side | 0.57484 | −0.13726 | 0.20000 |
| 91 | suction-side | 0.57867 | −0.14800 | 0.20000 |
| 92 | suction-side | 0.58248 | −0.15875 | 0.20000 |
| 93 | suction-side | 0.58627 | −0.16952 | 0.20000 |
| 94 | suction-side | 0.59004 | −0.18028 | 0.20000 |
| 95 | suction-side | 0.59142 | −0.21515 | 0.20000 |
| 96 | suction-side | 0.59379 | −0.19106 | 0.20000 |
| 97 | suction-side | 0.59488 | −0.21300 | 0.20000 |
| 98 | suction-side | 0.59730 | −0.20975 | 0.20000 |
| 99 | suction-side | 0.59752 | −0.20184 | 0.20000 |
| 100 | suction-side | 0.59819 | −0.20585 | 0.20000 |
| 101 | pressure-side | 0.00754 | 0.01634 | 0.20000 |
| 102 | pressure-side | 0.01430 | 0.01297 | 0.20000 |
| 103 | pressure-side | 0.02146 | 0.01073 | 0.20000 |
| 104 | pressure-side | 0.02887 | 0.00971 | 0.20000 |
| 105 | pressure-side | 0.03635 | 0.00982 | 0.20000 |
| 106 | pressure-side | 0.04381 | 0.01080 | 0.20000 |
| 107 | pressure-side | 0.05111 | 0.01239 | 0.20000 |
| 108 | pressure-side | 0.05831 | 0.01442 | 0.20000 |
| 109 | pressure-side | 0.06543 | 0.01673 | 0.20000 |
| 110 | pressure-side | 0.07249 | 0.01925 | 0.20000 |
| 111 | pressure-side | 0.07950 | 0.02190 | 0.20000 |
| 112 | pressure-side | 0.08649 | 0.02461 | 0.20000 |
| 113 | pressure-side | 0.09347 | 0.02735 | 0.20000 |
| 114 | pressure-side | 0.10043 | 0.03009 | 0.20000 |
| 115 | pressure-side | 0.10742 | 0.03282 | 0.20000 |
| 116 | pressure-side | 0.11442 | 0.03549 | 0.20000 |
| 117 | pressure-side | 0.12142 | 0.03812 | 0.20000 |
| 118 | pressure-side | 0.12846 | 0.04066 | 0.20000 |
| 119 | pressure-side | 0.13551 | 0.04313 | 0.20000 |
| 120 | pressure-side | 0.14257 | 0.04549 | 0.20000 |
| 121 | pressure-side | 0.14968 | 0.04774 | 0.20000 |
| 122 | pressure-side | 0.15681 | 0.04988 | 0.20000 |
| 123 | pressure-side | 0.16397 | 0.05190 | 0.20000 |
| 124 | pressure-side | 0.17116 | 0.05380 | 0.20000 |
| 125 | pressure-side | 0.17838 | 0.05558 | 0.20000 |
| 126 | pressure-side | 0.18565 | 0.05720 | 0.20000 |
| 127 | pressure-side | 0.19294 | 0.05871 | 0.20000 |
| 128 | pressure-side | 0.20026 | 0.06006 | 0.20000 |
| 129 | pressure-side | 0.20763 | 0.06125 | 0.20000 |
| 130 | pressure-side | 0.21504 | 0.06230 | 0.20000 |
| 131 | pressure-side | 0.22249 | 0.06319 | 0.20000 |
| 132 | pressure-side | 0.22997 | 0.06392 | 0.20000 |
| 133 | pressure-side | 0.23746 | 0.06448 | 0.20000 |
| 134 | pressure-side | 0.24497 | 0.06487 | 0.20000 |
| 135 | pressure-side | 0.25249 | 0.06508 | 0.20000 |
| 136 | pressure-side | 0.25999 | 0.06511 | 0.20000 |
| 137 | pressure-side | 0.26746 | 0.06497 | 0.20000 |
| 138 | pressure-side | 0.27492 | 0.06464 | 0.20000 |
| 139 | pressure-side | 0.28236 | 0.06412 | 0.20000 |
| 140 | pressure-side | 0.28980 | 0.06343 | 0.20000 |
| 141 | pressure-side | 0.29720 | 0.06254 | 0.20000 |
| 142 | pressure-side | 0.30460 | 0.06145 | 0.20000 |
| 143 | pressure-side | 0.31199 | 0.06017 | 0.20000 |
| 144 | pressure-side | 0.31936 | 0.05869 | 0.20000 |
| 145 | pressure-side | 0.32670 | 0.05703 | 0.20000 |
| 146 | pressure-side | 0.33399 | 0.05515 | 0.20000 |
| 147 | pressure-side | 0.34121 | 0.05309 | 0.20000 |
| 148 | pressure-side | 0.34836 | 0.05084 | 0.20000 |
| 149 | pressure-side | 0.35541 | 0.04841 | 0.20000 |
| 150 | pressure-side | 0.36237 | 0.04580 | 0.20000 |
| 151 | pressure-side | 0.36925 | 0.04300 | 0.20000 |
| 152 | pressure-side | 0.37606 | 0.04003 | 0.20000 |
| 153 | pressure-side | 0.38276 | 0.03686 | 0.20000 |
| 154 | pressure-side | 0.38940 | 0.03351 | 0.20000 |
| 155 | pressure-side | 0.39594 | 0.02998 | 0.20000 |
| 156 | pressure-side | 0.40242 | 0.02626 | 0.20000 |
| 157 | pressure-side | 0.40881 | 0.02237 | 0.20000 |
| 158 | pressure-side | 0.41511 | 0.01829 | 0.20000 |
| 159 | pressure-side | 0.42131 | 0.01406 | 0.20000 |
| 160 | pressure-side | 0.42741 | 0.00965 | 0.20000 |
| 161 | pressure-side | 0.43340 | 0.00510 | 0.20000 |
| 162 | pressure-side | 0.43925 | 0.00042 | 0.20000 |
| 163 | pressure-side | 0.44497 | −0.00439 | 0.20000 |
| 164 | pressure-side | 0.45057 | −0.00933 | 0.20000 |
| 165 | pressure-side | 0.45606 | −0.01440 | 0.20000 |
| 166 | pressure-side | 0.46141 | −0.01958 | 0.20000 |
| 167 | pressure-side | 0.46665 | −0.02488 | 0.20000 |
| 168 | pressure-side | 0.47178 | −0.03029 | 0.20000 |
| 169 | pressure-side | 0.47679 | −0.03582 | 0.20000 |
| 170 | pressure-side | 0.48170 | −0.04147 | 0.20000 |
| 171 | pressure-side | 0.48650 | −0.04722 | 0.20000 |
| 172 | pressure-side | 0.49118 | −0.05308 | 0.20000 |
| 173 | pressure-side | 0.49576 | −0.05904 | 0.20000 |
| 174 | pressure-side | 0.50022 | −0.06507 | 0.20000 |
| 175 | pressure-side | 0.50457 | −0.07117 | 0.20000 |
| 176 | pressure-side | 0.50881 | −0.07734 | 0.20000 |
| 177 | pressure-side | 0.51296 | −0.08359 | 0.20000 |
| 178 | pressure-side | 0.51699 | −0.08989 | 0.20000 |
| 179 | pressure-side | 0.52093 | −0.09624 | 0.20000 |
| 180 | pressure-side | 0.52479 | −0.10266 | 0.20000 |
| 181 | pressure-side | 0.52855 | −0.10910 | 0.20000 |
| 182 | pressure-side | 0.53223 | −0.11561 | 0.20000 |
| 183 | pressure-side | 0.53583 | −0.12214 | 0.20000 |
| 184 | pressure-side | 0.53936 | −0.12872 | 0.20000 |
| 185 | pressure-side | 0.54282 | −0.13532 | 0.20000 |
| 186 | pressure-side | 0.54622 | −0.14197 | 0.20000 |
| 187 | pressure-side | 0.54956 | −0.14865 | 0.20000 |
| 188 | pressure-side | 0.55284 | −0.15535 | 0.20000 |
| 189 | pressure-side | 0.55609 | −0.16208 | 0.20000 |
| 190 | pressure-side | 0.55928 | −0.16883 | 0.20000 |
| 191 | pressure-side | 0.56243 | −0.17561 | 0.20000 |
| 192 | pressure-side | 0.56556 | −0.18239 | 0.20000 |
| 193 | pressure-side | 0.56867 | −0.18919 | 0.20000 |
| 194 | pressure-side | 0.57175 | −0.19601 | 0.20000 |
| 195 | pressure-side | 0.57483 | −0.20283 | 0.20000 |
| 196 | pressure-side | 0.57788 | −0.20965 | 0.20000 |
| 197 | pressure-side | 0.58015 | −0.21303 | 0.20000 |
| 198 | pressure-side | 0.58350 | −0.21527 | 0.20000 |
| 199 | pressure-side | 0.58747 | −0.21597 | 0.20000 |
| 200 | pressure-side | 0.59142 | −0.21515 | 0.20000 |
| 1 | suction-side | −0.00053 | 0.06170 | 0.30000 |
| 2 | suction-side | −0.00046 | 0.05015 | 0.30000 |
| 3 | suction-side | 0.00053 | 0.07315 | 0.30000 |
| 4 | suction-side | 0.00112 | 0.03867 | 0.30000 |
| 5 | suction-side | 0.00246 | 0.08455 | 0.30000 |
| 6 | suction-side | 0.00503 | 0.09581 | 0.30000 |
| 7 | suction-side | 0.00518 | 0.02777 | 0.30000 |
| 8 | suction-side | 0.00816 | 0.10685 | 0.30000 |
| 9 | suction-side | 0.01179 | 0.11772 | 0.30000 |
| 10 | suction-side | 0.01318 | 0.01956 | 0.30000 |
| 11 | suction-side | 0.01585 | 0.12842 | 0.30000 |
| 12 | suction-side | 0.02032 | 0.13895 | 0.30000 |
| 13 | suction-side | 0.02517 | 0.14935 | 0.30000 |
| 14 | suction-side | 0.03040 | 0.15960 | 0.30000 |
| 15 | suction-side | 0.03598 | 0.16968 | 0.30000 |
| 16 | suction-side | 0.04185 | 0.17954 | 0.30000 |
| 17 | suction-side | 0.04803 | 0.18916 | 0.30000 |
| 18 | suction-side | 0.05449 | 0.19857 | 0.30000 |
| 19 | suction-side | 0.06124 | 0.20774 | 0.30000 |
| 20 | suction-side | 0.06827 | 0.21669 | 0.30000 |
| 21 | suction-side | 0.07559 | 0.22542 | 0.30000 |
| 22 | suction-side | 0.08323 | 0.23390 | 0.30000 |
| 23 | suction-side | 0.09119 | 0.24213 | 0.30000 |
| 24 | suction-side | 0.09946 | 0.25010 | 0.30000 |

TABLE I-continued

Non-Dimensionalized (X Y Z/Span)

| N | Location | X | Y | Z |
|---|---|---|---|---|
| 25 | suction-side | 0.10806 | 0.25778 | 0.30000 |
| 26 | suction-side | 0.11691 | 0.26512 | 0.30000 |
| 27 | suction-side | 0.12605 | 0.27205 | 0.30000 |
| 28 | suction-side | 0.13546 | 0.27857 | 0.30000 |
| 29 | suction-side | 0.14516 | 0.28466 | 0.30000 |
| 30 | suction-side | 0.15515 | 0.29028 | 0.30000 |
| 31 | suction-side | 0.16547 | 0.29542 | 0.30000 |
| 32 | suction-side | 0.17607 | 0.30000 | 0.30000 |
| 33 | suction-side | 0.18687 | 0.30398 | 0.30000 |
| 34 | suction-side | 0.19785 | 0.30728 | 0.30000 |
| 35 | suction-side | 0.20902 | 0.30990 | 0.30000 |
| 36 | suction-side | 0.22038 | 0.31178 | 0.30000 |
| 37 | suction-side | 0.23189 | 0.31290 | 0.30000 |
| 38 | suction-side | 0.24338 | 0.31320 | 0.30000 |
| 39 | suction-side | 0.25481 | 0.31270 | 0.30000 |
| 40 | suction-side | 0.26615 | 0.31140 | 0.30000 |
| 41 | suction-side | 0.27745 | 0.30929 | 0.30000 |
| 42 | suction-side | 0.28863 | 0.30639 | 0.30000 |
| 43 | suction-side | 0.29957 | 0.30276 | 0.30000 |
| 44 | suction-side | 0.31023 | 0.29842 | 0.30000 |
| 45 | suction-side | 0.32059 | 0.29347 | 0.30000 |
| 46 | suction-side | 0.33067 | 0.28790 | 0.30000 |
| 47 | suction-side | 0.34046 | 0.28177 | 0.30000 |
| 48 | suction-side | 0.34991 | 0.27515 | 0.30000 |
| 49 | suction-side | 0.35900 | 0.26814 | 0.30000 |
| 50 | suction-side | 0.36774 | 0.26076 | 0.30000 |
| 51 | suction-side | 0.37616 | 0.25305 | 0.30000 |
| 52 | suction-side | 0.38430 | 0.24500 | 0.30000 |
| 53 | suction-side | 0.39215 | 0.23666 | 0.30000 |
| 54 | suction-side | 0.39976 | 0.22804 | 0.30000 |
| 55 | suction-side | 0.40713 | 0.21917 | 0.30000 |
| 56 | suction-side | 0.41421 | 0.21013 | 0.30000 |
| 57 | suction-side | 0.42103 | 0.20094 | 0.30000 |
| 58 | suction-side | 0.42760 | 0.19162 | 0.30000 |
| 59 | suction-side | 0.43395 | 0.18216 | 0.30000 |
| 60 | suction-side | 0.44008 | 0.17259 | 0.30000 |
| 61 | suction-side | 0.44602 | 0.16292 | 0.30000 |
| 62 | suction-side | 0.45179 | 0.15314 | 0.30000 |
| 63 | suction-side | 0.45739 | 0.14328 | 0.30000 |
| 64 | suction-side | 0.46284 | 0.13331 | 0.30000 |
| 65 | suction-side | 0.46813 | 0.12328 | 0.30000 |
| 66 | suction-side | 0.47327 | 0.11315 | 0.30000 |
| 67 | suction-side | 0.47830 | 0.10296 | 0.30000 |
| 68 | suction-side | 0.48318 | 0.09269 | 0.30000 |
| 69 | suction-side | 0.48796 | 0.08237 | 0.30000 |
| 70 | suction-side | 0.49263 | 0.07199 | 0.30000 |
| 71 | suction-side | 0.49721 | 0.06155 | 0.30000 |
| 72 | suction-side | 0.50169 | 0.05106 | 0.30000 |
| 73 | suction-side | 0.50608 | 0.04052 | 0.30000 |
| 74 | suction-side | 0.51039 | 0.02995 | 0.30000 |
| 75 | suction-side | 0.51462 | 0.01934 | 0.30000 |
| 76 | suction-side | 0.51877 | 0.00870 | 0.30000 |
| 77 | suction-side | 0.52286 | −0.00197 | 0.30000 |
| 78 | suction-side | 0.52688 | −0.01265 | 0.30000 |
| 79 | suction-side | 0.53086 | −0.02337 | 0.30000 |
| 80 | suction-side | 0.53478 | −0.03410 | 0.30000 |
| 81 | suction-side | 0.53866 | −0.04485 | 0.30000 |
| 82 | suction-side | 0.54249 | −0.05561 | 0.30000 |
| 83 | suction-side | 0.54630 | −0.06639 | 0.30000 |
| 84 | suction-side | 0.55007 | −0.07717 | 0.30000 |
| 85 | suction-side | 0.55383 | −0.08796 | 0.30000 |
| 86 | suction-side | 0.55758 | −0.09875 | 0.30000 |
| 87 | suction-side | 0.56133 | −0.10953 | 0.30000 |
| 88 | suction-side | 0.56506 | −0.12035 | 0.30000 |
| 89 | suction-side | 0.56878 | −0.13114 | 0.30000 |
| 90 | suction-side | 0.57247 | −0.14195 | 0.30000 |
| 91 | suction-side | 0.57616 | −0.15277 | 0.30000 |
| 92 | suction-side | 0.57982 | −0.16359 | 0.30000 |
| 93 | suction-side | 0.58347 | −0.17442 | 0.30000 |
| 94 | suction-side | 0.58709 | −0.18524 | 0.30000 |
| 95 | suction-side | 0.58802 | −0.21996 | 0.30000 |
| 96 | suction-side | 0.59068 | −0.19610 | 0.30000 |
| 97 | suction-side | 0.59147 | −0.21789 | 0.30000 |
| 98 | suction-side | 0.59389 | −0.21475 | 0.30000 |
| 99 | suction-side | 0.59425 | −0.20694 | 0.30000 |
| 100 | suction-side | 0.59483 | −0.21090 | 0.30000 |
| 101 | pressure-side | 0.01318 | 0.01956 | 0.30000 |
| 102 | pressure-side | 0.02014 | 0.01643 | 0.30000 |
| 103 | pressure-side | 0.02747 | 0.01442 | 0.30000 |
| 104 | pressure-side | 0.03496 | 0.01354 | 0.30000 |
| 105 | pressure-side | 0.04253 | 0.01377 | 0.30000 |
| 106 | pressure-side | 0.05002 | 0.01489 | 0.30000 |
| 107 | pressure-side | 0.05737 | 0.01665 | 0.30000 |
| 108 | pressure-side | 0.06458 | 0.01888 | 0.30000 |
| 109 | pressure-side | 0.07167 | 0.02145 | 0.30000 |
| 110 | pressure-side | 0.07869 | 0.02425 | 0.30000 |
| 111 | pressure-side | 0.08566 | 0.02722 | 0.30000 |
| 112 | pressure-side | 0.09258 | 0.03028 | 0.30000 |
| 113 | pressure-side | 0.09947 | 0.03340 | 0.30000 |
| 114 | pressure-side | 0.10636 | 0.03653 | 0.30000 |
| 115 | pressure-side | 0.11325 | 0.03964 | 0.30000 |
| 116 | pressure-side | 0.12016 | 0.04273 | 0.30000 |
| 117 | pressure-side | 0.12708 | 0.04577 | 0.30000 |
| 118 | pressure-side | 0.13403 | 0.04874 | 0.30000 |
| 119 | pressure-side | 0.14101 | 0.05162 | 0.30000 |
| 120 | pressure-side | 0.14801 | 0.05439 | 0.30000 |
| 121 | pressure-side | 0.15505 | 0.05704 | 0.30000 |
| 122 | pressure-side | 0.16213 | 0.05958 | 0.30000 |
| 123 | pressure-side | 0.16925 | 0.06198 | 0.30000 |
| 124 | pressure-side | 0.17641 | 0.06425 | 0.30000 |
| 125 | pressure-side | 0.18362 | 0.06636 | 0.30000 |
| 126 | pressure-side | 0.19087 | 0.06831 | 0.30000 |
| 127 | pressure-side | 0.19819 | 0.07009 | 0.30000 |
| 128 | pressure-side | 0.20554 | 0.07170 | 0.30000 |
| 129 | pressure-side | 0.21297 | 0.07312 | 0.30000 |
| 130 | pressure-side | 0.22045 | 0.07436 | 0.30000 |
| 131 | pressure-side | 0.22799 | 0.07541 | 0.30000 |
| 132 | pressure-side | 0.23552 | 0.07623 | 0.30000 |
| 133 | pressure-side | 0.24308 | 0.07684 | 0.30000 |
| 134 | pressure-side | 0.25061 | 0.07723 | 0.30000 |
| 135 | pressure-side | 0.25814 | 0.07740 | 0.30000 |
| 136 | pressure-side | 0.26565 | 0.07734 | 0.30000 |
| 137 | pressure-side | 0.27316 | 0.07706 | 0.30000 |
| 138 | pressure-side | 0.28064 | 0.07656 | 0.30000 |
| 139 | pressure-side | 0.28812 | 0.07581 | 0.30000 |
| 140 | pressure-side | 0.29558 | 0.07485 | 0.30000 |
| 141 | pressure-side | 0.30303 | 0.07364 | 0.30000 |
| 142 | pressure-side | 0.31047 | 0.07220 | 0.30000 |
| 143 | pressure-side | 0.31789 | 0.07053 | 0.30000 |
| 144 | pressure-side | 0.32525 | 0.06863 | 0.30000 |
| 145 | pressure-side | 0.33250 | 0.06650 | 0.30000 |
| 146 | pressure-side | 0.33967 | 0.06418 | 0.30000 |
| 147 | pressure-side | 0.34675 | 0.06165 | 0.30000 |
| 148 | pressure-side | 0.35373 | 0.05892 | 0.30000 |
| 149 | pressure-side | 0.36062 | 0.05600 | 0.30000 |
| 150 | pressure-side | 0.36741 | 0.05288 | 0.30000 |
| 151 | pressure-side | 0.37412 | 0.04958 | 0.30000 |
| 152 | pressure-side | 0.38074 | 0.04609 | 0.30000 |
| 153 | pressure-side | 0.38727 | 0.04240 | 0.30000 |
| 154 | pressure-side | 0.39372 | 0.03854 | 0.30000 |
| 155 | pressure-side | 0.40006 | 0.03449 | 0.30000 |
| 156 | pressure-side | 0.40634 | 0.03027 | 0.30000 |
| 157 | pressure-side | 0.41251 | 0.02587 | 0.30000 |
| 158 | pressure-side | 0.41858 | 0.02131 | 0.30000 |
| 159 | pressure-side | 0.42454 | 0.01661 | 0.30000 |
| 160 | pressure-side | 0.43036 | 0.01179 | 0.30000 |
| 161 | pressure-side | 0.43606 | 0.00685 | 0.30000 |
| 162 | pressure-side | 0.44163 | 0.00178 | 0.30000 |
| 163 | pressure-side | 0.44708 | −0.00340 | 0.30000 |
| 164 | pressure-side | 0.45243 | −0.00870 | 0.30000 |
| 165 | pressure-side | 0.45765 | −0.01410 | 0.30000 |
| 166 | pressure-side | 0.46278 | −0.01961 | 0.30000 |
| 167 | pressure-side | 0.46779 | −0.02524 | 0.30000 |
| 168 | pressure-side | 0.47271 | −0.03097 | 0.30000 |
| 169 | pressure-side | 0.47752 | −0.03681 | 0.30000 |
| 170 | pressure-side | 0.48223 | −0.04274 | 0.30000 |
| 171 | pressure-side | 0.48683 | −0.04877 | 0.30000 |
| 172 | pressure-side | 0.49132 | −0.05486 | 0.30000 |
| 173 | pressure-side | 0.49569 | −0.06103 | 0.30000 |
| 174 | pressure-side | 0.49995 | −0.06725 | 0.30000 |
| 175 | pressure-side | 0.50411 | −0.07353 | 0.30000 |
| 176 | pressure-side | 0.50816 | −0.07987 | 0.30000 |

TABLE I-continued

Non-Dimensionalized (X Y Z/Span)

| N | Location | X | Y | Z |
|---|---|---|---|---|
| 177 | pressure-side | 0.51213 | −0.08625 | 0.30000 |
| 178 | pressure-side | 0.51599 | −0.09268 | 0.30000 |
| 179 | pressure-side | 0.51978 | −0.09917 | 0.30000 |
| 180 | pressure-side | 0.52347 | −0.10570 | 0.30000 |
| 181 | pressure-side | 0.52709 | −0.11226 | 0.30000 |
| 182 | pressure-side | 0.53063 | −0.11887 | 0.30000 |
| 183 | pressure-side | 0.53411 | −0.12552 | 0.30000 |
| 184 | pressure-side | 0.53751 | −0.13221 | 0.30000 |
| 185 | pressure-side | 0.54084 | −0.13891 | 0.30000 |
| 186 | pressure-side | 0.54413 | −0.14566 | 0.30000 |
| 187 | pressure-side | 0.54736 | −0.15244 | 0.30000 |
| 188 | pressure-side | 0.55055 | −0.15924 | 0.30000 |
| 189 | pressure-side | 0.55369 | −0.16606 | 0.30000 |
| 190 | pressure-side | 0.55679 | −0.17291 | 0.30000 |
| 191 | pressure-side | 0.55985 | −0.17977 | 0.30000 |
| 192 | pressure-side | 0.56288 | −0.18665 | 0.30000 |
| 193 | pressure-side | 0.56588 | −0.19356 | 0.30000 |
| 194 | pressure-side | 0.56887 | −0.20046 | 0.30000 |
| 195 | pressure-side | 0.57182 | −0.20738 | 0.30000 |
| 196 | pressure-side | 0.57478 | −0.21430 | 0.30000 |
| 197 | pressure-side | 0.57695 | −0.21766 | 0.30000 |
| 198 | pressure-side | 0.58021 | −0.21995 | 0.30000 |
| 199 | pressure-side | 0.58411 | −0.22069 | 0.30000 |
| 200 | pressure-side | 0.58802 | −0.21996 | 0.30000 |
| 1 | suction-side | 0.00685 | 0.05755 | 0.40000 |
| 2 | suction-side | 0.00718 | 0.06903 | 0.40000 |
| 3 | suction-side | 0.00795 | 0.04606 | 0.40000 |
| 4 | suction-side | 0.00857 | 0.08046 | 0.40000 |
| 5 | suction-side | 0.01075 | 0.09173 | 0.40000 |
| 6 | suction-side | 0.01141 | 0.03506 | 0.40000 |
| 7 | suction-side | 0.01354 | 0.10282 | 0.40000 |
| 8 | suction-side | 0.01687 | 0.11373 | 0.40000 |
| 9 | suction-side | 0.01915 | 0.02666 | 0.40000 |
| 10 | suction-side | 0.02066 | 0.12448 | 0.40000 |
| 11 | suction-side | 0.02490 | 0.13512 | 0.40000 |
| 12 | suction-side | 0.02952 | 0.14562 | 0.40000 |
| 13 | suction-side | 0.03452 | 0.15592 | 0.40000 |
| 14 | suction-side | 0.03983 | 0.16603 | 0.40000 |
| 15 | suction-side | 0.04544 | 0.17594 | 0.40000 |
| 16 | suction-side | 0.05136 | 0.18563 | 0.40000 |
| 17 | suction-side | 0.05757 | 0.19511 | 0.40000 |
| 18 | suction-side | 0.06408 | 0.20438 | 0.40000 |
| 19 | suction-side | 0.07088 | 0.21347 | 0.40000 |
| 20 | suction-side | 0.07796 | 0.22234 | 0.40000 |
| 21 | suction-side | 0.08536 | 0.23100 | 0.40000 |
| 22 | suction-side | 0.09307 | 0.23944 | 0.40000 |
| 23 | suction-side | 0.10108 | 0.24764 | 0.40000 |
| 24 | suction-side | 0.10939 | 0.25554 | 0.40000 |
| 25 | suction-side | 0.11795 | 0.26310 | 0.40000 |
| 26 | suction-side | 0.12678 | 0.27031 | 0.40000 |
| 27 | suction-side | 0.13588 | 0.27715 | 0.40000 |
| 28 | suction-side | 0.14529 | 0.28358 | 0.40000 |
| 29 | suction-side | 0.15502 | 0.28962 | 0.40000 |
| 30 | suction-side | 0.16506 | 0.29519 | 0.40000 |
| 31 | suction-side | 0.17537 | 0.30023 | 0.40000 |
| 32 | suction-side | 0.18589 | 0.30468 | 0.40000 |
| 33 | suction-side | 0.19664 | 0.30850 | 0.40000 |
| 34 | suction-side | 0.20761 | 0.31166 | 0.40000 |
| 35 | suction-side | 0.21884 | 0.31409 | 0.40000 |
| 36 | suction-side | 0.23023 | 0.31577 | 0.40000 |
| 37 | suction-side | 0.24160 | 0.31662 | 0.40000 |
| 38 | suction-side | 0.25295 | 0.31662 | 0.40000 |
| 39 | suction-side | 0.26428 | 0.31578 | 0.40000 |
| 40 | suction-side | 0.27558 | 0.31409 | 0.40000 |
| 41 | suction-side | 0.28680 | 0.31155 | 0.40000 |
| 42 | suction-side | 0.29779 | 0.30820 | 0.40000 |
| 43 | suction-side | 0.30848 | 0.30411 | 0.40000 |
| 44 | suction-side | 0.31887 | 0.29929 | 0.40000 |
| 45 | suction-side | 0.32896 | 0.29382 | 0.40000 |
| 46 | suction-side | 0.33873 | 0.28774 | 0.40000 |
| 47 | suction-side | 0.34809 | 0.28118 | 0.40000 |
| 48 | suction-side | 0.35708 | 0.27417 | 0.40000 |
| 49 | suction-side | 0.36572 | 0.26677 | 0.40000 |
| 50 | suction-side | 0.37406 | 0.25897 | 0.40000 |
| 51 | suction-side | 0.38209 | 0.25083 | 0.40000 |
| 52 | suction-side | 0.38984 | 0.24240 | 0.40000 |
| 53 | suction-side | 0.39728 | 0.23371 | 0.40000 |
| 54 | suction-side | 0.40444 | 0.22481 | 0.40000 |
| 55 | suction-side | 0.41133 | 0.21577 | 0.40000 |
| 56 | suction-side | 0.41797 | 0.20655 | 0.40000 |
| 57 | suction-side | 0.42436 | 0.19720 | 0.40000 |
| 58 | suction-side | 0.43053 | 0.18773 | 0.40000 |
| 59 | suction-side | 0.43650 | 0.17814 | 0.40000 |
| 60 | suction-side | 0.44230 | 0.16843 | 0.40000 |
| 61 | suction-side | 0.44792 | 0.15862 | 0.40000 |
| 62 | suction-side | 0.45339 | 0.14872 | 0.40000 |
| 63 | suction-side | 0.45871 | 0.13872 | 0.40000 |
| 64 | suction-side | 0.46390 | 0.12866 | 0.40000 |
| 65 | suction-side | 0.46894 | 0.11849 | 0.40000 |
| 66 | suction-side | 0.47386 | 0.10827 | 0.40000 |
| 67 | suction-side | 0.47867 | 0.09799 | 0.40000 |
| 68 | suction-side | 0.48337 | 0.08764 | 0.40000 |
| 69 | suction-side | 0.48796 | 0.07723 | 0.40000 |
| 70 | suction-side | 0.49246 | 0.06679 | 0.40000 |
| 71 | suction-side | 0.49686 | 0.05630 | 0.40000 |
| 72 | suction-side | 0.50118 | 0.04577 | 0.40000 |
| 73 | suction-side | 0.50542 | 0.03522 | 0.40000 |
| 74 | suction-side | 0.50958 | 0.02464 | 0.40000 |
| 75 | suction-side | 0.51368 | 0.01401 | 0.40000 |
| 76 | suction-side | 0.51771 | 0.00337 | 0.40000 |
| 77 | suction-side | 0.52166 | −0.00728 | 0.40000 |
| 78 | suction-side | 0.52556 | −0.01796 | 0.40000 |
| 79 | suction-side | 0.52943 | −0.02867 | 0.40000 |
| 80 | suction-side | 0.53323 | −0.03940 | 0.40000 |
| 81 | suction-side | 0.53699 | −0.05014 | 0.40000 |
| 82 | suction-side | 0.54071 | −0.06088 | 0.40000 |
| 83 | suction-side | 0.54442 | −0.07164 | 0.40000 |
| 84 | suction-side | 0.54809 | −0.08241 | 0.40000 |
| 85 | suction-side | 0.55174 | −0.09320 | 0.40000 |
| 86 | suction-side | 0.55538 | −0.10398 | 0.40000 |
| 87 | suction-side | 0.55902 | −0.11476 | 0.40000 |
| 88 | suction-side | 0.56264 | −0.12554 | 0.40000 |
| 89 | suction-side | 0.56624 | −0.13634 | 0.40000 |
| 90 | suction-side | 0.56983 | −0.14714 | 0.40000 |
| 91 | suction-side | 0.57339 | −0.15795 | 0.40000 |
| 92 | suction-side | 0.57694 | −0.16876 | 0.40000 |
| 93 | suction-side | 0.58047 | −0.17959 | 0.40000 |
| 94 | suction-side | 0.58396 | −0.19041 | 0.40000 |
| 95 | suction-side | 0.58462 | −0.22478 | 0.40000 |
| 96 | suction-side | 0.58742 | −0.20125 | 0.40000 |
| 97 | suction-side | 0.58801 | −0.22280 | 0.40000 |
| 98 | suction-side | 0.59043 | −0.21974 | 0.40000 |
| 99 | suction-side | 0.59086 | −0.21211 | 0.40000 |
| 100 | suction-side | 0.59138 | −0.21598 | 0.40000 |
| 101 | pressure-side | 0.01915 | 0.02666 | 0.40000 |
| 102 | pressure-side | 0.02623 | 0.02368 | 0.40000 |
| 103 | pressure-side | 0.03363 | 0.02174 | 0.40000 |
| 104 | pressure-side | 0.04118 | 0.02089 | 0.40000 |
| 105 | pressure-side | 0.04877 | 0.02112 | 0.40000 |
| 106 | pressure-side | 0.05634 | 0.02223 | 0.40000 |
| 107 | pressure-side | 0.06378 | 0.02401 | 0.40000 |
| 108 | pressure-side | 0.07106 | 0.02630 | 0.40000 |
| 109 | pressure-side | 0.07822 | 0.02897 | 0.40000 |
| 110 | pressure-side | 0.08527 | 0.03190 | 0.40000 |
| 111 | pressure-side | 0.09222 | 0.03500 | 0.40000 |
| 112 | pressure-side | 0.09913 | 0.03823 | 0.40000 |
| 113 | pressure-side | 0.10600 | 0.04154 | 0.40000 |
| 114 | pressure-side | 0.11287 | 0.04487 | 0.40000 |
| 115 | pressure-side | 0.11971 | 0.04820 | 0.40000 |
| 116 | pressure-side | 0.12659 | 0.05152 | 0.40000 |
| 117 | pressure-side | 0.13347 | 0.05479 | 0.40000 |
| 118 | pressure-side | 0.14038 | 0.05799 | 0.40000 |
| 119 | pressure-side | 0.14732 | 0.06112 | 0.40000 |
| 120 | pressure-side | 0.15430 | 0.06412 | 0.40000 |
| 121 | pressure-side | 0.16132 | 0.06702 | 0.40000 |
| 122 | pressure-side | 0.16837 | 0.06978 | 0.40000 |
| 123 | pressure-side | 0.17548 | 0.07239 | 0.40000 |
| 124 | pressure-side | 0.18263 | 0.07486 | 0.40000 |
| 125 | pressure-side | 0.18984 | 0.07714 | 0.40000 |
| 126 | pressure-side | 0.19709 | 0.07925 | 0.40000 |
| 127 | pressure-side | 0.20441 | 0.08118 | 0.40000 |
| 128 | pressure-side | 0.21178 | 0.08290 | 0.40000 |

TABLE I-continued

Non-Dimensionalized (X Y Z/Span)

| N | Location | X | Y | Z |
|---|---|---|---|---|
| 129 | pressure-side | 0.21923 | 0.08441 | 0.40000 |
| 130 | pressure-side | 0.22674 | 0.08570 | 0.40000 |
| 131 | pressure-side | 0.23430 | 0.08675 | 0.40000 |
| 132 | pressure-side | 0.24190 | 0.08757 | 0.40000 |
| 133 | pressure-side | 0.24948 | 0.08811 | 0.40000 |
| 134 | pressure-side | 0.25705 | 0.08841 | 0.40000 |
| 135 | pressure-side | 0.26461 | 0.08844 | 0.40000 |
| 136 | pressure-side | 0.27214 | 0.08821 | 0.40000 |
| 137 | pressure-side | 0.27966 | 0.08773 | 0.40000 |
| 138 | pressure-side | 0.28715 | 0.08696 | 0.40000 |
| 139 | pressure-side | 0.29465 | 0.08595 | 0.40000 |
| 140 | pressure-side | 0.30211 | 0.08464 | 0.40000 |
| 141 | pressure-side | 0.30955 | 0.08307 | 0.40000 |
| 142 | pressure-side | 0.31696 | 0.08125 | 0.40000 |
| 143 | pressure-side | 0.32431 | 0.07915 | 0.40000 |
| 144 | pressure-side | 0.33156 | 0.07681 | 0.40000 |
| 145 | pressure-side | 0.33868 | 0.07424 | 0.40000 |
| 146 | pressure-side | 0.34570 | 0.07146 | 0.40000 |
| 147 | pressure-side | 0.35263 | 0.06844 | 0.40000 |
| 148 | pressure-side | 0.35943 | 0.06523 | 0.40000 |
| 149 | pressure-side | 0.36614 | 0.06180 | 0.40000 |
| 150 | pressure-side | 0.37274 | 0.05816 | 0.40000 |
| 151 | pressure-side | 0.37926 | 0.05433 | 0.40000 |
| 152 | pressure-side | 0.38568 | 0.05031 | 0.40000 |
| 153 | pressure-side | 0.39198 | 0.04610 | 0.40000 |
| 154 | pressure-side | 0.39820 | 0.04172 | 0.40000 |
| 155 | pressure-side | 0.40430 | 0.03719 | 0.40000 |
| 156 | pressure-side | 0.41029 | 0.03249 | 0.40000 |
| 157 | pressure-side | 0.41616 | 0.02765 | 0.40000 |
| 158 | pressure-side | 0.42190 | 0.02269 | 0.40000 |
| 159 | pressure-side | 0.42754 | 0.01757 | 0.40000 |
| 160 | pressure-side | 0.43306 | 0.01236 | 0.40000 |
| 161 | pressure-side | 0.43844 | 0.00704 | 0.40000 |
| 162 | pressure-side | 0.44374 | 0.00159 | 0.40000 |
| 163 | pressure-side | 0.44892 | −0.00396 | 0.40000 |
| 164 | pressure-side | 0.45399 | −0.00962 | 0.40000 |
| 165 | pressure-side | 0.45897 | −0.01536 | 0.40000 |
| 166 | pressure-side | 0.46384 | −0.02121 | 0.40000 |
| 167 | pressure-side | 0.46861 | −0.02714 | 0.40000 |
| 168 | pressure-side | 0.47326 | −0.03314 | 0.40000 |
| 169 | pressure-side | 0.47782 | −0.03921 | 0.40000 |
| 170 | pressure-side | 0.48228 | −0.04536 | 0.40000 |
| 171 | pressure-side | 0.48661 | −0.05156 | 0.40000 |
| 172 | pressure-side | 0.49086 | −0.05782 | 0.40000 |
| 173 | pressure-side | 0.49500 | −0.06412 | 0.40000 |
| 174 | pressure-side | 0.49905 | −0.07047 | 0.40000 |
| 175 | pressure-side | 0.50301 | −0.07687 | 0.40000 |
| 176 | pressure-side | 0.50688 | −0.08332 | 0.40000 |
| 177 | pressure-side | 0.51067 | −0.08981 | 0.40000 |
| 178 | pressure-side | 0.51439 | −0.09634 | 0.40000 |
| 179 | pressure-side | 0.51803 | −0.10292 | 0.40000 |
| 180 | pressure-side | 0.52160 | −0.10953 | 0.40000 |
| 181 | pressure-side | 0.52509 | −0.11618 | 0.40000 |
| 182 | pressure-side | 0.52854 | −0.12286 | 0.40000 |
| 183 | pressure-side | 0.53191 | −0.12958 | 0.40000 |
| 184 | pressure-side | 0.53521 | −0.13633 | 0.40000 |
| 185 | pressure-side | 0.53849 | −0.14310 | 0.40000 |
| 186 | pressure-side | 0.54169 | −0.14991 | 0.40000 |
| 187 | pressure-side | 0.54485 | −0.15674 | 0.40000 |
| 188 | pressure-side | 0.54796 | −0.16359 | 0.40000 |
| 189 | pressure-side | 0.55103 | −0.17047 | 0.40000 |
| 190 | pressure-side | 0.55408 | −0.17738 | 0.40000 |
| 191 | pressure-side | 0.55708 | −0.18428 | 0.40000 |
| 192 | pressure-side | 0.56005 | −0.19122 | 0.40000 |
| 193 | pressure-side | 0.56299 | −0.19817 | 0.40000 |
| 194 | pressure-side | 0.56591 | −0.20513 | 0.40000 |
| 195 | pressure-side | 0.56881 | −0.21211 | 0.40000 |
| 196 | pressure-side | 0.57170 | −0.21908 | 0.40000 |
| 197 | pressure-side | 0.57379 | −0.22242 | 0.40000 |
| 198 | pressure-side | 0.57695 | −0.22468 | 0.40000 |
| 199 | pressure-side | 0.58077 | −0.22546 | 0.40000 |
| 200 | pressure-side | 0.58462 | −0.22478 | 0.40000 |
| 1 | suction-side | 0.01446 | 0.06876 | 0.50000 |
| 2 | suction-side | 0.01512 | 0.05742 | 0.50000 |
| 3 | suction-side | 0.01516 | 0.08007 | 0.50000 |
| 4 | suction-side | 0.01686 | 0.09129 | 0.50000 |
| 5 | suction-side | 0.01809 | 0.04643 | 0.50000 |
| 6 | suction-side | 0.01931 | 0.10233 | 0.50000 |
| 7 | suction-side | 0.02233 | 0.11318 | 0.50000 |
| 8 | suction-side | 0.02544 | 0.03796 | 0.50000 |
| 9 | suction-side | 0.02586 | 0.12391 | 0.50000 |
| 10 | suction-side | 0.02986 | 0.13446 | 0.50000 |
| 11 | suction-side | 0.03430 | 0.14485 | 0.50000 |
| 12 | suction-side | 0.03911 | 0.15505 | 0.50000 |
| 13 | suction-side | 0.04425 | 0.16506 | 0.50000 |
| 14 | suction-side | 0.04969 | 0.17486 | 0.50000 |
| 15 | suction-side | 0.05544 | 0.18445 | 0.50000 |
| 16 | suction-side | 0.06148 | 0.19386 | 0.50000 |
| 17 | suction-side | 0.06783 | 0.20308 | 0.50000 |
| 18 | suction-side | 0.07446 | 0.21208 | 0.50000 |
| 19 | suction-side | 0.08141 | 0.22089 | 0.50000 |
| 20 | suction-side | 0.08864 | 0.22951 | 0.50000 |
| 21 | suction-side | 0.09618 | 0.23789 | 0.50000 |
| 22 | suction-side | 0.10401 | 0.24603 | 0.50000 |
| 23 | suction-side | 0.11210 | 0.25387 | 0.50000 |
| 24 | suction-side | 0.12046 | 0.26141 | 0.50000 |
| 25 | suction-side | 0.12908 | 0.26860 | 0.50000 |
| 26 | suction-side | 0.13796 | 0.27544 | 0.50000 |
| 27 | suction-side | 0.14715 | 0.28191 | 0.50000 |
| 28 | suction-side | 0.15664 | 0.28800 | 0.50000 |
| 29 | suction-side | 0.16645 | 0.29366 | 0.50000 |
| 30 | suction-side | 0.17651 | 0.29883 | 0.50000 |
| 31 | suction-side | 0.18679 | 0.30345 | 0.50000 |
| 32 | suction-side | 0.19730 | 0.30747 | 0.50000 |
| 33 | suction-side | 0.20804 | 0.31086 | 0.50000 |
| 34 | suction-side | 0.21903 | 0.31357 | 0.50000 |
| 35 | suction-side | 0.23018 | 0.31554 | 0.50000 |
| 36 | suction-side | 0.24142 | 0.31672 | 0.50000 |
| 37 | suction-side | 0.25268 | 0.31706 | 0.50000 |
| 38 | suction-side | 0.26398 | 0.31653 | 0.50000 |
| 39 | suction-side | 0.27524 | 0.31515 | 0.50000 |
| 40 | suction-side | 0.28632 | 0.31290 | 0.50000 |
| 41 | suction-side | 0.29715 | 0.30984 | 0.50000 |
| 42 | suction-side | 0.30773 | 0.30598 | 0.50000 |
| 43 | suction-side | 0.31805 | 0.30134 | 0.50000 |
| 44 | suction-side | 0.32806 | 0.29601 | 0.50000 |
| 45 | suction-side | 0.33768 | 0.29008 | 0.50000 |
| 46 | suction-side | 0.34690 | 0.28364 | 0.50000 |
| 47 | suction-side | 0.35574 | 0.27670 | 0.50000 |
| 48 | suction-side | 0.36424 | 0.26932 | 0.50000 |
| 49 | suction-side | 0.37244 | 0.26154 | 0.50000 |
| 50 | suction-side | 0.38031 | 0.25341 | 0.50000 |
| 51 | suction-side | 0.38784 | 0.24500 | 0.50000 |
| 52 | suction-side | 0.39505 | 0.23639 | 0.50000 |
| 53 | suction-side | 0.40197 | 0.22756 | 0.50000 |
| 54 | suction-side | 0.40863 | 0.21854 | 0.50000 |
| 55 | suction-side | 0.41505 | 0.20936 | 0.50000 |
| 56 | suction-side | 0.42127 | 0.20003 | 0.50000 |
| 57 | suction-side | 0.42727 | 0.19054 | 0.50000 |
| 58 | suction-side | 0.43309 | 0.18094 | 0.50000 |
| 59 | suction-side | 0.43873 | 0.17120 | 0.50000 |
| 60 | suction-side | 0.44421 | 0.16135 | 0.50000 |
| 61 | suction-side | 0.44954 | 0.15142 | 0.50000 |
| 62 | suction-side | 0.45472 | 0.14142 | 0.50000 |
| 63 | suction-side | 0.45978 | 0.13136 | 0.50000 |
| 64 | suction-side | 0.46470 | 0.12124 | 0.50000 |
| 65 | suction-side | 0.46950 | 0.11106 | 0.50000 |
| 66 | suction-side | 0.47418 | 0.10083 | 0.50000 |
| 67 | suction-side | 0.47876 | 0.09055 | 0.50000 |
| 68 | suction-side | 0.48324 | 0.08023 | 0.50000 |
| 69 | suction-side | 0.48763 | 0.06986 | 0.50000 |
| 70 | suction-side | 0.49194 | 0.05947 | 0.50000 |
| 71 | suction-side | 0.49616 | 0.04903 | 0.50000 |
| 72 | suction-side | 0.50031 | 0.03856 | 0.50000 |
| 73 | suction-side | 0.50440 | 0.02807 | 0.50000 |
| 74 | suction-side | 0.50842 | 0.01755 | 0.50000 |
| 75 | suction-side | 0.51238 | 0.00699 | 0.50000 |
| 76 | suction-side | 0.51629 | −0.00358 | 0.50000 |
| 77 | suction-side | 0.52014 | −0.01416 | 0.50000 |
| 78 | suction-side | 0.52393 | −0.02477 | 0.50000 |
| 79 | suction-side | 0.52767 | −0.03538 | 0.50000 |
| 80 | suction-side | 0.53138 | −0.04602 | 0.50000 |

TABLE I-continued

Non-Dimensionalized (X Y Z/Span)

| N | Location | X | Y | Z |
|---|---|---|---|---|
| 81 | suction-side | 0.53504 | −0.05667 | 0.50000 |
| 82 | suction-side | 0.53867 | −0.06734 | 0.50000 |
| 83 | suction-side | 0.54228 | −0.07801 | 0.50000 |
| 84 | suction-side | 0.54587 | −0.08869 | 0.50000 |
| 85 | suction-side | 0.54943 | −0.09937 | 0.50000 |
| 86 | suction-side | 0.55297 | −0.11007 | 0.50000 |
| 87 | suction-side | 0.55652 | −0.12076 | 0.50000 |
| 88 | suction-side | 0.56005 | −0.13146 | 0.50000 |
| 89 | suction-side | 0.56355 | −0.14216 | 0.50000 |
| 90 | suction-side | 0.56706 | −0.15287 | 0.50000 |
| 91 | suction-side | 0.57052 | −0.16359 | 0.50000 |
| 92 | suction-side | 0.57396 | −0.17432 | 0.50000 |
| 93 | suction-side | 0.57738 | −0.18504 | 0.50000 |
| 94 | suction-side | 0.58078 | −0.19578 | 0.50000 |
| 95 | suction-side | 0.58129 | −0.22965 | 0.50000 |
| 96 | suction-side | 0.58414 | −0.20654 | 0.50000 |
| 97 | suction-side | 0.58460 | −0.22774 | 0.50000 |
| 98 | suction-side | 0.58699 | −0.22476 | 0.50000 |
| 99 | suction-side | 0.58746 | −0.21730 | 0.50000 |
| 100 | suction-side | 0.58795 | −0.22109 | 0.50000 |
| 101 | pressure-side | 0.02544 | 0.03796 | 0.50000 |
| 102 | pressure-side | 0.03255 | 0.03498 | 0.50000 |
| 103 | pressure-side | 0.03997 | 0.03305 | 0.50000 |
| 104 | pressure-side | 0.04761 | 0.03220 | 0.50000 |
| 105 | pressure-side | 0.05531 | 0.03238 | 0.50000 |
| 106 | pressure-side | 0.06290 | 0.03342 | 0.50000 |
| 107 | pressure-side | 0.07038 | 0.03516 | 0.50000 |
| 108 | pressure-side | 0.07770 | 0.03740 | 0.50000 |
| 109 | pressure-side | 0.08487 | 0.04001 | 0.50000 |
| 110 | pressure-side | 0.09192 | 0.04292 | 0.50000 |
| 111 | pressure-side | 0.09890 | 0.04600 | 0.50000 |
| 112 | pressure-side | 0.10582 | 0.04922 | 0.50000 |
| 113 | pressure-side | 0.11269 | 0.05253 | 0.50000 |
| 114 | pressure-side | 0.11954 | 0.05588 | 0.50000 |
| 115 | pressure-side | 0.12641 | 0.05925 | 0.50000 |
| 116 | pressure-side | 0.13327 | 0.06260 | 0.50000 |
| 117 | pressure-side | 0.14015 | 0.06592 | 0.50000 |
| 118 | pressure-side | 0.14704 | 0.06916 | 0.50000 |
| 119 | pressure-side | 0.15399 | 0.07232 | 0.50000 |
| 120 | pressure-side | 0.16096 | 0.07539 | 0.50000 |
| 121 | pressure-side | 0.16801 | 0.07832 | 0.50000 |
| 122 | pressure-side | 0.17511 | 0.08112 | 0.50000 |
| 123 | pressure-side | 0.18226 | 0.08378 | 0.50000 |
| 124 | pressure-side | 0.18949 | 0.08626 | 0.50000 |
| 125 | pressure-side | 0.19679 | 0.08856 | 0.50000 |
| 126 | pressure-side | 0.20414 | 0.09064 | 0.50000 |
| 127 | pressure-side | 0.21152 | 0.09251 | 0.50000 |
| 128 | pressure-side | 0.21894 | 0.09414 | 0.50000 |
| 129 | pressure-side | 0.22641 | 0.09554 | 0.50000 |
| 130 | pressure-side | 0.23390 | 0.09667 | 0.50000 |
| 131 | pressure-side | 0.24145 | 0.09755 | 0.50000 |
| 132 | pressure-side | 0.24905 | 0.09815 | 0.50000 |
| 133 | pressure-side | 0.25669 | 0.09847 | 0.50000 |
| 134 | pressure-side | 0.26433 | 0.09849 | 0.50000 |
| 135 | pressure-side | 0.27195 | 0.09824 | 0.50000 |
| 136 | pressure-side | 0.27954 | 0.09768 | 0.50000 |
| 137 | pressure-side | 0.28708 | 0.09683 | 0.50000 |
| 138 | pressure-side | 0.29456 | 0.09567 | 0.50000 |
| 139 | pressure-side | 0.30201 | 0.09422 | 0.50000 |
| 140 | pressure-side | 0.30941 | 0.09248 | 0.50000 |
| 141 | pressure-side | 0.31676 | 0.09045 | 0.50000 |
| 142 | pressure-side | 0.32402 | 0.08816 | 0.50000 |
| 143 | pressure-side | 0.33122 | 0.08557 | 0.50000 |
| 144 | pressure-side | 0.33828 | 0.08274 | 0.50000 |
| 145 | pressure-side | 0.34520 | 0.07969 | 0.50000 |
| 146 | pressure-side | 0.35199 | 0.07640 | 0.50000 |
| 147 | pressure-side | 0.35866 | 0.07289 | 0.50000 |
| 148 | pressure-side | 0.36520 | 0.06919 | 0.50000 |
| 149 | pressure-side | 0.37163 | 0.06528 | 0.50000 |
| 150 | pressure-side | 0.37795 | 0.06119 | 0.50000 |
| 151 | pressure-side | 0.38415 | 0.05689 | 0.50000 |
| 152 | pressure-side | 0.39026 | 0.05242 | 0.50000 |
| 153 | pressure-side | 0.39624 | 0.04778 | 0.50000 |
| 154 | pressure-side | 0.40212 | 0.04297 | 0.50000 |
| 155 | pressure-side | 0.40789 | 0.03802 | 0.50000 |
| 156 | pressure-side | 0.41353 | 0.03294 | 0.50000 |
| 157 | pressure-side | 0.41907 | 0.02771 | 0.50000 |
| 158 | pressure-side | 0.42449 | 0.02237 | 0.50000 |
| 159 | pressure-side | 0.42978 | 0.01693 | 0.50000 |
| 160 | pressure-side | 0.43497 | 0.01137 | 0.50000 |
| 161 | pressure-side | 0.44004 | 0.00574 | 0.50000 |
| 162 | pressure-side | 0.44500 | 0.00001 | 0.50000 |
| 163 | pressure-side | 0.44988 | −0.00581 | 0.50000 |
| 164 | pressure-side | 0.45465 | −0.01172 | 0.50000 |
| 165 | pressure-side | 0.45933 | −0.01770 | 0.50000 |
| 166 | pressure-side | 0.46393 | −0.02378 | 0.50000 |
| 167 | pressure-side | 0.46842 | −0.02991 | 0.50000 |
| 168 | pressure-side | 0.47281 | −0.03610 | 0.50000 |
| 169 | pressure-side | 0.47712 | −0.04234 | 0.50000 |
| 170 | pressure-side | 0.48134 | −0.04866 | 0.50000 |
| 171 | pressure-side | 0.48546 | −0.05500 | 0.50000 |
| 172 | pressure-side | 0.48950 | −0.06141 | 0.50000 |
| 173 | pressure-side | 0.49346 | −0.06784 | 0.50000 |
| 174 | pressure-side | 0.49732 | −0.07432 | 0.50000 |
| 175 | pressure-side | 0.50113 | −0.08083 | 0.50000 |
| 176 | pressure-side | 0.50485 | −0.08740 | 0.50000 |
| 177 | pressure-side | 0.50851 | −0.09399 | 0.50000 |
| 178 | pressure-side | 0.51210 | −0.10060 | 0.50000 |
| 179 | pressure-side | 0.51561 | −0.10727 | 0.50000 |
| 180 | pressure-side | 0.51909 | −0.11396 | 0.50000 |
| 181 | pressure-side | 0.52251 | −0.12066 | 0.50000 |
| 182 | pressure-side | 0.52587 | −0.12741 | 0.50000 |
| 183 | pressure-side | 0.52917 | −0.13419 | 0.50000 |
| 184 | pressure-side | 0.53243 | −0.14098 | 0.50000 |
| 185 | pressure-side | 0.53566 | −0.14780 | 0.50000 |
| 186 | pressure-side | 0.53883 | −0.15463 | 0.50000 |
| 187 | pressure-side | 0.54196 | −0.16150 | 0.50000 |
| 188 | pressure-side | 0.54506 | −0.16837 | 0.50000 |
| 189 | pressure-side | 0.54812 | −0.17528 | 0.50000 |
| 190 | pressure-side | 0.55115 | −0.18220 | 0.50000 |
| 191 | pressure-side | 0.55414 | −0.18913 | 0.50000 |
| 192 | pressure-side | 0.55709 | −0.19608 | 0.50000 |
| 193 | pressure-side | 0.56002 | −0.20305 | 0.50000 |
| 194 | pressure-side | 0.56294 | −0.21002 | 0.50000 |
| 195 | pressure-side | 0.56581 | −0.21702 | 0.50000 |
| 196 | pressure-side | 0.56867 | −0.22402 | 0.50000 |
| 197 | pressure-side | 0.57070 | −0.22728 | 0.50000 |
| 198 | pressure-side | 0.57379 | −0.22951 | 0.50000 |
| 199 | pressure-side | 0.57751 | −0.23030 | 0.50000 |
| 200 | pressure-side | 0.58129 | −0.22965 | 0.50000 |
| 1 | suction-side | 0.02165 | 0.08592 | 0.60000 |
| 2 | suction-side | 0.02221 | 0.07469 | 0.60000 |
| 3 | suction-side | 0.02243 | 0.09704 | 0.60000 |
| 4 | suction-side | 0.02419 | 0.10808 | 0.60000 |
| 5 | suction-side | 0.02504 | 0.06379 | 0.60000 |
| 6 | suction-side | 0.02671 | 0.11900 | 0.60000 |
| 7 | suction-side | 0.02979 | 0.12971 | 0.60000 |
| 8 | suction-side | 0.03216 | 0.05525 | 0.60000 |
| 9 | suction-side | 0.03338 | 0.14022 | 0.60000 |
| 10 | suction-side | 0.03744 | 0.15054 | 0.60000 |
| 11 | suction-side | 0.04195 | 0.16069 | 0.60000 |
| 12 | suction-side | 0.04685 | 0.17068 | 0.60000 |
| 13 | suction-side | 0.05213 | 0.18052 | 0.60000 |
| 14 | suction-side | 0.05773 | 0.19017 | 0.60000 |
| 15 | suction-side | 0.06365 | 0.19957 | 0.60000 |
| 16 | suction-side | 0.06986 | 0.20873 | 0.60000 |
| 17 | suction-side | 0.07640 | 0.21766 | 0.60000 |
| 18 | suction-side | 0.08323 | 0.22635 | 0.60000 |
| 19 | suction-side | 0.09035 | 0.23478 | 0.60000 |
| 20 | suction-side | 0.09778 | 0.24298 | 0.60000 |
| 21 | suction-side | 0.10553 | 0.25090 | 0.60000 |
| 22 | suction-side | 0.11361 | 0.25855 | 0.60000 |
| 23 | suction-side | 0.12203 | 0.26590 | 0.60000 |
| 24 | suction-side | 0.13073 | 0.27291 | 0.60000 |
| 25 | suction-side | 0.13970 | 0.27949 | 0.60000 |
| 26 | suction-side | 0.14892 | 0.28565 | 0.60000 |
| 27 | suction-side | 0.15842 | 0.29136 | 0.60000 |
| 28 | suction-side | 0.16823 | 0.29660 | 0.60000 |
| 29 | suction-side | 0.17835 | 0.30135 | 0.60000 |
| 30 | suction-side | 0.18873 | 0.30555 | 0.60000 |
| 31 | suction-side | 0.19928 | 0.30912 | 0.60000 |
| 32 | suction-side | 0.21001 | 0.31205 | 0.60000 |

TABLE I-continued

Non-Dimensionalized (X Y Z/Span)

| N | Location | X | Y | Z |
|---|---|---|---|---|
| 33 | suction-side | 0.22089 | 0.31428 | 0.60000 |
| 34 | suction-side | 0.23195 | 0.31580 | 0.60000 |
| 35 | suction-side | 0.24310 | 0.31654 | 0.60000 |
| 36 | suction-side | 0.25428 | 0.31650 | 0.60000 |
| 37 | suction-side | 0.26533 | 0.31565 | 0.60000 |
| 38 | suction-side | 0.27626 | 0.31399 | 0.60000 |
| 39 | suction-side | 0.28711 | 0.31150 | 0.60000 |
| 40 | suction-side | 0.29782 | 0.30820 | 0.60000 |
| 41 | suction-side | 0.30826 | 0.30415 | 0.60000 |
| 42 | suction-side | 0.31834 | 0.29942 | 0.60000 |
| 43 | suction-side | 0.32809 | 0.29402 | 0.60000 |
| 44 | suction-side | 0.33752 | 0.28800 | 0.60000 |
| 45 | suction-side | 0.34661 | 0.28144 | 0.60000 |
| 46 | suction-side | 0.35528 | 0.27443 | 0.60000 |
| 47 | suction-side | 0.36357 | 0.26704 | 0.60000 |
| 48 | suction-side | 0.37149 | 0.25929 | 0.60000 |
| 49 | suction-side | 0.37910 | 0.25122 | 0.60000 |
| 50 | suction-side | 0.38642 | 0.24285 | 0.60000 |
| 51 | suction-side | 0.39346 | 0.23422 | 0.60000 |
| 52 | suction-side | 0.40024 | 0.22536 | 0.60000 |
| 53 | suction-side | 0.40674 | 0.21631 | 0.60000 |
| 54 | suction-side | 0.41300 | 0.20714 | 0.60000 |
| 55 | suction-side | 0.41902 | 0.19785 | 0.60000 |
| 56 | suction-side | 0.42482 | 0.18844 | 0.60000 |
| 57 | suction-side | 0.43042 | 0.17895 | 0.60000 |
| 58 | suction-side | 0.43584 | 0.16936 | 0.60000 |
| 59 | suction-side | 0.44110 | 0.15969 | 0.60000 |
| 60 | suction-side | 0.44621 | 0.14994 | 0.60000 |
| 61 | suction-side | 0.45118 | 0.14013 | 0.60000 |
| 62 | suction-side | 0.45603 | 0.13025 | 0.60000 |
| 63 | suction-side | 0.46077 | 0.12032 | 0.60000 |
| 64 | suction-side | 0.46539 | 0.11034 | 0.60000 |
| 65 | suction-side | 0.46991 | 0.10029 | 0.60000 |
| 66 | suction-side | 0.47435 | 0.09021 | 0.60000 |
| 67 | suction-side | 0.47869 | 0.08007 | 0.60000 |
| 68 | suction-side | 0.48295 | 0.06989 | 0.60000 |
| 69 | suction-side | 0.48713 | 0.05968 | 0.60000 |
| 70 | suction-side | 0.49123 | 0.04943 | 0.60000 |
| 71 | suction-side | 0.49528 | 0.03915 | 0.60000 |
| 72 | suction-side | 0.49927 | 0.02884 | 0.60000 |
| 73 | suction-side | 0.50321 | 0.01851 | 0.60000 |
| 74 | suction-side | 0.50709 | 0.00816 | 0.60000 |
| 75 | suction-side | 0.51092 | −0.00221 | 0.60000 |
| 76 | suction-side | 0.51470 | −0.01261 | 0.60000 |
| 77 | suction-side | 0.51841 | −0.02303 | 0.60000 |
| 78 | suction-side | 0.52210 | −0.03345 | 0.60000 |
| 79 | suction-side | 0.52574 | −0.04389 | 0.60000 |
| 80 | suction-side | 0.52935 | −0.05434 | 0.60000 |
| 81 | suction-side | 0.53293 | −0.06481 | 0.60000 |
| 82 | suction-side | 0.53648 | −0.07529 | 0.60000 |
| 83 | suction-side | 0.53999 | −0.08577 | 0.60000 |
| 84 | suction-side | 0.54350 | −0.09627 | 0.60000 |
| 85 | suction-side | 0.54699 | −0.10676 | 0.60000 |
| 86 | suction-side | 0.55046 | −0.11726 | 0.60000 |
| 87 | suction-side | 0.55393 | −0.12777 | 0.60000 |
| 88 | suction-side | 0.55738 | −0.13826 | 0.60000 |
| 89 | suction-side | 0.56083 | −0.14879 | 0.60000 |
| 90 | suction-side | 0.56424 | −0.15930 | 0.60000 |
| 91 | suction-side | 0.56763 | −0.16982 | 0.60000 |
| 92 | suction-side | 0.57101 | −0.18036 | 0.60000 |
| 93 | suction-side | 0.57437 | −0.19090 | 0.60000 |
| 94 | suction-side | 0.57768 | −0.20145 | 0.60000 |
| 95 | suction-side | 0.57820 | −0.23463 | 0.60000 |
| 96 | suction-side | 0.58097 | −0.21201 | 0.60000 |
| 97 | suction-side | 0.58144 | −0.23277 | 0.60000 |
| 98 | suction-side | 0.58376 | −0.22985 | 0.60000 |
| 99 | suction-side | 0.58423 | −0.22257 | 0.60000 |
| 100 | suction-side | 0.58469 | −0.22628 | 0.60000 |
| 101 | pressure-side | 0.03216 | 0.05525 | 0.60000 |
| 102 | pressure-side | 0.03918 | 0.05213 | 0.60000 |
| 103 | pressure-side | 0.04658 | 0.05019 | 0.60000 |
| 104 | pressure-side | 0.05416 | 0.04938 | 0.60000 |
| 105 | pressure-side | 0.06178 | 0.04962 | 0.60000 |
| 106 | pressure-side | 0.06935 | 0.05070 | 0.60000 |
| 107 | pressure-side | 0.07677 | 0.05241 | 0.60000 |
| 108 | pressure-side | 0.08404 | 0.05456 | 0.60000 |
| 109 | pressure-side | 0.09120 | 0.05707 | 0.60000 |
| 110 | pressure-side | 0.09828 | 0.05986 | 0.60000 |
| 111 | pressure-side | 0.10530 | 0.06284 | 0.60000 |
| 112 | pressure-side | 0.11226 | 0.06596 | 0.60000 |
| 113 | pressure-side | 0.11920 | 0.06913 | 0.60000 |
| 114 | pressure-side | 0.12612 | 0.07233 | 0.60000 |
| 115 | pressure-side | 0.13304 | 0.07552 | 0.60000 |
| 116 | pressure-side | 0.13997 | 0.07868 | 0.60000 |
| 117 | pressure-side | 0.14694 | 0.08180 | 0.60000 |
| 118 | pressure-side | 0.15391 | 0.08483 | 0.60000 |
| 119 | pressure-side | 0.16095 | 0.08774 | 0.60000 |
| 120 | pressure-side | 0.16801 | 0.09054 | 0.60000 |
| 121 | pressure-side | 0.17514 | 0.09320 | 0.60000 |
| 122 | pressure-side | 0.18233 | 0.09569 | 0.60000 |
| 123 | pressure-side | 0.18956 | 0.09802 | 0.60000 |
| 124 | pressure-side | 0.19689 | 0.10016 | 0.60000 |
| 125 | pressure-side | 0.20427 | 0.10208 | 0.60000 |
| 126 | pressure-side | 0.21170 | 0.10376 | 0.60000 |
| 127 | pressure-side | 0.21916 | 0.10521 | 0.60000 |
| 128 | pressure-side | 0.22662 | 0.10640 | 0.60000 |
| 129 | pressure-side | 0.23413 | 0.10734 | 0.60000 |
| 130 | pressure-side | 0.24165 | 0.10798 | 0.60000 |
| 131 | pressure-side | 0.24922 | 0.10836 | 0.60000 |
| 132 | pressure-side | 0.25682 | 0.10842 | 0.60000 |
| 133 | pressure-side | 0.26443 | 0.10819 | 0.60000 |
| 134 | pressure-side | 0.27202 | 0.10764 | 0.60000 |
| 135 | pressure-side | 0.27957 | 0.10681 | 0.60000 |
| 136 | pressure-side | 0.28707 | 0.10567 | 0.60000 |
| 137 | pressure-side | 0.29445 | 0.10424 | 0.60000 |
| 138 | pressure-side | 0.30176 | 0.10251 | 0.60000 |
| 139 | pressure-side | 0.30899 | 0.10050 | 0.60000 |
| 140 | pressure-side | 0.31614 | 0.09821 | 0.60000 |
| 141 | pressure-side | 0.32322 | 0.09562 | 0.60000 |
| 142 | pressure-side | 0.33021 | 0.09278 | 0.60000 |
| 143 | pressure-side | 0.33713 | 0.08966 | 0.60000 |
| 144 | pressure-side | 0.34395 | 0.08629 | 0.60000 |
| 145 | pressure-side | 0.35064 | 0.08269 | 0.60000 |
| 146 | pressure-side | 0.35721 | 0.07887 | 0.60000 |
| 147 | pressure-side | 0.36364 | 0.07483 | 0.60000 |
| 148 | pressure-side | 0.36993 | 0.07063 | 0.60000 |
| 149 | pressure-side | 0.37609 | 0.06623 | 0.60000 |
| 150 | pressure-side | 0.38212 | 0.06167 | 0.60000 |
| 151 | pressure-side | 0.38803 | 0.05693 | 0.60000 |
| 152 | pressure-side | 0.39382 | 0.05203 | 0.60000 |
| 153 | pressure-side | 0.39950 | 0.04699 | 0.60000 |
| 154 | pressure-side | 0.40506 | 0.04181 | 0.60000 |
| 155 | pressure-side | 0.41050 | 0.03651 | 0.60000 |
| 156 | pressure-side | 0.41581 | 0.03110 | 0.60000 |
| 157 | pressure-side | 0.42100 | 0.02560 | 0.60000 |
| 158 | pressure-side | 0.42606 | 0.02000 | 0.60000 |
| 159 | pressure-side | 0.43102 | 0.01433 | 0.60000 |
| 160 | pressure-side | 0.43587 | 0.00856 | 0.60000 |
| 161 | pressure-side | 0.44062 | 0.00273 | 0.60000 |
| 162 | pressure-side | 0.44529 | −0.00319 | 0.60000 |
| 163 | pressure-side | 0.44986 | −0.00916 | 0.60000 |
| 164 | pressure-side | 0.45434 | −0.01520 | 0.60000 |
| 165 | pressure-side | 0.45874 | −0.02132 | 0.60000 |
| 166 | pressure-side | 0.46305 | −0.02750 | 0.60000 |
| 167 | pressure-side | 0.46729 | −0.03374 | 0.60000 |
| 168 | pressure-side | 0.47145 | −0.04003 | 0.60000 |
| 169 | pressure-side | 0.47554 | −0.04638 | 0.60000 |
| 170 | pressure-side | 0.47956 | −0.05278 | 0.60000 |
| 171 | pressure-side | 0.48351 | −0.05924 | 0.60000 |
| 172 | pressure-side | 0.48739 | −0.06574 | 0.60000 |
| 173 | pressure-side | 0.49121 | −0.07229 | 0.60000 |
| 174 | pressure-side | 0.49495 | −0.07887 | 0.60000 |
| 175 | pressure-side | 0.49864 | −0.08549 | 0.60000 |
| 176 | pressure-side | 0.50226 | −0.09212 | 0.60000 |
| 177 | pressure-side | 0.50582 | −0.09880 | 0.60000 |
| 178 | pressure-side | 0.50933 | −0.10549 | 0.60000 |
| 179 | pressure-side | 0.51279 | −0.11221 | 0.60000 |
| 180 | pressure-side | 0.51619 | −0.11895 | 0.60000 |
| 181 | pressure-side | 0.51955 | −0.12573 | 0.60000 |
| 182 | pressure-side | 0.52286 | −0.13251 | 0.60000 |
| 183 | pressure-side | 0.52615 | −0.13931 | 0.60000 |
| 184 | pressure-side | 0.52938 | −0.14615 | 0.60000 |

TABLE I-continued

Non-Dimensionalized (X Y Z/Span)

| N | Location | X | Y | Z |
|---|---|---|---|---|
| 185 | pressure-side | 0.53258 | −0.15298 | 0.60000 |
| 186 | pressure-side | 0.53576 | −0.15984 | 0.60000 |
| 187 | pressure-side | 0.53889 | −0.16672 | 0.60000 |
| 188 | pressure-side | 0.54200 | −0.17361 | 0.60000 |
| 189 | pressure-side | 0.54508 | −0.18052 | 0.60000 |
| 190 | pressure-side | 0.54812 | −0.18744 | 0.60000 |
| 191 | pressure-side | 0.55113 | −0.19437 | 0.60000 |
| 192 | pressure-side | 0.55412 | −0.20131 | 0.60000 |
| 193 | pressure-side | 0.55709 | −0.20827 | 0.60000 |
| 194 | pressure-side | 0.56004 | −0.21524 | 0.60000 |
| 195 | pressure-side | 0.56297 | −0.22221 | 0.60000 |
| 196 | pressure-side | 0.56587 | −0.22921 | 0.60000 |
| 197 | pressure-side | 0.56788 | −0.23237 | 0.60000 |
| 198 | pressure-side | 0.57088 | −0.23453 | 0.60000 |
| 199 | pressure-side | 0.57451 | −0.23528 | 0.60000 |
| 200 | pressure-side | 0.57820 | −0.23463 | 0.60000 |
| 1 | suction-side | 0.02846 | 0.10889 | 0.70000 |
| 2 | suction-side | 0.02903 | 0.09788 | 0.70000 |
| 3 | suction-side | 0.02923 | 0.11983 | 0.70000 |
| 4 | suction-side | 0.03101 | 0.13066 | 0.70000 |
| 5 | suction-side | 0.03183 | 0.08721 | 0.70000 |
| 6 | suction-side | 0.03357 | 0.14134 | 0.70000 |
| 7 | suction-side | 0.03671 | 0.15183 | 0.70000 |
| 8 | suction-side | 0.03865 | 0.07868 | 0.70000 |
| 9 | suction-side | 0.04037 | 0.16210 | 0.70000 |
| 10 | suction-side | 0.04452 | 0.17216 | 0.70000 |
| 11 | suction-side | 0.04912 | 0.18203 | 0.70000 |
| 12 | suction-side | 0.05414 | 0.19170 | 0.70000 |
| 13 | suction-side | 0.05956 | 0.20122 | 0.70000 |
| 14 | suction-side | 0.06533 | 0.21053 | 0.70000 |
| 15 | suction-side | 0.07144 | 0.21957 | 0.70000 |
| 16 | suction-side | 0.07789 | 0.22836 | 0.70000 |
| 17 | suction-side | 0.08467 | 0.23687 | 0.70000 |
| 18 | suction-side | 0.09179 | 0.24511 | 0.70000 |
| 19 | suction-side | 0.09924 | 0.25307 | 0.70000 |
| 20 | suction-side | 0.10707 | 0.26074 | 0.70000 |
| 21 | suction-side | 0.11522 | 0.26807 | 0.70000 |
| 22 | suction-side | 0.12368 | 0.27501 | 0.70000 |
| 23 | suction-side | 0.13241 | 0.28151 | 0.70000 |
| 24 | suction-side | 0.14144 | 0.28757 | 0.70000 |
| 25 | suction-side | 0.15077 | 0.29317 | 0.70000 |
| 26 | suction-side | 0.16043 | 0.29828 | 0.70000 |
| 27 | suction-side | 0.17040 | 0.30286 | 0.70000 |
| 28 | suction-side | 0.18061 | 0.30685 | 0.70000 |
| 29 | suction-side | 0.19099 | 0.31021 | 0.70000 |
| 30 | suction-side | 0.20152 | 0.31291 | 0.70000 |
| 31 | suction-side | 0.21224 | 0.31495 | 0.70000 |
| 32 | suction-side | 0.22312 | 0.31627 | 0.70000 |
| 33 | suction-side | 0.23409 | 0.31689 | 0.70000 |
| 34 | suction-side | 0.24500 | 0.31675 | 0.70000 |
| 35 | suction-side | 0.25583 | 0.31587 | 0.70000 |
| 36 | suction-side | 0.26658 | 0.31425 | 0.70000 |
| 37 | suction-side | 0.27723 | 0.31188 | 0.70000 |
| 38 | suction-side | 0.28777 | 0.30878 | 0.70000 |
| 39 | suction-side | 0.29807 | 0.30499 | 0.70000 |
| 40 | suction-side | 0.30806 | 0.30055 | 0.70000 |
| 41 | suction-side | 0.31774 | 0.29551 | 0.70000 |
| 42 | suction-side | 0.32713 | 0.28988 | 0.70000 |
| 43 | suction-side | 0.33623 | 0.28371 | 0.70000 |
| 44 | suction-side | 0.34494 | 0.27710 | 0.70000 |
| 45 | suction-side | 0.35329 | 0.27011 | 0.70000 |
| 46 | suction-side | 0.36128 | 0.26275 | 0.70000 |
| 47 | suction-side | 0.36896 | 0.25506 | 0.70000 |
| 48 | suction-side | 0.37636 | 0.24707 | 0.70000 |
| 49 | suction-side | 0.38348 | 0.23880 | 0.70000 |
| 50 | suction-side | 0.39034 | 0.23027 | 0.70000 |
| 51 | suction-side | 0.39695 | 0.22155 | 0.70000 |
| 52 | suction-side | 0.40328 | 0.21268 | 0.70000 |
| 53 | suction-side | 0.40937 | 0.20369 | 0.70000 |
| 54 | suction-side | 0.41524 | 0.19459 | 0.70000 |
| 55 | suction-side | 0.42090 | 0.18537 | 0.70000 |
| 56 | suction-side | 0.42637 | 0.17605 | 0.70000 |
| 57 | suction-side | 0.43168 | 0.16666 | 0.70000 |
| 58 | suction-side | 0.43682 | 0.15717 | 0.70000 |
| 59 | suction-side | 0.44182 | 0.14761 | 0.70000 |
| 60 | suction-side | 0.44667 | 0.13799 | 0.70000 |
| 61 | suction-side | 0.45142 | 0.12829 | 0.70000 |
| 62 | suction-side | 0.45604 | 0.11854 | 0.70000 |
| 63 | suction-side | 0.46058 | 0.10873 | 0.70000 |
| 64 | suction-side | 0.46502 | 0.09888 | 0.70000 |
| 65 | suction-side | 0.46935 | 0.08897 | 0.70000 |
| 66 | suction-side | 0.47360 | 0.07902 | 0.70000 |
| 67 | suction-side | 0.47778 | 0.06905 | 0.70000 |
| 68 | suction-side | 0.48189 | 0.05902 | 0.70000 |
| 69 | suction-side | 0.48592 | 0.04896 | 0.70000 |
| 70 | suction-side | 0.48990 | 0.03888 | 0.70000 |
| 71 | suction-side | 0.49380 | 0.02877 | 0.70000 |
| 72 | suction-side | 0.49768 | 0.01864 | 0.70000 |
| 73 | suction-side | 0.50149 | 0.00849 | 0.70000 |
| 74 | suction-side | 0.50526 | −0.00168 | 0.70000 |
| 75 | suction-side | 0.50898 | −0.01187 | 0.70000 |
| 76 | suction-side | 0.51266 | −0.02208 | 0.70000 |
| 77 | suction-side | 0.51629 | −0.03229 | 0.70000 |
| 78 | suction-side | 0.51989 | −0.04253 | 0.70000 |
| 79 | suction-side | 0.52345 | −0.05276 | 0.70000 |
| 80 | suction-side | 0.52699 | −0.06302 | 0.70000 |
| 81 | suction-side | 0.53050 | −0.07328 | 0.70000 |
| 82 | suction-side | 0.53398 | −0.08356 | 0.70000 |
| 83 | suction-side | 0.53745 | −0.09384 | 0.70000 |
| 84 | suction-side | 0.54090 | −0.10412 | 0.70000 |
| 85 | suction-side | 0.54433 | −0.11440 | 0.70000 |
| 86 | suction-side | 0.54776 | −0.12470 | 0.70000 |
| 87 | suction-side | 0.55118 | −0.13499 | 0.70000 |
| 88 | suction-side | 0.55460 | −0.14529 | 0.70000 |
| 89 | suction-side | 0.55798 | −0.15559 | 0.70000 |
| 90 | suction-side | 0.56136 | −0.16590 | 0.70000 |
| 91 | suction-side | 0.56472 | −0.17621 | 0.70000 |
| 92 | suction-side | 0.56806 | −0.18654 | 0.70000 |
| 93 | suction-side | 0.57138 | −0.19686 | 0.70000 |
| 94 | suction-side | 0.57467 | −0.20720 | 0.70000 |
| 95 | suction-side | 0.57533 | −0.23973 | 0.70000 |
| 96 | suction-side | 0.57793 | −0.21755 | 0.70000 |
| 97 | suction-side | 0.57849 | −0.23786 | 0.70000 |
| 98 | suction-side | 0.58073 | −0.23501 | 0.70000 |
| 99 | suction-side | 0.58114 | −0.22790 | 0.70000 |
| 100 | suction-side | 0.58162 | −0.23152 | 0.70000 |
| 101 | pressure-side | 0.03865 | 0.07868 | 0.70000 |
| 102 | pressure-side | 0.04554 | 0.07528 | 0.70000 |
| 103 | pressure-side | 0.05291 | 0.07324 | 0.70000 |
| 104 | pressure-side | 0.06052 | 0.07245 | 0.70000 |
| 105 | pressure-side | 0.06807 | 0.07272 | 0.70000 |
| 106 | pressure-side | 0.07551 | 0.07380 | 0.70000 |
| 107 | pressure-side | 0.08284 | 0.07544 | 0.70000 |
| 108 | pressure-side | 0.09011 | 0.07750 | 0.70000 |
| 109 | pressure-side | 0.09730 | 0.07987 | 0.70000 |
| 110 | pressure-side | 0.10444 | 0.08246 | 0.70000 |
| 111 | pressure-side | 0.11152 | 0.08516 | 0.70000 |
| 112 | pressure-side | 0.11857 | 0.08796 | 0.70000 |
| 113 | pressure-side | 0.12560 | 0.09078 | 0.70000 |
| 114 | pressure-side | 0.13262 | 0.09361 | 0.70000 |
| 115 | pressure-side | 0.13967 | 0.09641 | 0.70000 |
| 116 | pressure-side | 0.14674 | 0.09915 | 0.70000 |
| 117 | pressure-side | 0.15383 | 0.10180 | 0.70000 |
| 118 | pressure-side | 0.16095 | 0.10435 | 0.70000 |
| 119 | pressure-side | 0.16811 | 0.10676 | 0.70000 |
| 120 | pressure-side | 0.17532 | 0.10902 | 0.70000 |
| 121 | pressure-side | 0.18260 | 0.11111 | 0.70000 |
| 122 | pressure-side | 0.18994 | 0.11302 | 0.70000 |
| 123 | pressure-side | 0.19733 | 0.11472 | 0.70000 |
| 124 | pressure-side | 0.20478 | 0.11620 | 0.70000 |
| 125 | pressure-side | 0.21229 | 0.11743 | 0.70000 |
| 126 | pressure-side | 0.21982 | 0.11841 | 0.70000 |
| 127 | pressure-side | 0.22734 | 0.11911 | 0.70000 |
| 128 | pressure-side | 0.23486 | 0.11954 | 0.70000 |
| 129 | pressure-side | 0.24240 | 0.11969 | 0.70000 |
| 130 | pressure-side | 0.24992 | 0.11954 | 0.70000 |
| 131 | pressure-side | 0.25745 | 0.11910 | 0.70000 |
| 132 | pressure-side | 0.26497 | 0.11834 | 0.70000 |
| 133 | pressure-side | 0.27249 | 0.11727 | 0.70000 |
| 134 | pressure-side | 0.27998 | 0.11591 | 0.70000 |
| 135 | pressure-side | 0.28738 | 0.11426 | 0.70000 |
| 136 | pressure-side | 0.29471 | 0.11231 | 0.70000 |

TABLE I-continued

Non-Dimensionalized (X Y Z/Span)

| N | Location | X | Y | Z |
|---|---|---|---|---|
| 137 | pressure-side | 0.30190 | 0.11008 | 0.70000 |
| 138 | pressure-side | 0.30896 | 0.10758 | 0.70000 |
| 139 | pressure-side | 0.31594 | 0.10483 | 0.70000 |
| 140 | pressure-side | 0.32280 | 0.10181 | 0.70000 |
| 141 | pressure-side | 0.32957 | 0.09855 | 0.70000 |
| 142 | pressure-side | 0.33624 | 0.09503 | 0.70000 |
| 143 | pressure-side | 0.34280 | 0.09129 | 0.70000 |
| 144 | pressure-side | 0.34927 | 0.08732 | 0.70000 |
| 145 | pressure-side | 0.35560 | 0.08315 | 0.70000 |
| 146 | pressure-side | 0.36181 | 0.07878 | 0.70000 |
| 147 | pressure-side | 0.36789 | 0.07423 | 0.70000 |
| 148 | pressure-side | 0.37383 | 0.06953 | 0.70000 |
| 149 | pressure-side | 0.37963 | 0.06470 | 0.70000 |
| 150 | pressure-side | 0.38532 | 0.05971 | 0.70000 |
| 151 | pressure-side | 0.39087 | 0.05459 | 0.70000 |
| 152 | pressure-side | 0.39632 | 0.04933 | 0.70000 |
| 153 | pressure-side | 0.40166 | 0.04396 | 0.70000 |
| 154 | pressure-side | 0.40687 | 0.03848 | 0.70000 |
| 155 | pressure-side | 0.41199 | 0.03289 | 0.70000 |
| 156 | pressure-side | 0.41699 | 0.02721 | 0.70000 |
| 157 | pressure-side | 0.42189 | 0.02145 | 0.70000 |
| 158 | pressure-side | 0.42668 | 0.01561 | 0.70000 |
| 159 | pressure-side | 0.43138 | 0.00971 | 0.70000 |
| 160 | pressure-side | 0.43597 | 0.00373 | 0.70000 |
| 161 | pressure-side | 0.44047 | −0.00228 | 0.70000 |
| 162 | pressure-side | 0.44489 | −0.00836 | 0.70000 |
| 163 | pressure-side | 0.44921 | −0.01447 | 0.70000 |
| 164 | pressure-side | 0.45347 | −0.02065 | 0.70000 |
| 165 | pressure-side | 0.45765 | −0.02686 | 0.70000 |
| 166 | pressure-side | 0.46176 | −0.03312 | 0.70000 |
| 167 | pressure-side | 0.46579 | −0.03944 | 0.70000 |
| 168 | pressure-side | 0.46977 | −0.04580 | 0.70000 |
| 169 | pressure-side | 0.47368 | −0.05219 | 0.70000 |
| 170 | pressure-side | 0.47751 | −0.05862 | 0.70000 |
| 171 | pressure-side | 0.48130 | −0.06510 | 0.70000 |
| 172 | pressure-side | 0.48502 | −0.07162 | 0.70000 |
| 173 | pressure-side | 0.48869 | −0.07816 | 0.70000 |
| 174 | pressure-side | 0.49231 | −0.08475 | 0.70000 |
| 175 | pressure-side | 0.49589 | −0.09136 | 0.70000 |
| 176 | pressure-side | 0.49940 | −0.09801 | 0.70000 |
| 177 | pressure-side | 0.50289 | −0.10468 | 0.70000 |
| 178 | pressure-side | 0.50632 | −0.11137 | 0.70000 |
| 179 | pressure-side | 0.50973 | −0.11811 | 0.70000 |
| 180 | pressure-side | 0.51307 | −0.12485 | 0.70000 |
| 181 | pressure-side | 0.51640 | −0.13162 | 0.70000 |
| 182 | pressure-side | 0.51969 | −0.13839 | 0.70000 |
| 183 | pressure-side | 0.52295 | −0.14520 | 0.70000 |
| 184 | pressure-side | 0.52618 | −0.15201 | 0.70000 |
| 185 | pressure-side | 0.52938 | −0.15884 | 0.70000 |
| 186 | pressure-side | 0.53257 | −0.16567 | 0.70000 |
| 187 | pressure-side | 0.53571 | −0.17252 | 0.70000 |
| 188 | pressure-side | 0.53884 | −0.17937 | 0.70000 |
| 189 | pressure-side | 0.54196 | −0.18625 | 0.70000 |
| 190 | pressure-side | 0.54505 | −0.19313 | 0.70000 |
| 191 | pressure-side | 0.54811 | −0.20002 | 0.70000 |
| 192 | pressure-side | 0.55116 | −0.20691 | 0.70000 |
| 193 | pressure-side | 0.55419 | −0.21381 | 0.70000 |
| 194 | pressure-side | 0.55721 | −0.22072 | 0.70000 |
| 195 | pressure-side | 0.56022 | −0.22763 | 0.70000 |
| 196 | pressure-side | 0.56321 | −0.23455 | 0.70000 |
| 197 | pressure-side | 0.56522 | −0.23762 | 0.70000 |
| 198 | pressure-side | 0.56819 | −0.23969 | 0.70000 |
| 199 | pressure-side | 0.57174 | −0.24038 | 0.70000 |
| 200 | pressure-side | 0.57533 | −0.23973 | 0.70000 |
| 1 | suction-side | 0.03515 | 0.13723 | 0.80000 |
| 2 | suction-side | 0.03584 | 0.12651 | 0.80000 |
| 3 | suction-side | 0.03584 | 0.14794 | 0.80000 |
| 4 | suction-side | 0.03759 | 0.15851 | 0.80000 |
| 5 | suction-side | 0.03877 | 0.11610 | 0.80000 |
| 6 | suction-side | 0.04014 | 0.16890 | 0.80000 |
| 7 | suction-side | 0.04335 | 0.17913 | 0.80000 |
| 8 | suction-side | 0.04524 | 0.10761 | 0.80000 |
| 9 | suction-side | 0.04712 | 0.18916 | 0.80000 |
| 10 | suction-side | 0.05139 | 0.19894 | 0.80000 |
| 11 | suction-side | 0.05610 | 0.20846 | 0.80000 |
| 12 | suction-side | 0.06124 | 0.21775 | 0.80000 |
| 13 | suction-side | 0.06679 | 0.22681 | 0.80000 |
| 14 | suction-side | 0.07278 | 0.23567 | 0.80000 |
| 15 | suction-side | 0.07915 | 0.24427 | 0.80000 |
| 16 | suction-side | 0.08590 | 0.25255 | 0.80000 |
| 17 | suction-side | 0.09299 | 0.26048 | 0.80000 |
| 18 | suction-side | 0.10042 | 0.26806 | 0.80000 |
| 19 | suction-side | 0.10819 | 0.27525 | 0.80000 |
| 20 | suction-side | 0.11634 | 0.28209 | 0.80000 |
| 21 | suction-side | 0.12487 | 0.28850 | 0.80000 |
| 22 | suction-side | 0.13374 | 0.29446 | 0.80000 |
| 23 | suction-side | 0.14293 | 0.29992 | 0.80000 |
| 24 | suction-side | 0.15241 | 0.30481 | 0.80000 |
| 25 | suction-side | 0.16216 | 0.30911 | 0.80000 |
| 26 | suction-side | 0.17218 | 0.31278 | 0.80000 |
| 27 | suction-side | 0.18246 | 0.31580 | 0.80000 |
| 28 | suction-side | 0.19292 | 0.31812 | 0.80000 |
| 29 | suction-side | 0.20348 | 0.31970 | 0.80000 |
| 30 | suction-side | 0.21406 | 0.32054 | 0.80000 |
| 31 | suction-side | 0.22468 | 0.32065 | 0.80000 |
| 32 | suction-side | 0.23537 | 0.32002 | 0.80000 |
| 33 | suction-side | 0.24600 | 0.31865 | 0.80000 |
| 34 | suction-side | 0.25651 | 0.31659 | 0.80000 |
| 35 | suction-side | 0.26682 | 0.31386 | 0.80000 |
| 36 | suction-side | 0.27693 | 0.31049 | 0.80000 |
| 37 | suction-side | 0.28687 | 0.30649 | 0.80000 |
| 38 | suction-side | 0.29657 | 0.30194 | 0.80000 |
| 39 | suction-side | 0.30601 | 0.29687 | 0.80000 |
| 40 | suction-side | 0.31509 | 0.29136 | 0.80000 |
| 41 | suction-side | 0.32390 | 0.28542 | 0.80000 |
| 42 | suction-side | 0.33242 | 0.27907 | 0.80000 |
| 43 | suction-side | 0.34068 | 0.27235 | 0.80000 |
| 44 | suction-side | 0.34871 | 0.26527 | 0.80000 |
| 45 | suction-side | 0.35644 | 0.25788 | 0.80000 |
| 46 | suction-side | 0.36390 | 0.25023 | 0.80000 |
| 47 | suction-side | 0.37105 | 0.24237 | 0.80000 |
| 48 | suction-side | 0.37795 | 0.23432 | 0.80000 |
| 49 | suction-side | 0.38460 | 0.22606 | 0.80000 |
| 50 | suction-side | 0.39102 | 0.21763 | 0.80000 |
| 51 | suction-side | 0.39723 | 0.20905 | 0.80000 |
| 52 | suction-side | 0.40325 | 0.20030 | 0.80000 |
| 53 | suction-side | 0.40907 | 0.19143 | 0.80000 |
| 54 | suction-side | 0.41471 | 0.18241 | 0.80000 |
| 55 | suction-side | 0.42018 | 0.17328 | 0.80000 |
| 56 | suction-side | 0.42548 | 0.16405 | 0.80000 |
| 57 | suction-side | 0.43062 | 0.15472 | 0.80000 |
| 58 | suction-side | 0.43563 | 0.14531 | 0.80000 |
| 59 | suction-side | 0.44048 | 0.13584 | 0.80000 |
| 60 | suction-side | 0.44522 | 0.12629 | 0.80000 |
| 61 | suction-side | 0.44984 | 0.11671 | 0.80000 |
| 62 | suction-side | 0.45436 | 0.10707 | 0.80000 |
| 63 | suction-side | 0.45877 | 0.09739 | 0.80000 |
| 64 | suction-side | 0.46309 | 0.08765 | 0.80000 |
| 65 | suction-side | 0.46733 | 0.07789 | 0.80000 |
| 66 | suction-side | 0.47149 | 0.06808 | 0.80000 |
| 67 | suction-side | 0.47557 | 0.05823 | 0.80000 |
| 68 | suction-side | 0.47958 | 0.04837 | 0.80000 |
| 69 | suction-side | 0.48351 | 0.03846 | 0.80000 |
| 70 | suction-side | 0.48740 | 0.02854 | 0.80000 |
| 71 | suction-side | 0.49123 | 0.01861 | 0.80000 |
| 72 | suction-side | 0.49503 | 0.00864 | 0.80000 |
| 73 | suction-side | 0.49876 | −0.00134 | 0.80000 |
| 74 | suction-side | 0.50246 | −0.01133 | 0.80000 |
| 75 | suction-side | 0.50612 | −0.02134 | 0.80000 |
| 76 | suction-side | 0.50974 | −0.03136 | 0.80000 |
| 77 | suction-side | 0.51333 | −0.04138 | 0.80000 |
| 78 | suction-side | 0.51689 | −0.05143 | 0.80000 |
| 79 | suction-side | 0.52042 | −0.06148 | 0.80000 |
| 80 | suction-side | 0.52393 | −0.07154 | 0.80000 |
| 81 | suction-side | 0.52740 | −0.08162 | 0.80000 |
| 82 | suction-side | 0.53088 | −0.09170 | 0.80000 |
| 83 | suction-side | 0.53432 | −0.10178 | 0.80000 |
| 84 | suction-side | 0.53775 | −0.11188 | 0.80000 |
| 85 | suction-side | 0.54117 | −0.12195 | 0.80000 |
| 86 | suction-side | 0.54460 | −0.13205 | 0.80000 |
| 87 | suction-side | 0.54802 | −0.14214 | 0.80000 |
| 88 | suction-side | 0.55142 | −0.15225 | 0.80000 |

TABLE I-continued

Non-Dimensionalized (X Y Z/Span)

| N | Location | X | Y | Z |
|---|---|---|---|---|
| 89 | suction-side | 0.55482 | −0.16234 | 0.80000 |
| 90 | suction-side | 0.55821 | −0.17245 | 0.80000 |
| 91 | suction-side | 0.56159 | −0.18256 | 0.80000 |
| 92 | suction-side | 0.56493 | −0.19268 | 0.80000 |
| 93 | suction-side | 0.56826 | −0.20280 | 0.80000 |
| 94 | suction-side | 0.57158 | −0.21292 | 0.80000 |
| 95 | suction-side | 0.57259 | −0.24484 | 0.80000 |
| 96 | suction-side | 0.57485 | −0.22306 | 0.80000 |
| 97 | suction-side | 0.57563 | −0.24298 | 0.80000 |
| 98 | suction-side | 0.57777 | −0.24016 | 0.80000 |
| 99 | suction-side | 0.57811 | −0.23321 | 0.80000 |
| 100 | suction-side | 0.57860 | −0.23674 | 0.80000 |
| 101 | pressure-side | 0.04524 | 0.10761 | 0.80000 |
| 102 | pressure-side | 0.05189 | 0.10373 | 0.80000 |
| 103 | pressure-side | 0.05923 | 0.10154 | 0.80000 |
| 104 | pressure-side | 0.06686 | 0.10081 | 0.80000 |
| 105 | pressure-side | 0.07447 | 0.10114 | 0.80000 |
| 106 | pressure-side | 0.08195 | 0.10223 | 0.80000 |
| 107 | pressure-side | 0.08933 | 0.10381 | 0.80000 |
| 108 | pressure-side | 0.09666 | 0.10570 | 0.80000 |
| 109 | pressure-side | 0.10394 | 0.10780 | 0.80000 |
| 110 | pressure-side | 0.11119 | 0.11007 | 0.80000 |
| 111 | pressure-side | 0.11842 | 0.11242 | 0.80000 |
| 112 | pressure-side | 0.12564 | 0.11480 | 0.80000 |
| 113 | pressure-side | 0.13287 | 0.11716 | 0.80000 |
| 114 | pressure-side | 0.14012 | 0.11944 | 0.80000 |
| 115 | pressure-side | 0.14737 | 0.12165 | 0.80000 |
| 116 | pressure-side | 0.15466 | 0.12375 | 0.80000 |
| 117 | pressure-side | 0.16197 | 0.12572 | 0.80000 |
| 118 | pressure-side | 0.16932 | 0.12754 | 0.80000 |
| 119 | pressure-side | 0.17670 | 0.12918 | 0.80000 |
| 120 | pressure-side | 0.18414 | 0.13061 | 0.80000 |
| 121 | pressure-side | 0.19163 | 0.13185 | 0.80000 |
| 122 | pressure-side | 0.19916 | 0.13287 | 0.80000 |
| 123 | pressure-side | 0.20672 | 0.13363 | 0.80000 |
| 124 | pressure-side | 0.21429 | 0.13413 | 0.80000 |
| 125 | pressure-side | 0.22186 | 0.13435 | 0.80000 |
| 126 | pressure-side | 0.22939 | 0.13429 | 0.80000 |
| 127 | pressure-side | 0.23690 | 0.13394 | 0.80000 |
| 128 | pressure-side | 0.24440 | 0.13331 | 0.80000 |
| 129 | pressure-side | 0.25185 | 0.13238 | 0.80000 |
| 130 | pressure-side | 0.25927 | 0.13114 | 0.80000 |
| 131 | pressure-side | 0.26667 | 0.12962 | 0.80000 |
| 132 | pressure-side | 0.27403 | 0.12778 | 0.80000 |
| 133 | pressure-side | 0.28134 | 0.12566 | 0.80000 |
| 134 | pressure-side | 0.28855 | 0.12325 | 0.80000 |
| 135 | pressure-side | 0.29563 | 0.12058 | 0.80000 |
| 136 | pressure-side | 0.30257 | 0.11765 | 0.80000 |
| 137 | pressure-side | 0.30941 | 0.11447 | 0.80000 |
| 138 | pressure-side | 0.31613 | 0.11106 | 0.80000 |
| 139 | pressure-side | 0.32275 | 0.10741 | 0.80000 |
| 140 | pressure-side | 0.32925 | 0.10355 | 0.80000 |
| 141 | pressure-side | 0.33564 | 0.09948 | 0.80000 |
| 142 | pressure-side | 0.34191 | 0.09522 | 0.80000 |
| 143 | pressure-side | 0.34805 | 0.09078 | 0.80000 |
| 144 | pressure-side | 0.35403 | 0.08619 | 0.80000 |
| 145 | pressure-side | 0.35988 | 0.08147 | 0.80000 |
| 146 | pressure-side | 0.36558 | 0.07663 | 0.80000 |
| 147 | pressure-side | 0.37115 | 0.07164 | 0.80000 |
| 148 | pressure-side | 0.37660 | 0.06656 | 0.80000 |
| 149 | pressure-side | 0.38193 | 0.06138 | 0.80000 |
| 150 | pressure-side | 0.38714 | 0.05610 | 0.80000 |
| 151 | pressure-side | 0.39227 | 0.05070 | 0.80000 |
| 152 | pressure-side | 0.39728 | 0.04523 | 0.80000 |
| 153 | pressure-side | 0.40220 | 0.03966 | 0.80000 |
| 154 | pressure-side | 0.40703 | 0.03400 | 0.80000 |
| 155 | pressure-side | 0.41175 | 0.02827 | 0.80000 |
| 156 | pressure-side | 0.41640 | 0.02246 | 0.80000 |
| 157 | pressure-side | 0.42098 | 0.01657 | 0.80000 |
| 158 | pressure-side | 0.42548 | 0.01062 | 0.80000 |
| 159 | pressure-side | 0.42990 | 0.00459 | 0.80000 |
| 160 | pressure-side | 0.43425 | −0.00149 | 0.80000 |
| 161 | pressure-side | 0.43854 | −0.00762 | 0.80000 |
| 162 | pressure-side | 0.44276 | −0.01383 | 0.80000 |
| 163 | pressure-side | 0.44693 | −0.02006 | 0.80000 |
| 164 | pressure-side | 0.45102 | −0.02635 | 0.80000 |
| 165 | pressure-side | 0.45505 | −0.03268 | 0.80000 |
| 166 | pressure-side | 0.45904 | −0.03905 | 0.80000 |
| 167 | pressure-side | 0.46296 | −0.04546 | 0.80000 |
| 168 | pressure-side | 0.46683 | −0.05190 | 0.80000 |
| 169 | pressure-side | 0.47063 | −0.05838 | 0.80000 |
| 170 | pressure-side | 0.47439 | −0.06490 | 0.80000 |
| 171 | pressure-side | 0.47810 | −0.07143 | 0.80000 |
| 172 | pressure-side | 0.48174 | −0.07799 | 0.80000 |
| 173 | pressure-side | 0.48535 | −0.08457 | 0.80000 |
| 174 | pressure-side | 0.48891 | −0.09117 | 0.80000 |
| 175 | pressure-side | 0.49243 | −0.09780 | 0.80000 |
| 176 | pressure-side | 0.49590 | −0.10447 | 0.80000 |
| 177 | pressure-side | 0.49935 | −0.11114 | 0.80000 |
| 178 | pressure-side | 0.50275 | −0.11783 | 0.80000 |
| 179 | pressure-side | 0.50612 | −0.12455 | 0.80000 |
| 180 | pressure-side | 0.50947 | −0.13127 | 0.80000 |
| 181 | pressure-side | 0.51279 | −0.13802 | 0.80000 |
| 182 | pressure-side | 0.51607 | −0.14477 | 0.80000 |
| 183 | pressure-side | 0.51935 | −0.15153 | 0.80000 |
| 184 | pressure-side | 0.52261 | −0.15831 | 0.80000 |
| 185 | pressure-side | 0.52584 | −0.16508 | 0.80000 |
| 186 | pressure-side | 0.52905 | −0.17188 | 0.80000 |
| 187 | pressure-side | 0.53225 | −0.17867 | 0.80000 |
| 188 | pressure-side | 0.53544 | −0.18547 | 0.80000 |
| 189 | pressure-side | 0.53862 | −0.19228 | 0.80000 |
| 190 | pressure-side | 0.54179 | −0.19910 | 0.80000 |
| 191 | pressure-side | 0.54493 | −0.20592 | 0.80000 |
| 192 | pressure-side | 0.54809 | −0.21274 | 0.80000 |
| 193 | pressure-side | 0.55124 | −0.21956 | 0.80000 |
| 194 | pressure-side | 0.55437 | −0.22638 | 0.80000 |
| 195 | pressure-side | 0.55751 | −0.23321 | 0.80000 |
| 196 | pressure-side | 0.56065 | −0.24003 | 0.80000 |
| 197 | pressure-side | 0.56268 | −0.24298 | 0.80000 |
| 198 | pressure-side | 0.56561 | −0.24493 | 0.80000 |
| 199 | pressure-side | 0.56910 | −0.24555 | 0.80000 |
| 200 | pressure-side | 0.57259 | −0.24484 | 0.80000 |
| 1 | suction-side | 0.04073 | 0.16486 | 0.90000 |
| 2 | suction-side | 0.04078 | 0.17535 | 0.90000 |
| 3 | suction-side | 0.04221 | 0.18572 | 0.90000 |
| 4 | suction-side | 0.04293 | 0.15459 | 0.90000 |
| 5 | suction-side | 0.04474 | 0.19587 | 0.90000 |
| 6 | suction-side | 0.04806 | 0.20576 | 0.90000 |
| 7 | suction-side | 0.04859 | 0.14582 | 0.90000 |
| 8 | suction-side | 0.05205 | 0.21541 | 0.90000 |
| 9 | suction-side | 0.05663 | 0.22483 | 0.90000 |
| 10 | suction-side | 0.06171 | 0.23393 | 0.90000 |
| 11 | suction-side | 0.06724 | 0.24270 | 0.90000 |
| 12 | suction-side | 0.07318 | 0.25117 | 0.90000 |
| 13 | suction-side | 0.07956 | 0.25933 | 0.90000 |
| 14 | suction-side | 0.08636 | 0.26720 | 0.90000 |
| 15 | suction-side | 0.09358 | 0.27475 | 0.90000 |
| 16 | suction-side | 0.10118 | 0.28188 | 0.90000 |
| 17 | suction-side | 0.10910 | 0.28859 | 0.90000 |
| 18 | suction-side | 0.11736 | 0.29482 | 0.90000 |
| 19 | suction-side | 0.12593 | 0.30056 | 0.90000 |
| 20 | suction-side | 0.13486 | 0.30580 | 0.90000 |
| 21 | suction-side | 0.14414 | 0.31050 | 0.90000 |
| 22 | suction-side | 0.15373 | 0.31462 | 0.90000 |
| 23 | suction-side | 0.16355 | 0.31811 | 0.90000 |
| 24 | suction-side | 0.17357 | 0.32092 | 0.90000 |
| 25 | suction-side | 0.18375 | 0.32302 | 0.90000 |
| 26 | suction-side | 0.19410 | 0.32441 | 0.90000 |
| 27 | suction-side | 0.20457 | 0.32506 | 0.90000 |
| 28 | suction-side | 0.21499 | 0.32497 | 0.90000 |
| 29 | suction-side | 0.22534 | 0.32417 | 0.90000 |
| 30 | suction-side | 0.23562 | 0.32265 | 0.90000 |
| 31 | suction-side | 0.24582 | 0.32045 | 0.90000 |
| 32 | suction-side | 0.25588 | 0.31759 | 0.90000 |
| 33 | suction-side | 0.26573 | 0.31412 | 0.90000 |
| 34 | suction-side | 0.27531 | 0.31011 | 0.90000 |
| 35 | suction-side | 0.28464 | 0.30559 | 0.90000 |
| 36 | suction-side | 0.29373 | 0.30059 | 0.90000 |
| 37 | suction-side | 0.30260 | 0.29512 | 0.90000 |
| 38 | suction-side | 0.31125 | 0.28925 | 0.90000 |
| 39 | suction-side | 0.31962 | 0.28302 | 0.90000 |
| 40 | suction-side | 0.32769 | 0.27649 | 0.90000 |

TABLE I-continued

Non-Dimensionalized (X Y Z/Span)

| N | Location | X | Y | Z |
|---|---|---|---|---|
| 41 | suction-side | 0.33550 | 0.26970 | 0.90000 |
| 42 | suction-side | 0.34305 | 0.26265 | 0.90000 |
| 43 | suction-side | 0.35037 | 0.25535 | 0.90000 |
| 44 | suction-side | 0.35749 | 0.24781 | 0.90000 |
| 45 | suction-side | 0.36441 | 0.24008 | 0.90000 |
| 46 | suction-side | 0.37112 | 0.23214 | 0.90000 |
| 47 | suction-side | 0.37764 | 0.22402 | 0.90000 |
| 48 | suction-side | 0.38394 | 0.21577 | 0.90000 |
| 49 | suction-side | 0.39006 | 0.20738 | 0.90000 |
| 50 | suction-side | 0.39597 | 0.19891 | 0.90000 |
| 51 | suction-side | 0.40171 | 0.19034 | 0.90000 |
| 52 | suction-side | 0.40729 | 0.18167 | 0.90000 |
| 53 | suction-side | 0.41268 | 0.17292 | 0.90000 |
| 54 | suction-side | 0.41792 | 0.16408 | 0.90000 |
| 55 | suction-side | 0.42304 | 0.15518 | 0.90000 |
| 56 | suction-side | 0.42799 | 0.14620 | 0.90000 |
| 57 | suction-side | 0.43283 | 0.13714 | 0.90000 |
| 58 | suction-side | 0.43754 | 0.12804 | 0.90000 |
| 59 | suction-side | 0.44215 | 0.11887 | 0.90000 |
| 60 | suction-side | 0.44664 | 0.10965 | 0.90000 |
| 61 | suction-side | 0.45105 | 0.10037 | 0.90000 |
| 62 | suction-side | 0.45535 | 0.09106 | 0.90000 |
| 63 | suction-side | 0.45959 | 0.08170 | 0.90000 |
| 64 | suction-side | 0.46374 | 0.07228 | 0.90000 |
| 65 | suction-side | 0.46782 | 0.06283 | 0.90000 |
| 66 | suction-side | 0.47181 | 0.05335 | 0.90000 |
| 67 | suction-side | 0.47574 | 0.04383 | 0.90000 |
| 68 | suction-side | 0.47962 | 0.03429 | 0.90000 |
| 69 | suction-side | 0.48342 | 0.02471 | 0.90000 |
| 70 | suction-side | 0.48719 | 0.01510 | 0.90000 |
| 71 | suction-side | 0.49090 | 0.00547 | 0.90000 |
| 72 | suction-side | 0.49457 | −0.00418 | 0.90000 |
| 73 | suction-side | 0.49820 | −0.01384 | 0.90000 |
| 74 | suction-side | 0.50177 | −0.02352 | 0.90000 |
| 75 | suction-side | 0.50532 | −0.03321 | 0.90000 |
| 76 | suction-side | 0.50882 | −0.04292 | 0.90000 |
| 77 | suction-side | 0.51230 | −0.05264 | 0.90000 |
| 78 | suction-side | 0.51574 | −0.06236 | 0.90000 |
| 79 | suction-side | 0.51916 | −0.07210 | 0.90000 |
| 80 | suction-side | 0.52255 | −0.08185 | 0.90000 |
| 81 | suction-side | 0.52592 | −0.09160 | 0.90000 |
| 82 | suction-side | 0.52927 | −0.10137 | 0.90000 |
| 83 | suction-side | 0.53261 | −0.11113 | 0.90000 |
| 84 | suction-side | 0.53594 | −0.12091 | 0.90000 |
| 85 | suction-side | 0.53926 | −0.13067 | 0.90000 |
| 86 | suction-side | 0.54259 | −0.14045 | 0.90000 |
| 87 | suction-side | 0.54591 | −0.15021 | 0.90000 |
| 88 | suction-side | 0.54923 | −0.15999 | 0.90000 |
| 89 | suction-side | 0.55253 | −0.16977 | 0.90000 |
| 90 | suction-side | 0.55583 | −0.17954 | 0.90000 |
| 91 | suction-side | 0.55912 | −0.18934 | 0.90000 |
| 92 | suction-side | 0.56238 | −0.19913 | 0.90000 |
| 93 | suction-side | 0.56564 | −0.20892 | 0.90000 |
| 94 | suction-side | 0.56887 | −0.21873 | 0.90000 |
| 95 | suction-side | 0.56986 | −0.24990 | 0.90000 |
| 96 | suction-side | 0.57208 | −0.22853 | 0.90000 |
| 97 | suction-side | 0.57286 | −0.24803 | 0.90000 |
| 98 | suction-side | 0.57495 | −0.24523 | 0.90000 |
| 99 | suction-side | 0.57527 | −0.23835 | 0.90000 |
| 100 | suction-side | 0.57577 | −0.24183 | 0.90000 |
| 101 | pressure-side | 0.04859 | 0.14582 | 0.90000 |
| 102 | pressure-side | 0.05479 | 0.14139 | 0.90000 |
| 103 | pressure-side | 0.06184 | 0.13864 | 0.90000 |
| 104 | pressure-side | 0.06932 | 0.13732 | 0.90000 |
| 105 | pressure-side | 0.07691 | 0.13700 | 0.90000 |
| 106 | pressure-side | 0.08450 | 0.13740 | 0.90000 |
| 107 | pressure-side | 0.09206 | 0.13825 | 0.90000 |
| 108 | pressure-side | 0.09956 | 0.13934 | 0.90000 |
| 109 | pressure-side | 0.10704 | 0.14061 | 0.90000 |
| 110 | pressure-side | 0.11450 | 0.14200 | 0.90000 |
| 111 | pressure-side | 0.12197 | 0.14343 | 0.90000 |
| 112 | pressure-side | 0.12942 | 0.14487 | 0.90000 |
| 113 | pressure-side | 0.13689 | 0.14625 | 0.90000 |
| 114 | pressure-side | 0.14437 | 0.14753 | 0.90000 |
| 115 | pressure-side | 0.15185 | 0.14869 | 0.90000 |
| 116 | pressure-side | 0.15937 | 0.14972 | 0.90000 |
| 117 | pressure-side | 0.16689 | 0.15061 | 0.90000 |
| 118 | pressure-side | 0.17446 | 0.15132 | 0.90000 |
| 119 | pressure-side | 0.18204 | 0.15183 | 0.90000 |
| 120 | pressure-side | 0.18962 | 0.15215 | 0.90000 |
| 121 | pressure-side | 0.19719 | 0.15222 | 0.90000 |
| 122 | pressure-side | 0.20471 | 0.15206 | 0.90000 |
| 123 | pressure-side | 0.21224 | 0.15167 | 0.90000 |
| 124 | pressure-side | 0.21972 | 0.15101 | 0.90000 |
| 125 | pressure-side | 0.22717 | 0.15011 | 0.90000 |
| 126 | pressure-side | 0.23462 | 0.14892 | 0.90000 |
| 127 | pressure-side | 0.24204 | 0.14745 | 0.90000 |
| 128 | pressure-side | 0.24942 | 0.14572 | 0.90000 |
| 129 | pressure-side | 0.25674 | 0.14371 | 0.90000 |
| 130 | pressure-side | 0.26397 | 0.14142 | 0.90000 |
| 131 | pressure-side | 0.27109 | 0.13890 | 0.90000 |
| 132 | pressure-side | 0.27809 | 0.13611 | 0.90000 |
| 133 | pressure-side | 0.28497 | 0.13308 | 0.90000 |
| 134 | pressure-side | 0.29175 | 0.12981 | 0.90000 |
| 135 | pressure-side | 0.29841 | 0.12632 | 0.90000 |
| 136 | pressure-side | 0.30496 | 0.12261 | 0.90000 |
| 137 | pressure-side | 0.31140 | 0.11868 | 0.90000 |
| 138 | pressure-side | 0.31775 | 0.11455 | 0.90000 |
| 139 | pressure-side | 0.32398 | 0.11024 | 0.90000 |
| 140 | pressure-side | 0.33008 | 0.10574 | 0.90000 |
| 141 | pressure-side | 0.33607 | 0.10109 | 0.90000 |
| 142 | pressure-side | 0.34193 | 0.09630 | 0.90000 |
| 143 | pressure-side | 0.34764 | 0.09137 | 0.90000 |
| 144 | pressure-side | 0.35326 | 0.08633 | 0.90000 |
| 145 | pressure-side | 0.35874 | 0.08116 | 0.90000 |
| 146 | pressure-side | 0.36413 | 0.07588 | 0.90000 |
| 147 | pressure-side | 0.36941 | 0.07050 | 0.90000 |
| 148 | pressure-side | 0.37459 | 0.06500 | 0.90000 |
| 149 | pressure-side | 0.37970 | 0.05941 | 0.90000 |
| 150 | pressure-side | 0.38470 | 0.05373 | 0.90000 |
| 151 | pressure-side | 0.38963 | 0.04797 | 0.90000 |
| 152 | pressure-side | 0.39445 | 0.04214 | 0.90000 |
| 153 | pressure-side | 0.39919 | 0.03625 | 0.90000 |
| 154 | pressure-side | 0.40384 | 0.03031 | 0.90000 |
| 155 | pressure-side | 0.40841 | 0.02431 | 0.90000 |
| 156 | pressure-side | 0.41290 | 0.01826 | 0.90000 |
| 157 | pressure-side | 0.41731 | 0.01216 | 0.90000 |
| 158 | pressure-side | 0.42166 | 0.00603 | 0.90000 |
| 159 | pressure-side | 0.42594 | −0.00016 | 0.90000 |
| 160 | pressure-side | 0.43014 | −0.00637 | 0.90000 |
| 161 | pressure-side | 0.43431 | −0.01263 | 0.90000 |
| 162 | pressure-side | 0.43841 | −0.01892 | 0.90000 |
| 163 | pressure-side | 0.44246 | −0.02526 | 0.90000 |
| 164 | pressure-side | 0.44647 | −0.03160 | 0.90000 |
| 165 | pressure-side | 0.45042 | −0.03799 | 0.90000 |
| 166 | pressure-side | 0.45434 | −0.04441 | 0.90000 |
| 167 | pressure-side | 0.45820 | −0.05087 | 0.90000 |
| 168 | pressure-side | 0.46200 | −0.05734 | 0.90000 |
| 169 | pressure-side | 0.46578 | −0.06385 | 0.90000 |
| 170 | pressure-side | 0.46953 | −0.07038 | 0.90000 |
| 171 | pressure-side | 0.47322 | −0.07693 | 0.90000 |
| 172 | pressure-side | 0.47688 | −0.08350 | 0.90000 |
| 173 | pressure-side | 0.48050 | −0.09011 | 0.90000 |
| 174 | pressure-side | 0.48408 | −0.09674 | 0.90000 |
| 175 | pressure-side | 0.48763 | −0.10339 | 0.90000 |
| 176 | pressure-side | 0.49116 | −0.11005 | 0.90000 |
| 177 | pressure-side | 0.49467 | −0.11673 | 0.90000 |
| 178 | pressure-side | 0.49813 | −0.12342 | 0.90000 |
| 179 | pressure-side | 0.50157 | −0.13014 | 0.90000 |
| 180 | pressure-side | 0.50500 | −0.13686 | 0.90000 |
| 181 | pressure-side | 0.50841 | −0.14359 | 0.90000 |
| 182 | pressure-side | 0.51179 | −0.15034 | 0.90000 |
| 183 | pressure-side | 0.51515 | −0.15709 | 0.90000 |
| 184 | pressure-side | 0.51851 | −0.16384 | 0.90000 |
| 185 | pressure-side | 0.52185 | −0.17061 | 0.90000 |
| 186 | pressure-side | 0.52518 | −0.17738 | 0.90000 |
| 187 | pressure-side | 0.52849 | −0.18415 | 0.90000 |
| 188 | pressure-side | 0.53180 | −0.19093 | 0.90000 |
| 189 | pressure-side | 0.53508 | −0.19772 | 0.90000 |
| 190 | pressure-side | 0.53837 | −0.20451 | 0.90000 |
| 191 | pressure-side | 0.54164 | −0.21130 | 0.90000 |
| 192 | pressure-side | 0.54492 | −0.21809 | 0.90000 |

TABLE I-continued

Non-Dimensionalized (X Y Z/Span)

| N | Location | X | Y | Z |
|---|---|---|---|---|
| 193 | pressure-side | 0.54819 | −0.22490 | 0.90000 |
| 194 | pressure-side | 0.55147 | −0.23169 | 0.90000 |
| 195 | pressure-side | 0.55472 | −0.23850 | 0.90000 |
| 196 | pressure-side | 0.55798 | −0.24530 | 0.90000 |
| 197 | pressure-side | 0.56004 | −0.24817 | 0.90000 |
| 198 | pressure-side | 0.56297 | −0.25007 | 0.90000 |
| 199 | pressure-side | 0.56641 | −0.25063 | 0.90000 |
| 200 | pressure-side | 0.56986 | −0.24990 | 0.90000 |
| 1 | suction-side | 0.04425 | 0.21153 | 1.00000 |
| 2 | suction-side | 0.04518 | 0.20138 | 1.00000 |
| 3 | suction-side | 0.04554 | 0.22163 | 1.00000 |
| 4 | suction-side | 0.04826 | 0.23140 | 1.00000 |
| 5 | suction-side | 0.04963 | 0.19228 | 1.00000 |
| 6 | suction-side | 0.05200 | 0.24082 | 1.00000 |
| 7 | suction-side | 0.05656 | 0.24987 | 1.00000 |
| 8 | suction-side | 0.06175 | 0.25858 | 1.00000 |
| 9 | suction-side | 0.06750 | 0.26692 | 1.00000 |
| 10 | suction-side | 0.07371 | 0.27486 | 1.00000 |
| 11 | suction-side | 0.08035 | 0.28242 | 1.00000 |
| 12 | suction-side | 0.08741 | 0.28958 | 1.00000 |
| 13 | suction-side | 0.09489 | 0.29636 | 1.00000 |
| 14 | suction-side | 0.10276 | 0.30273 | 1.00000 |
| 15 | suction-side | 0.11097 | 0.30863 | 1.00000 |
| 16 | suction-side | 0.11946 | 0.31402 | 1.00000 |
| 17 | suction-side | 0.12824 | 0.31887 | 1.00000 |
| 18 | suction-side | 0.13732 | 0.32316 | 1.00000 |
| 19 | suction-side | 0.14672 | 0.32687 | 1.00000 |
| 20 | suction-side | 0.15638 | 0.32993 | 1.00000 |
| 21 | suction-side | 0.16619 | 0.33228 | 1.00000 |
| 22 | suction-side | 0.17610 | 0.33393 | 1.00000 |
| 23 | suction-side | 0.18606 | 0.33486 | 1.00000 |
| 24 | suction-side | 0.19613 | 0.33507 | 1.00000 |
| 25 | suction-side | 0.20626 | 0.33453 | 1.00000 |
| 26 | suction-side | 0.21633 | 0.33329 | 1.00000 |
| 27 | suction-side | 0.22623 | 0.33136 | 1.00000 |
| 28 | suction-side | 0.23598 | 0.32878 | 1.00000 |
| 29 | suction-side | 0.24560 | 0.32559 | 1.00000 |
| 30 | suction-side | 0.25502 | 0.32181 | 1.00000 |
| 31 | suction-side | 0.26420 | 0.31755 | 1.00000 |
| 32 | suction-side | 0.27308 | 0.31284 | 1.00000 |
| 33 | suction-side | 0.28173 | 0.30771 | 1.00000 |
| 34 | suction-side | 0.29013 | 0.30222 | 1.00000 |
| 35 | suction-side | 0.29831 | 0.29636 | 1.00000 |
| 36 | suction-side | 0.30629 | 0.29017 | 1.00000 |
| 37 | suction-side | 0.31407 | 0.28368 | 1.00000 |
| 38 | suction-side | 0.32161 | 0.27696 | 1.00000 |
| 39 | suction-side | 0.32892 | 0.27004 | 1.00000 |
| 40 | suction-side | 0.33601 | 0.26293 | 1.00000 |
| 41 | suction-side | 0.34289 | 0.25565 | 1.00000 |
| 42 | suction-side | 0.34958 | 0.24822 | 1.00000 |
| 43 | suction-side | 0.35610 | 0.24062 | 1.00000 |
| 44 | suction-side | 0.36246 | 0.23288 | 1.00000 |
| 45 | suction-side | 0.36866 | 0.22503 | 1.00000 |
| 46 | suction-side | 0.37472 | 0.21703 | 1.00000 |
| 47 | suction-side | 0.38064 | 0.20892 | 1.00000 |
| 48 | suction-side | 0.38642 | 0.20069 | 1.00000 |
| 49 | suction-side | 0.39208 | 0.19235 | 1.00000 |
| 50 | suction-side | 0.39761 | 0.18394 | 1.00000 |
| 51 | suction-side | 0.40301 | 0.17545 | 1.00000 |
| 52 | suction-side | 0.40828 | 0.16688 | 1.00000 |
| 53 | suction-side | 0.41343 | 0.15825 | 1.00000 |
| 54 | suction-side | 0.41847 | 0.14955 | 1.00000 |
| 55 | suction-side | 0.42341 | 0.14079 | 1.00000 |
| 56 | suction-side | 0.42823 | 0.13196 | 1.00000 |
| 57 | suction-side | 0.43296 | 0.12309 | 1.00000 |
| 58 | suction-side | 0.43758 | 0.11416 | 1.00000 |
| 59 | suction-side | 0.44210 | 0.10518 | 1.00000 |
| 60 | suction-side | 0.44655 | 0.09615 | 1.00000 |
| 61 | suction-side | 0.45090 | 0.08709 | 1.00000 |
| 62 | suction-side | 0.45518 | 0.07799 | 1.00000 |
| 63 | suction-side | 0.45937 | 0.06885 | 1.00000 |
| 64 | suction-side | 0.46350 | 0.05966 | 1.00000 |
| 65 | suction-side | 0.46754 | 0.05044 | 1.00000 |
| 66 | suction-side | 0.47151 | 0.04119 | 1.00000 |
| 67 | suction-side | 0.47541 | 0.03192 | 1.00000 |
| 68 | suction-side | 0.47926 | 0.02261 | 1.00000 |
| 69 | suction-side | 0.48304 | 0.01328 | 1.00000 |
| 70 | suction-side | 0.48676 | 0.00392 | 1.00000 |
| 71 | suction-side | 0.49042 | −0.00546 | 1.00000 |
| 72 | suction-side | 0.49403 | −0.01485 | 1.00000 |
| 73 | suction-side | 0.49760 | −0.02426 | 1.00000 |
| 74 | suction-side | 0.50111 | −0.03370 | 1.00000 |
| 75 | suction-side | 0.50457 | −0.04314 | 1.00000 |
| 76 | suction-side | 0.50799 | −0.05261 | 1.00000 |
| 77 | suction-side | 0.51138 | −0.06208 | 1.00000 |
| 78 | suction-side | 0.51472 | −0.07157 | 1.00000 |
| 79 | suction-side | 0.51805 | −0.08108 | 1.00000 |
| 80 | suction-side | 0.52134 | −0.09060 | 1.00000 |
| 81 | suction-side | 0.52460 | −0.10012 | 1.00000 |
| 82 | suction-side | 0.52785 | −0.10965 | 1.00000 |
| 83 | suction-side | 0.53109 | −0.11918 | 1.00000 |
| 84 | suction-side | 0.53431 | −0.12872 | 1.00000 |
| 85 | suction-side | 0.53752 | −0.13826 | 1.00000 |
| 86 | suction-side | 0.54074 | −0.14781 | 1.00000 |
| 87 | suction-side | 0.54396 | −0.15735 | 1.00000 |
| 88 | suction-side | 0.54717 | −0.16689 | 1.00000 |
| 89 | suction-side | 0.55037 | −0.17643 | 1.00000 |
| 90 | suction-side | 0.55358 | −0.18598 | 1.00000 |
| 91 | suction-side | 0.55678 | −0.19552 | 1.00000 |
| 92 | suction-side | 0.55996 | −0.20507 | 1.00000 |
| 93 | suction-side | 0.56314 | −0.21463 | 1.00000 |
| 94 | suction-side | 0.56630 | −0.22420 | 1.00000 |
| 95 | suction-side | 0.56720 | −0.25491 | 1.00000 |
| 96 | suction-side | 0.56944 | −0.23376 | 1.00000 |
| 97 | suction-side | 0.57019 | −0.25303 | 1.00000 |
| 98 | suction-side | 0.57227 | −0.25020 | 1.00000 |
| 99 | suction-side | 0.57256 | −0.24333 | 1.00000 |
| 100 | suction-side | 0.57306 | −0.24681 | 1.00000 |
| 101 | pressure-side | 0.04963 | 0.19228 | 1.00000 |
| 102 | pressure-side | 0.05539 | 0.18707 | 1.00000 |
| 103 | pressure-side | 0.06227 | 0.18348 | 1.00000 |
| 104 | pressure-side | 0.06956 | 0.18122 | 1.00000 |
| 105 | pressure-side | 0.07704 | 0.17984 | 1.00000 |
| 106 | pressure-side | 0.08465 | 0.17907 | 1.00000 |
| 107 | pressure-side | 0.09231 | 0.17868 | 1.00000 |
| 108 | pressure-side | 0.09999 | 0.17850 | 1.00000 |
| 109 | pressure-side | 0.10765 | 0.17847 | 1.00000 |
| 110 | pressure-side | 0.11534 | 0.17851 | 1.00000 |
| 111 | pressure-side | 0.12300 | 0.17860 | 1.00000 |
| 112 | pressure-side | 0.13068 | 0.17867 | 1.00000 |
| 113 | pressure-side | 0.13835 | 0.17865 | 1.00000 |
| 114 | pressure-side | 0.14603 | 0.17852 | 1.00000 |
| 115 | pressure-side | 0.15371 | 0.17827 | 1.00000 |
| 116 | pressure-side | 0.16138 | 0.17786 | 1.00000 |
| 117 | pressure-side | 0.16903 | 0.17729 | 1.00000 |
| 118 | pressure-side | 0.17667 | 0.17654 | 1.00000 |
| 119 | pressure-side | 0.18427 | 0.17562 | 1.00000 |
| 120 | pressure-side | 0.19180 | 0.17449 | 1.00000 |
| 121 | pressure-side | 0.19930 | 0.17315 | 1.00000 |
| 122 | pressure-side | 0.20672 | 0.17162 | 1.00000 |
| 123 | pressure-side | 0.21410 | 0.16987 | 1.00000 |
| 124 | pressure-side | 0.22141 | 0.16790 | 1.00000 |
| 125 | pressure-side | 0.22868 | 0.16570 | 1.00000 |
| 126 | pressure-side | 0.23587 | 0.16326 | 1.00000 |
| 127 | pressure-side | 0.24302 | 0.16061 | 1.00000 |
| 128 | pressure-side | 0.25010 | 0.15771 | 1.00000 |
| 129 | pressure-side | 0.25709 | 0.15459 | 1.00000 |
| 130 | pressure-side | 0.26400 | 0.15126 | 1.00000 |
| 131 | pressure-side | 0.27079 | 0.14771 | 1.00000 |
| 132 | pressure-side | 0.27746 | 0.14396 | 1.00000 |
| 133 | pressure-side | 0.28400 | 0.14005 | 1.00000 |
| 134 | pressure-side | 0.29041 | 0.13594 | 1.00000 |
| 135 | pressure-side | 0.29672 | 0.13167 | 1.00000 |
| 136 | pressure-side | 0.30289 | 0.12724 | 1.00000 |
| 137 | pressure-side | 0.30895 | 0.12264 | 1.00000 |
| 138 | pressure-side | 0.31491 | 0.11791 | 1.00000 |
| 139 | pressure-side | 0.32077 | 0.11301 | 1.00000 |
| 140 | pressure-side | 0.32652 | 0.10797 | 1.00000 |
| 141 | pressure-side | 0.33217 | 0.10282 | 1.00000 |
| 142 | pressure-side | 0.33772 | 0.09753 | 1.00000 |
| 143 | pressure-side | 0.34316 | 0.09215 | 1.00000 |
| 144 | pressure-side | 0.34850 | 0.08666 | 1.00000 |

TABLE I-continued

Non-Dimensionalized (X Y Z/Span)

| N | Location | X | Y | Z |
|---|---|---|---|---|
| 145 | pressure-side | 0.35375 | 0.08109 | 1.00000 |
| 146 | pressure-side | 0.35887 | 0.07545 | 1.00000 |
| 147 | pressure-side | 0.36391 | 0.06974 | 1.00000 |
| 148 | pressure-side | 0.36885 | 0.06395 | 1.00000 |
| 149 | pressure-side | 0.37372 | 0.05811 | 1.00000 |
| 150 | pressure-side | 0.37850 | 0.05219 | 1.00000 |
| 151 | pressure-side | 0.38321 | 0.04622 | 1.00000 |
| 152 | pressure-side | 0.38784 | 0.04019 | 1.00000 |
| 153 | pressure-side | 0.39242 | 0.03411 | 1.00000 |
| 154 | pressure-side | 0.39693 | 0.02798 | 1.00000 |
| 155 | pressure-side | 0.40137 | 0.02181 | 1.00000 |
| 156 | pressure-side | 0.40576 | 0.01559 | 1.00000 |
| 157 | pressure-side | 0.41010 | 0.00932 | 1.00000 |
| 158 | pressure-side | 0.41439 | 0.00302 | 1.00000 |
| 159 | pressure-side | 0.41863 | −0.00332 | 1.00000 |
| 160 | pressure-side | 0.42282 | −0.00969 | 1.00000 |
| 161 | pressure-side | 0.42697 | −0.01609 | 1.00000 |
| 162 | pressure-side | 0.43109 | −0.02253 | 1.00000 |
| 163 | pressure-side | 0.43517 | −0.02899 | 1.00000 |
| 164 | pressure-side | 0.43920 | −0.03546 | 1.00000 |
| 165 | pressure-side | 0.44321 | −0.04197 | 1.00000 |
| 166 | pressure-side | 0.44717 | −0.04849 | 1.00000 |
| 167 | pressure-side | 0.45110 | −0.05503 | 1.00000 |
| 168 | pressure-side | 0.45501 | −0.06161 | 1.00000 |
| 169 | pressure-side | 0.45889 | −0.06818 | 1.00000 |
| 170 | pressure-side | 0.46272 | −0.07479 | 1.00000 |
| 171 | pressure-side | 0.46653 | −0.08141 | 1.00000 |
| 172 | pressure-side | 0.47030 | −0.08804 | 1.00000 |
| 173 | pressure-side | 0.47405 | −0.09470 | 1.00000 |
| 174 | pressure-side | 0.47777 | −0.10137 | 1.00000 |
| 175 | pressure-side | 0.48147 | −0.10804 | 1.00000 |
| 176 | pressure-side | 0.48515 | −0.11475 | 1.00000 |
| 177 | pressure-side | 0.48879 | −0.12145 | 1.00000 |
| 178 | pressure-side | 0.49241 | −0.12817 | 1.00000 |
| 179 | pressure-side | 0.49603 | −0.13491 | 1.00000 |
| 180 | pressure-side | 0.49962 | −0.14164 | 1.00000 |
| 181 | pressure-side | 0.50319 | −0.14839 | 1.00000 |
| 182 | pressure-side | 0.50676 | −0.15515 | 1.00000 |
| 183 | pressure-side | 0.51030 | −0.16191 | 1.00000 |
| 184 | pressure-side | 0.51382 | −0.16869 | 1.00000 |
| 185 | pressure-side | 0.51734 | −0.17547 | 1.00000 |
| 186 | pressure-side | 0.52085 | −0.18226 | 1.00000 |
| 187 | pressure-side | 0.52434 | −0.18905 | 1.00000 |
| 188 | pressure-side | 0.52782 | −0.19584 | 1.00000 |
| 189 | pressure-side | 0.53129 | −0.20264 | 1.00000 |
| 190 | pressure-side | 0.53474 | −0.20946 | 1.00000 |
| 191 | pressure-side | 0.53818 | −0.21627 | 1.00000 |
| 192 | pressure-side | 0.54163 | −0.22309 | 1.00000 |
| 193 | pressure-side | 0.54505 | −0.22992 | 1.00000 |
| 194 | pressure-side | 0.54846 | −0.23676 | 1.00000 |
| 195 | pressure-side | 0.55188 | −0.24359 | 1.00000 |
| 196 | pressure-side | 0.55528 | −0.25043 | 1.00000 |
| 197 | pressure-side | 0.55737 | −0.25327 | 1.00000 |
| 198 | pressure-side | 0.56032 | −0.25514 | 1.00000 |
| 199 | pressure-side | 0.56377 | −0.25567 | 1.00000 |
| 200 | pressure-side | 0.56720 | −0.25491 | 1.00000 |

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbomachine bucket comprising:
a base;
an airfoil supported by the base, the airfoil including opposed first and second ends with the first end at the base, the airfoil further including opposed pressure and suction sidewalls extending in chord between opposed leading and trailing edges and extending in span between the first and second ends of the airfoil;
an endwall on the base and connected to the first end of the airfoil, the endwall including opposed endwall leading and trailing edges extending substantially circumferentially between opposed pressure and suction splitlines, a distance between the pressure and suction splitlines being substantially equal to a pitch;
opposed leading edge and trailing edge regions of the endwall each extending from the respective endwall leading and trailing edges to about half way therebetween;
pressure side and suction side regions of the endwall extending from the respective pressure and suction sidewalls of the airfoil;
at least one pressure side feature in the endwall in the pressure side region, each respective pressure side feature including at least one of a trough or a bump relative to a nominal surface of the endwall,
wherein the at least one pressure side feature includes a first bump in the leading edge region, a second bump between the first bump and the trailing edge of the airfoil, and from the endwall leading edge to the endwall trailing edge, the pressure side region of the endwall rises into the first bump, descends to a lower level, rises into the second bump, then descends into substantially the nominal surface;
at least one suction side feature in the endwall in the suction side region, each respective suction side feature including at least one of a trough or a bump relative to the nominal surface of the endwall; and
at least one leading edge feature in the endwall including at least one of a trough or a bump relative to the nominal surface in the leading edge region.

2. The turbomachine bucket of claim 1, wherein at least one of the suction sidewall or the pressure sidewall includes a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall.

3. The turbomachine bucket of claim 1, wherein the first bump has a peak at from about 5% chord to about 10% chord in the pressure side region and from about 0% to about 5% of pitch away from the pressure sidewall.

4. The turbomachine bucket of claim 1, wherein the second bump has a peak at from about 35% chord to about 55% chord in the pressure side region and from about 10% to about 30% of pitch away from the pressure sidewall.

5. The turbomachine bucket of claim 1, wherein the at least one suction side feature includes a trough.

6. The turbomachine bucket of claim 5, wherein the trough has a lowest point at from about 15% chord to about 20% chord from the airfoil leading edge and at from about the suction sidewall to about 10% of pitch away from the suction sidewall.

7. The turbomachine bucket of claim 1, wherein the at least one pressure side feature includes a bump in the leading edge region and substantially extending from the leading edge of the airfoil toward the pressure splitline, a trough in the leading edge region substantially extending from the leading edge of the airfoil toward the suction splitline, and the endwall, and from the pressure splitline to the suction splitline, the leading edge region rises into the first bump, descends into the trough, and rises to substantially the nominal surface.

8. The turbomachine bucket of claim 1, wherein the endwall leading edge includes a bullnose profile that descends from at least one of the at least one pressure side feature, the at least one suction side feature, or the nominal surface to a substantially semi-cylindrical lip below the nominal surface.

9. An endwall of a flow passage formed by adjacent first and second substantially identical, substantially circumferentially spaced apart airfoils of adjacent buckets of a stage of a turbomachine, a spacing between adjacent airfoils being a pitch, each airfoil including respective opposed pressure and suction sidewalls extending chordwise between opposed leading and trailing edges and extending spanwise between opposed first and second ends, at least one of the suction sidewall or the pressure sidewall of at least one airfoil including a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall, the endwall comprising:
a nominal surface between opposed endwall leading and trailing edges and including a region between the pressure sidewall of the first airfoil and the suction sidewall of the second airfoil;
at least one pressure side feature including at least one bump relative to the nominal surface proximate the pressure sidewall of the first blade; and
at least one suction side feature including at least one trough relative to the nominal surface.

10. The endwall of claim 9, wherein the at least one bump incudes a first bump proximate the leading edge of the first airfoil.

11. The endwall of claim 10, wherein the first bump has a peak at from about 5% chord to about 10% chord from the leading edge and from about 0% to about 5% of pitch from the pressure sidewall.

12. The endwall of claim 9, wherein the at least one bump includes a first bump located adjacent and at about midchord of the pressure sidewall of the first airfoil.

13. The endwall of claim 12, wherein the first bump has a peak at from about 35% chord to about 55% chord away from the leading edge and from about 10% to about 30% of pitch from the pressure sidewall.

14. The endwall of claim 9, wherein the at least one trough includes a first trough proximate the leading edge of the second airfoil.

15. The endwall of claim 14, wherein the first trough has a lowest point at from about 15% chord to about 20% chord from the leading edge and from about 0% to about 10% of pitch away from the suction sidewall.

16. A turbine system comprising:
a compressor section;
a combustion section;
a turbine section including at least one stage of airfoils substantially circumferentially distributed at a pitch about an axis of rotation of the turbine section, each airfoil supported by a respective platform of a respective bucket such that adjacent airfoils form a flow passage including a pressure sidewall of a first airfoil, a suction sidewall of a second, adjacent airfoil, and an endwall formed by at least a portion of each of the respective platforms of the first and second airfoils, at least one of the suction sidewall or the pressure sidewall including a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall.

17. The turbine system of claim 16, wherein the endwall includes at least one bump proximate the pressure sidewall of the first airfoil and at least one trough proximate the suction side of the second airfoil.

18. The turbine system of claim 16, wherein the at least one bump includes a first bump proximate the leading edge of the first airfoil with a peak at from about 5% chord to about 10% chord from the leading edge and from about 0% to about 5% of pitch away from the pressure sidewall, and a second bump proximate a midchord of the second airfoil with a peak at from about 35% chord to about 55% chord away from the leading edge and from about 10% to about 30% of pitch away from the pressure sidewall, and the at least one trough includes a first trough with a lowest point at from about 15% chord to about 20% chord from the leading edge and from about 0% to about 10% of pitch away from the suction sidewall.

19. The turbine system of claim 16, wherein for each airfoil both a respective suction sidewall and a respective pressure sidewall include a nominal profile substantially in accordance with non-dimensional Cartesian coordinate values of X, Y, and Z set forth in TABLE I, wherein the coordinate values are non-dimensionalized and convertible to distances by multiplying by a desired span in units of distance, and wherein X and Y values connected by smooth continuing arcs define airfoil profile sections at each distance Z along the airfoil, the profile sections at the Z distances being joined smoothly with one another to form the airfoil profile.

20. A turbomachine bucket comprising:

a base;

an airfoil supported by the base, the airfoil including opposed first and second ends with the first end at the base, the airfoil further including opposed pressure and suction sidewalls extending in chord between opposed leading and trailing edges and extending in span between the first and second ends of the airfoil;

an endwall on the base and connected to the first end of the airfoil, the endwall including opposed endwall leading and trailing edges extending substantially circumferentially between opposed pressure and suction splitlines, a distance between the pressure and suction splitlines being substantially equal to a pitch;

opposed leading edge and trailing edge regions of the endwall each extending from the respective endwall leading and trailing edges to about half way therebetween;

pressure side and suction side regions of the endwall extending from the respective pressure and suction sidewalls of the airfoil;

at least one pressure side feature in the endwall in the pressure side region, the at least one pressure side feature including a first bump in the leading edge region, a second bump between the first bump and the trailing edge of the airfoil, and from the endwall leading edge to the endwall trailing edge, the pressure side region of the endwall rises into the first bump, descends to a lower level, rises into the second bump, then descends into substantially the nominal surface.

21. The turbomachine bucket of claim 20, further comprising at least one suction side feature in the endwall in the suction side region, each respective suction side feature including at least one of a trough or a bump relative to the nominal surface of the endwall.

22. The turbomachine bucket of claim 20, further comprising at least one leading edge feature in the endwall including at least one of a trough or a bump relative to the nominal surface in the leading edge region.

23. The turbomachine bucket of claim 20, wherein the at least one pressure side feature includes a bump in the leading edge region and substantially extending from the leading edge of the airfoil toward the pressure splitline, a trough in the leading edge region substantially extending from the leading edge of the airfoil toward the suction splitline, and the endwall, and from the pressure splitline to the suction splitline, the leading edge region rises into the first bump, descends into the trough, and rises to substantially the nominal surface.

* * * * *